US011387572B2

(12) United States Patent
Tamakita et al.

(10) Patent No.: US 11,387,572 B2
(45) Date of Patent: Jul. 12, 2022

(54) ANTENNA ELEMENT, ARRAY ANTENNA, COMMUNICATION UNIT, MOBILE OBJECT, AND BASE STATION

(71) Applicant: KYOCERA Corporation, Kyoto (JP)

(72) Inventors: Tsukasa Tamakita, Yokohama (JP); Nobuki Hiramatsu, Yokohama (JP); Hiromichi Yoshikawa, Yokohama (JP); Katsuro Nakamata, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 16 days.

(21) Appl. No.: 17/255,964

(22) PCT Filed: Jun. 21, 2019

(86) PCT No.: PCT/JP2019/024746
§ 371 (c)(1),
(2) Date: Dec. 23, 2020

(87) PCT Pub. No.: WO2020/004274
PCT Pub. Date: Jan. 2, 2020

(65) Prior Publication Data
US 2021/0126380 A1    Apr. 29, 2021

(30) Foreign Application Priority Data
Jun. 26, 2018    (JP) .............................. JP2018-121395

(51) Int. Cl.
*H01Q 21/06*    (2006.01)
*H01Q 21/00*    (2006.01)
*H04W 88/08*    (2009.01)

(52) U.S. Cl.
CPC ....... *H01Q 21/065* (2013.01); *H01Q 21/0006* (2013.01); *H04W 88/08* (2013.01)

(58) Field of Classification Search
CPC .. H01Q 21/065; H01Q 21/0006; H04W 88/08
See application file for complete search history.

(56) References Cited

U.S. PATENT DOCUMENTS 6,329,949 B1    12/2001    Barnett et al.
6,542,050 B1    4/2003    Arai et al.
(Continued)

FOREIGN PATENT DOCUMENTS

CN    102522627 A    6/2012
CN    104064867 A    9/2014
(Continued)

OTHER PUBLICATIONS

Yasutaka Murakami et al., Low-Profile Design and Bandwidth Characteristics of Artificial Magnetic Conductor with Dielectric Substrate, 2015, 172-179, vol. J98-B No. 2, IEEE, Japan, 9pp.
(Continued)

*Primary Examiner* — Nguyen T Vo
(74) *Attorney, Agent, or Firm* — Hauptman Ham, LLP

(57) ABSTRACT

Provided are an improved antenna element, array antenna, communication unit, mobile object, and base station. The antenna element includes a first conductor, a second conductor, a third conductor, a fourth conductor, a feeding line electrically connected to the third conductor, and a filter connected to the feeding line. The first conductor and the second conductor extend along a second plane and are positioned away from each other along a first axis that intersects the second plane. The third conductor extends along a first plane including the first axis and is positioned between the first conductor and the second conductor. The fourth conductor extends along the first plane, is electrically connected to the first conductor and the second conductor,
(Continued)

and is positioned away from the third conductor. The filter is positioned in such a manner as to overlap the fourth conductor.

11 Claims, 102 Drawing Sheets

(56) References Cited

U.S. PATENT DOCUMENTS

| | | | |
|---|---|---|---|
| 2012/0293279 | A1 | 11/2012 | Gong et al. |
| 2016/0261047 | A1* | 9/2016 | Wallace .................. G01S 19/32 |
| 2016/0352016 | A1* | 12/2016 | Ito ........................ H01F 17/0033 |
| 2018/0288203 | A1* | 10/2018 | Jeon ........................ H01Q 5/321 |
| 2019/0081407 | A1 | 3/2019 | Doudou et al. |
| 2019/0207325 | A1* | 7/2019 | Zhao .......................... H01P 5/12 |

FOREIGN PATENT DOCUMENTS

| | | |
|---|---|---|
| CN | 107112631 A | 8/2017 |
| JP | 2000349680 A | 12/2000 |

OTHER PUBLICATIONS

Yasutaka Murakami et al., Optimum Configuration of Reflector for Dipole Antenna with AMC Reflector, 2015, 1212-1220, vol. 98-B No. 11, IEEE, 10pp.

* cited by examiner

FIG.2
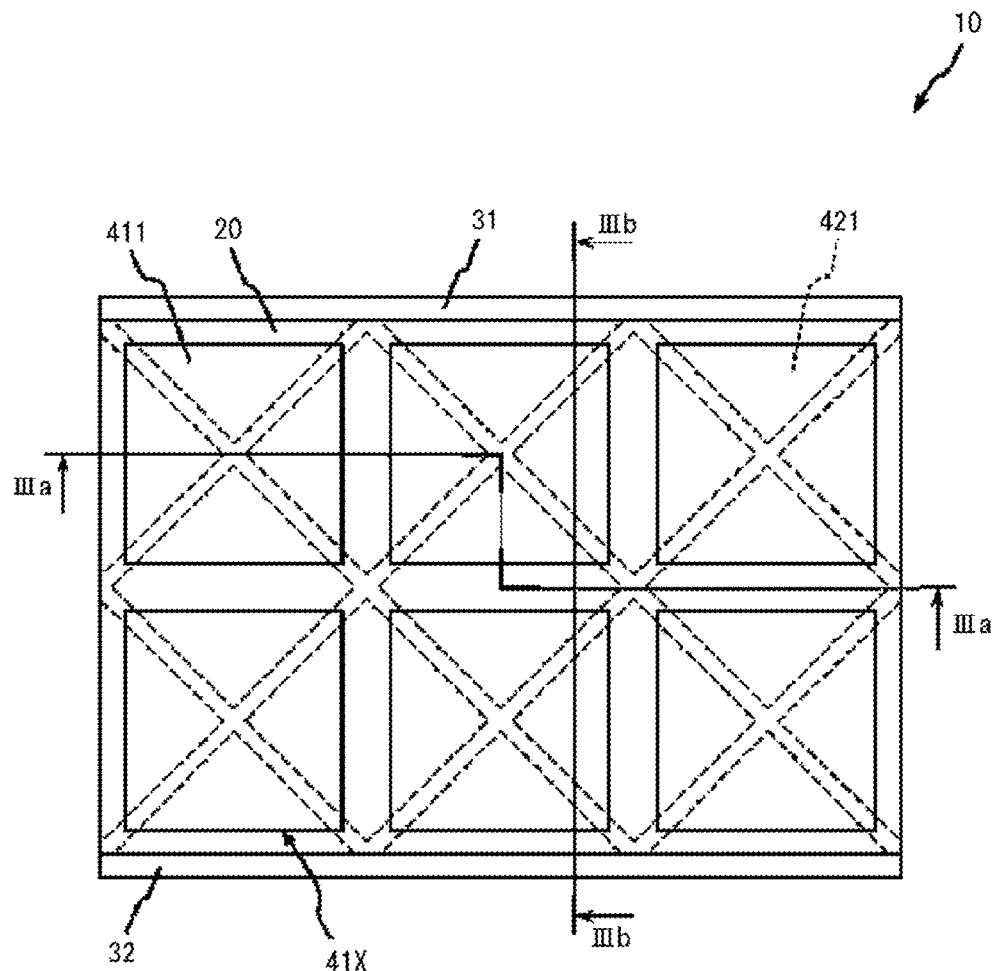
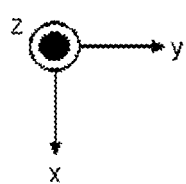

ANTENNA ELEMENT, ARRAY ANTENNA, COMMUNICATION UNIT, MOBILE OBJECT, AND BASE STATION

CROSS-REFERENCE TO RELATED APPLICATION

The present application is a National Phase of International Application Number PCT/JP2019/024746 filed Jun. 21, 2019, and claims the priority of Japanese Patent Application No. 2018-121395 filed in Japan on Jun. 26, 2018, the disclosure of which is incorporated herein by reference in its entirety.

FIELD

The present disclosure relates to an antenna element, an array antenna, a communication unit, a mobile object, and a base station.

BACKGROUND

Electromagnetic waves radiated from an antenna are reflected by a metal conductor. The electromagnetic waves reflected by the metal conductor have a phase shift of 180°. The reflected electromagnetic waves are synthesized with the electromagnetic waves radiated from the antenna. The electromagnetic waves radiated from the antenna may have a small amplitude when synthesized with the electromagnetic waves having a phase shift. As a result, the amplitude of the electromagnetic waves radiated from the antenna is decreased. The influence of the reflected waves is reduced by setting a distance between the antenna and the metal conductor to be ¼ of a wavelength λ of the electromagnetic waves to be radiated.

On the other hand, technologies for reducing the influence of reflected waves by using an artificial magnetic conductor have been suggested. These technologies are described in, for example, Non Patent Literatures 1 and 2.

CITATION LIST

Non Patent Literature

Non Patent Literature 1: Murakami et al., "Low profile design and bandwidth characteristics of artificial magnetic conductor using dielectric substrate", IEICE (B), Vol. J98-B No. 2, pp. 172-179

Non Patent Literature 2: Murakami et al., "Optimized configuration of reflector for dipole antenna with AMC Reflector", IEICE (B), Vol. J98-B No. 11, pp. 1212-1220

SUMMARY

An antenna element according to an embodiment of the present disclosure comprising: a first conductor and a second conductor that extend along a second plane and are positioned away from each other along a first axis that intersects the second plane; a third conductor that extends along a first plane including the first axis and is positioned between the first conductor and the second conductor; a fourth conductor that extends along the first plane, is electrically connected to the first conductor and the second conductor, and is positioned away from the third conductor; a feeding line that is electrically connected to the third conductor; and a filter that is connected to the feeding line, wherein the filter is positioned in such a manner as to overlap the fourth conductor.

An array antenna according to an embodiment of the present disclosure comprising: a plurality of antenna elements; and an antenna board on which the plurality of antenna elements are positioned, wherein the antenna element includes: a first conductor and a second conductor that extend along a second plane and are positioned away from each other along a first axis that intersects the second plane; a third conductor that extends along a first plane including the first axis and is positioned between the first conductor and the second conductor; a fourth conductor that extends along the first plane, is electrically connected to the first conductor and the second conductor, and is positioned away from the third conductor; a feeding line that is electrically connected to the third conductor; and a filter that is connected to the feeding line, and the filter is positioned in such a manner as to overlap the fourth conductor.

A communication unit according to an embodiment of the present disclosure comprising: an array antenna including a plurality of antenna elements and an antenna board on which the plurality of antenna elements are positioned; and a controller, wherein the antenna element includes: a first conductor and a second conductor that extend along a second plane and are positioned away from each other along a first axis that intersects the second plane; a third conductor that extends along a first plane including the first axis and is positioned between the first conductor and the second conductor; a fourth conductor that extends along the first plane, is electrically connected to the first conductor and the second conductor, and is positioned away from the third conductor; a feeding line that is electrically connected to the third conductor; and a filter that is connected to the feeding line, the filter is positioned in such a manner as to overlap the fourth conductor, and the controller is connected to the filter.

A mobile object according to an embodiment of the present disclosure comprising: a communication unit, wherein the communication unit includes: an array antenna including a plurality of antenna elements and an antenna board on which the plurality of antenna elements are positioned; and a controller, the antenna element includes: a first conductor and a second conductor that extend along a second plane and are positioned away from each other along a first axis that intersects the second plane; a third conductor that extends along a first plane including the first axis and is positioned between the first conductor and the second conductor; a fourth conductor that extends along the first plane, is electrically connected to the first conductor and the second conductor, and is positioned away from the third conductor; a feeding line that is electrically connected to the third conductor; and a filter that is connected to the feeding line, the filter is positioned in such a manner as to overlap the fourth conductor, and the controller is connected to the filter.

A base station according to an embodiment of the present disclosure comprising: a communication unit, wherein the communication unit includes: an array antenna including a plurality of antenna elements and an antenna board on which the plurality of antenna elements are positioned; and a controller, the antenna element includes: a first conductor and a second conductor that extend along a second plane and are positioned away from each other along a first axis that intersects the second plane; a third conductor that extends along a first plane including the first axis and is positioned between the first conductor and the second conductor; a fourth conductor that extends along the first plane, is electrically connected to the first conductor and the second conductor, and is positioned away from the third conductor; a feeding line that is electrically connected to the third conductor; and a filter that is connected to the feeding line, the filter is positioned in such a manner as to overlap the fourth conductor, and the controller is connected to the filter.

BRIEF DESCRIPTION OF DRAWINGS

FIG. 2 is a plan view of the resonator illustrated in FIG. 1.

DESCRIPTION OF EMBODIMENTS

Figure 1:
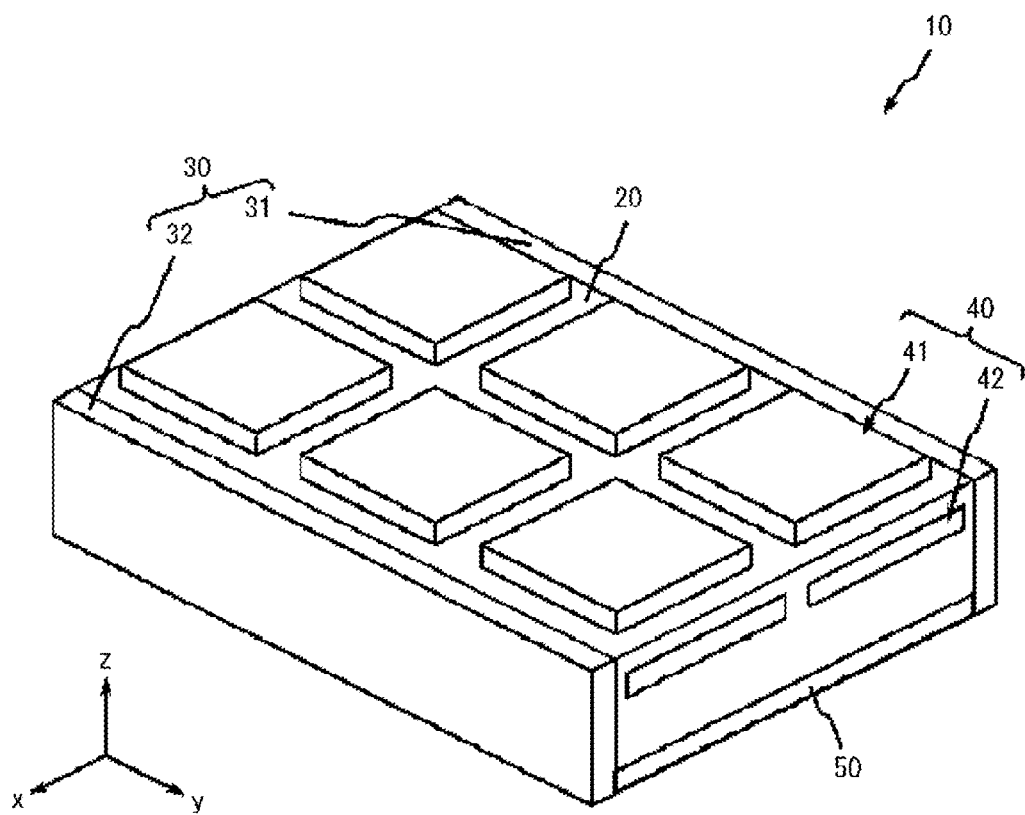
FIG. 1 is a perspective view illustrating an embodiment of a resonator.
Figure 3A:
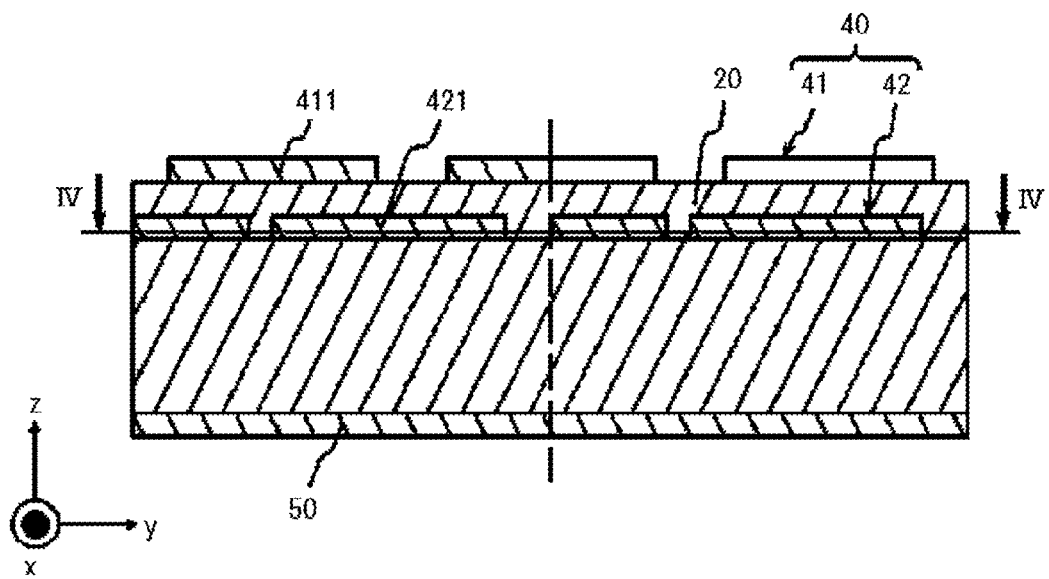
FIG. 3A is a cross-sectional view of the resonator illustrated in FIG. 1.
Figure 3B:
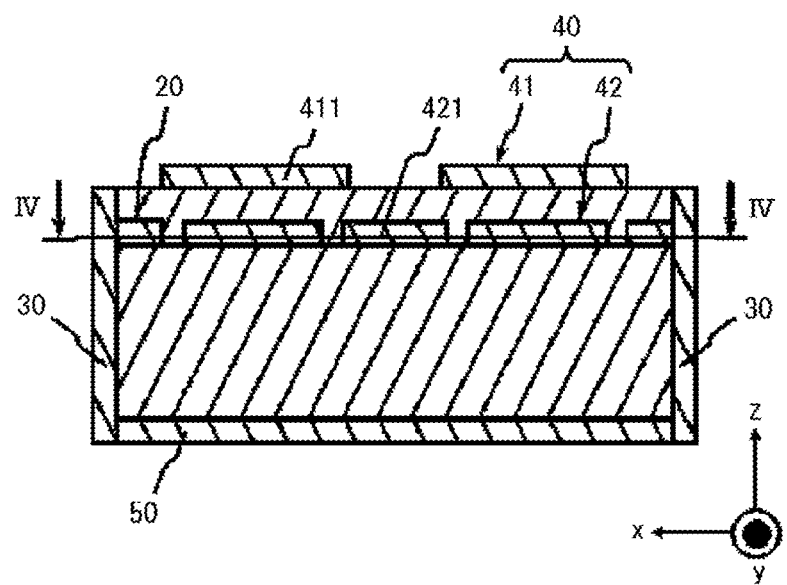
FIG. 3B is a cross-sectional view of the resonator illustrated in FIG. 1.

An object of the present disclosure is to provide an improved antenna element, array antenna, communication unit, mobile object, and base station.

According to the present disclosure, an improved antenna element, array antenna, communication unit, mobile object, and base station can be provided.

Embodiments of the present disclosure will be described below. A resonance structure can include a resonator. The resonance structure can include a resonator and another member, and be implemented by a combination thereof. A resonator 10 illustrated in FIGS. 1 to 62 includes a base 20, pair conductors 30, a third conductor 40, and a fourth conductor 50. The base 20 is in contact with the pair conductors 30, the third conductor 40, and the fourth conductor 50. In the resonator 10, the pair conductors 30, the third conductor 40, and the fourth conductor 50 function as a resonator. The resonator 10 can be operated in such a manner as to resonate at a plurality of resonant frequencies. One of the resonant frequencies of the resonator 10 will be referred to as a first frequency $f_1$. A wavelength of the first frequency $f_1$ is $\lambda_1$. The resonator 10 can have at least one of the at least one resonant frequency as an operating frequency. The resonator 10 uses the first frequency $f_1$ as the operating frequency.

The base 20 can include any one of a ceramic material or a resin material as a composition. The ceramic material is an aluminum oxide sintered body, an aluminum nitride sintered body, a mullite sintered body, a glass ceramic sintered body, a crystallized glass in which a crystalline component is precipitated in a glass base material, or a microcrystalline sintered body of mica, aluminum titanate, or the like. The resin material is an epoxy resin, a polyester resin, a polyimide resin, a polyamideimide resin, a polyetherimide resin, or a material obtained by curing an uncured material such as a liquid crystal polymer.

The pair conductors 30, the third conductor 40, and the fourth conductor 50 can include, as a composition, any one of a metal material, an alloy of metal materials, a hardened material of a metal paste, or a conductive polymer. The pair conductors 30, the third conductor 40, and the fourth conductor 50 may all be formed of the same material. The pair conductors 30, the third conductor 40, and the fourth conductor 50 may each be formed of a different material. Any combination of the pair conductors 30, the third conductor 40, and the fourth conductor 50 may be formed of the same material. The metal material includes copper, silver, palladium, gold, platinum, aluminum, chromium, nickel, cadmium lead, selenium, manganese, tin, vanadium, lithium, cobalt, titanium, or the like. The alloy includes a plurality of metal materials. A metal paste is a paste obtained by kneading powder of a metal material with an organic solvent and a binder. The binder is an epoxy resin, a polyester resin, a polyimide resin, a polyamideimide resin, or a polyetherimide resin. The conductive polymer is a polythiophene-based polymer, a polyacetylene-based polymer, a polyaniline-based polymer, a polypyrrole-based polymer, or the like.

The resonator 10 includes two pair conductors 30. The pair conductors 30 include a plurality of conductors. The pair conductors 30 include a first conductor 31 and a second conductor 32. The pair conductors 30 can include three or more conductors. Each conductor of the pair conductors 30 is separated from another conductor along a first axis. Each one of the conductors of the pair conductors 30 can be paired with another conductor. Each conductor of the pair conductors 30 can be seen as an electric conductor for the resonator between the paired conductors. The first conductor 31 is positioned away from the second conductor 32 along the first axis. Each conductor 31 or 32 extends along a second plane that intersects the first axis.

In the present disclosure, the first axis is referred to as an x direction. In the present disclosure, a third axis is referred to as a y direction. In the present disclosure, a second axis is referred to as a z direction. In the present disclosure, a first plane is referred to as an xy plane. In the present disclosure, the second plane is referred to as a yz plane. In the present disclosure, a third plane is referred to as a zx plane. These planes are planes in a coordinate space, and do not indicate specific plates or specific surfaces. In the present disclosure, a surface integral in the xy plane may be referred to as a first surface integral. In the present disclosure, a surface integral in the yz plane may be referred to as a second surface integral. In the present disclosure, a surface integral in the zx plane may be referred to as a third surface integral. The surface integral is expressed in a unit such as a square meter. In the present disclosure, a length in the x direction may be simply referred to as "length". In the present disclosure, a length in the y direction may be simply referred to as "width". In the present disclosure, a length in the z direction may be simply referred to as "height".

In one example, the respective conductors 31 and 32 are positioned at opposite end portions of the base 20 in the x direction. Each conductor 31 or 32 can partially face the outside of the base 20. Each conductor 31 or 32 can be partially positioned inside the base 20, and partially positioned outside the base 20. Each conductor 31 or 32 can be positioned inside the base 20.

The third conductor 40 functions as a resonator. The third conductor 40 can include at least one of a line-type resonator, a patch-type resonator, or a slot-type resonator. In one example, the third conductor 40 is positioned on the base 20. In one example, the third conductor 40 is positioned at an end of the base 20 in the z direction. In one example, the third conductor 40 can be positioned inside the base 20. The third conductor 40 can be partially positioned inside the base 20, and partially positioned outside the base 20. A partial surface of the third conductor 40 can face the outside of the base 20.

The third conductor 40 includes at least one conductor. The third conductor 40 can include a plurality of conductors. In a case where the third conductor 40 includes a plurality of conductors, the third conductor 40 can be referred to as a third conductor group. The third conductor 40 includes at least one conductive layer. The third conductor 40 includes at least one conductor in one conductive layer. The third conductor 40 can include a plurality of conductive layers. For example, the third conductor 40 can include three or more conductive layers. The third conductor 40 includes at least one conductor in each of the plurality of conductive layers. The third conductor 40 extends in the xy plane. The xy plane includes the x direction. Each conductive layer of the third conductor 40 extends along the xy plane.

In one example of the embodiments, the third conductor 40 includes a first conductive layer 41 and a second conductive layer 42. The first conductive layer 41 extends along the xy plane. The first conductive layer 41 can be positioned on the base 20. The second conductive layer 42 extends along the xy plane. The second conductive layer 42 can be capacitively coupled to the first conductive layer 41. The second conductive layer 42 can be electrically connected to the first conductive layer 41. Two conductive layers capacitively coupled to each other may face each other in the y direction. Two conductive layers capacitively coupled to each other may face each other in the x direction. Two conductive layers capacitively coupled to each other may face each other in the first plane. Two conductive layers facing each other in the first plane can be paraphrased as two conductors in one conductive layer. The second conductive layer 42 can be positioned such that at least a portion thereof overlaps the first conductive layer 41 in the z direction. The second conductive layer 42 can be positioned inside the base 20.

The fourth conductor 50 is positioned away from the third conductor 40. The fourth conductor 50 is electrically connected to each conductor 31 or 32 of the pair conductors 30. The fourth conductor 50 is electrically connected to the first conductor 31 and the second conductor 32. The fourth conductor 50 extends along the third conductor 40. The fourth conductor 50 extends along the first plane. The fourth conductor 50 extends from the first conductor 31 to the second conductor 32. The fourth conductor 50 is positioned on the base 20. The fourth conductor 50 may be positioned inside the base 20. The fourth conductor 50 can be partially positioned inside the base 20, and partially positioned outside the base 20. A partial surface of the fourth conductor 50 can face the outside of the base 20.

In one example of the embodiments, the fourth conductor 50 can function as a ground conductor in the resonator 10. The fourth conductor 50 can serve as an electric potential reference point for the resonator 10. The fourth conductor 50 may be connected to a ground of a device including the resonator 10.

In one example of the embodiments, the resonator 10 can include the fourth conductor 50 and a reference potential layer 51. The reference potential layer 51 is positioned away from the fourth conductor 50 in the z direction. The reference potential layer 51 is electrically insulated from the fourth conductor 50. The reference potential layer 51 can serve as an electric potential reference point for the resonator 10. The reference potential layer 51 can be electrically connected to the ground of the device including the resonator 10. The fourth conductor 50 can be electrically separated from the ground of the device including the resonator 10. The reference potential layer 51 faces any one of the third conductor 40 or the fourth conductor 50 in the z direction.

In one example of the embodiments, the reference potential layer 51 faces the third conductor 40 while having the fourth conductor 50 interposed therebetween. The fourth conductor 50 is positioned between the third conductor 40 and the reference potential layer 51. An interval between the reference potential layer 51 and the fourth conductor 50 is smaller than an interval between the third conductor 40 and the fourth conductor 50.

In the resonator 10 including the reference potential layer 51, the fourth conductor 50 can include one or more conductors. In the resonator 10 including the reference potential layer 51, the fourth conductor 50 can include one or more conductors, and the third conductor 40 can be one conductor connected to the pair conductors 30. In the resonator 10 including the reference potential layer 51, each of the third conductor 40 and the fourth conductor 50 can include at least one resonator.

In the resonator 10 including the reference potential layer 51, the fourth conductor 50 can include a plurality of conductive layers. For example, the fourth conductor 50 can include a third conductive layer 52 and a fourth conductive layer 53. The third conductive layer 52 can be capacitively coupled to the fourth conductive layer 53. The third conductive layer 52 can be electrically connected to the first conductive layer 41. Two conductive layers capacitively coupled to each other may face each other in the y direction. Two conductive layers capacitively coupled to each other may face each other in the x direction. Two conductive layers capacitively coupled to each other may face each other in the xy plane.

A distance between two conductive layers facing each other in the z direction and capacitively coupled to each other is smaller than a distance between a corresponding conductor group and the reference potential layer 51. For example, a distance between the first conductive layer 41 and the second conductive layer 42 is smaller than a distance between the third conductor 40 and the reference potential layer 51. For example, a distance between the third conductive layer 52 and the fourth conductive layer 53 is smaller than a distance between the fourth conductor 50 and the reference potential layer 51.

Each of the first conductor 31 and the second conductor 32 can include one or more conductors. Each of the first conductor 31 and the second conductor 32 can be one conductor. Each of the first conductor 31 and the second conductor 32 can include a plurality of conductors. Each of the first conductor 31 and the second conductor 32 can include at least one fifth conductive layer 301 and a plurality of fifth conductors 302. The pair conductors 30 include at least one fifth conductive layer 301 and a plurality of fifth conductors 302.

The fifth conductive layer 301 extends in the y direction. The fifth conductive layer 301 extends along the xy plane. The fifth conductive layer 301 is a conductor having a layer form. The fifth conductive layer 301 can be positioned on the base 20. The fifth conductive layer 301 can be positioned inside the base 20. The plurality of fifth conductive layers 301 are separated from each other in the z direction. The plurality of fifth conductive layers 301 are arranged in the z direction. The plurality of fifth conductive layers 301 partially overlap each other in the z direction. The fifth conductive layer 301 electrically connects the plurality of fifth conductors 302. The fifth conductive layer 301 is a connecting conductor that connects the plurality of fifth conductors 302. The fifth conductive layer 301 can be electrically connected to any conductive layer of the third conductor 40. In embodiments, the fifth conductive layer 301 is electrically connected to the second conductive layer 42. The fifth conductive layer 301 can be integrated with the second conductive layer 42. In embodiments, the fifth conductive layer 301 can be electrically connected to the fourth conductor 50. The fifth conductive layer 301 can be integrated with the fourth conductor 50.

Each fifth conductor 302 extends in the z direction. The plurality of fifth conductors 302 are separated from each other in the y direction. A distance between the fifth conductors 302 is equal to or smaller than ½ of the wavelength $\lambda_1$. When the distance between the electrically connected fifth conductors 302 is equal to or smaller than $\lambda_1/2$, each of the first conductor 31 and the second conductor 32 can reduce the leakage of electromagnetic waves in a resonant frequency band from between the fifth conductors 302. Since the leakage of electromagnetic waves in the resonant frequency band is reduced, the pair conductors 30 are seen as electric conductors for a unit structure. At least some of the plurality of fifth conductors 302 are electrically connected to the fourth conductor 50. In embodiments, some of the plurality of fifth conductors 302 can electrically connect the fourth conductor 50 and the fifth conductive layer 301 to each other. In embodiments, the plurality of fifth conductors 302 can be electrically connected to the fourth conductor 50 via the fifth conductive layer 301.

Some of the plurality of fifth conductors 302 can electrically connect one fifth conductive layer 301 and another fifth conductive layer 301 to each other. The fifth conductor 302 can use a via conductor and a through-hole conductor.

The resonator 10 includes the third conductor 40 that functions as a resonator. The third conductor 40 can function as an artificial magnetic conductor (AMC). The artificial magnetic conductor can also be referred to as a reactive impedance surface (RIS).

The resonator 10 includes the third conductor 40 that functions as a resonator and is provided between two pair conductors 30 facing each other in the x direction.

The two pair conductors 30 can be seen as electric conductors extending in the yz plane for the third conductor 40. Ends of the resonator 10 in the y direction are electrically opened. In the resonator 10, zx planes at the opposite ends in the y direction are in a high impedance state. The zx planes at the opposite ends of the resonator 10 in the y direction are seen as magnetic conductors for the third conductor 40. The resonator 10 is surrounded by two electric conductors and two high impedance surfaces (magnetic conductors), so that the resonator of the third conductor 40 has an artificial magnetic conductor character in the z direction. Since the resonator 10 is surrounded by two electric conductors and two high impedance surfaces, the resonator of the third conductor 40 has the artificial magnetic conductor character with a finite value.

With the "artificial magnetic conductor character", a phase difference between an incident wave and a reflected wave at the operating frequency is 0 degrees. In the resonator 10, a phase difference between the incident wave and the reflected wave at the first frequency $f_1$ is 0 degrees. With the "artificial magnetic conductor character", a phase difference between the incident wave and the reflected wave in an operating frequency band is −90 degrees to +90 degrees. The operating frequency band is a frequency band between a second frequency $f_2$ and a third frequency $f_3$. The second frequency $f_2$ is a frequency at which the phase difference between the incident wave and the reflected wave is +90 degrees. The third frequency $f_3$ is a frequency at which the phase difference between the incident wave and the reflected wave is −90 degrees. The width of the operating frequency band determined based on the second and third frequencies may be, for example, 100 MHz or more when the operating frequency is about 2.5 GHz. The width of the operating frequency band may be, for example, 5 MHz or more when the operating frequency is about 400 MHz.

The operating frequency of the resonator 10 can be different from the resonant frequency of each resonator of the third conductor 40. The operating frequency of the resonator 10 can vary depending on the length, size, shape, material, and the like of each of the base 20, the pair conductors 30, the third conductor 40, and the fourth conductor 50.

In one example of embodiments, the third conductor 40 can include at least one unit resonator 40X. The third conductor 40 can include one unit resonator 40X. The third conductor 40 can include a plurality of unit resonators 40X. The unit resonator 40X is positioned in such a manner as to overlap the fourth conductor 50 in the z direction. The unit resonator 40X faces the fourth conductor 50. The unit resonator 40X can function as a frequency selective surface (FSS). The plurality of unit resonators 40X are arranged along the xy plane. The plurality of unit resonators 40X can be regularly arranged in the xy plane. The unit resonators 40X can be arranged in a square grid, an oblique grid, a rectangular grid, or a hexagonal grid.

The third conductor 40 can include a plurality of conductive layers arranged in the z direction. Each of the plurality of conductive layers of the third conductor 40 includes parts equivalent to at least one unit resonator. For example, the third conductor 40 includes a first conductive layer 41 and a second conductive layer 42.

The first conductive layer 41 includes parts equivalent to at least one first unit resonator 41X. The first conductive layer 41 can include one first unit resonator 41X. The first conductive layer 41 can include a plurality of first divisional resonators 41Y subdivided from one first unit resonator 41X. The plurality of first divisional resonators 41Y can form at least one first unit resonator 41X by an adjacent unit structure 10X. The plurality of first divisional resonators 41Y are positioned at end portions of the first conductive layer 41. The first unit resonator 41X and the first divisional resonator 41Y can be referred to as the third conductor.

The second conductive layer 42 includes parts equivalent to at least one second unit resonator 42X. The second conductive layer 42 can include one second unit resonator 42X. The second conductive layer 42 can include a plurality of second divisional resonators 42Y subdivided from one second unit resonator 42X. The plurality of second divisional resonators 42Y can form at least one second unit resonator 42X by an adjacent unit structure 10X. The plurality of second divisional resonators 42Y are positioned at end portions of the second conductive layer 42. The second unit resonator 42X and the second divisional resonator 42Y can be referred to as the third conductor.

At least portions of the second unit resonator 42X and the second divisional resonator 42Y are positioned in such a manner as to overlap the first unit resonator 41X and the first divisional resonator 41Y in the Z direction. In the third conductor 40, at least portions of the unit resonator and the divisional resonator of each layer overlap with each other in the Z direction and form one unit resonator 40X. The unit resonator 40X includes parts equivalent to at least one unit resonator in each layer.

In a case where the first unit resonator 41X is a line-type resonator or a patch-type resonator, the first conductive layer 41 includes at least one first unit conductor 411. The first unit conductor 411 can function as the first unit resonator 41X or the first divisional resonator 41Y. The first conductive layer 41 includes a plurality of first unit conductors 411 arranged in n rows and m columns in the x direction and the y direction. n and m are natural numbers of 1 or more, which are independent of each other. In the example illustrated in FIGS. 1 to 9 and the like, the first conductive layer 41 includes six first unit conductors 411 arranged in a grid pattern of two rows and three columns. The first unit conductors 411 can be arranged in a square grid, an oblique grid, a rectangular grid, or a hexagonal grid. The first unit conductor 411 corresponding to the first divisional resonator 41Y is positioned at an end portion of the first conductive layer 41 in the xy plane.

In a case where the first unit resonator 41X is a slot-type resonator, as the first conductive layer 41, at least one conductive layer extends in the x direction and the y direction. The first conductive layer 41 includes at least one first unit slot 412. The first unit slot 412 can function as the first unit resonator 41X or the first divisional resonator 41Y. The first conductive layer 41 can include a plurality of first unit slots 412 arranged in n rows and m columns in the x direction and the y direction. n and m are natural numbers of 1 or more, which are independent of each other. In the example illustrated in FIGS. 6 to 9 and the like, the first conductive layer 41 includes six first unit slots 412 arranged in a grid pattern of two rows and three columns. The first unit slots 412 can be arranged in a square grid, an oblique grid, a rectangular grid, or a hexagonal grid. The first unit slot 412 corresponding to the first divisional resonator 41Y is positioned at an end portion of the first conductive layer 41 in the xy plane.

In a case where the second unit resonator 42X is a line-type resonator or a patch-type resonator, the second conductive layer 42 includes at least one second unit conductor 421. The second conductive layer 42 can include a plurality of second unit conductors 421 arranged in the x direction and the y direction. The second unit conductors 421 can be arranged in a square grid, an oblique grid, a rectangular grid, or a hexagonal grid. The second unit conductor 421 can function as the second unit resonator 42X or the second divisional resonator 42Y. The second unit conductor 421 corresponding to the second divisional resonator 42Y is positioned at an end portion of the second conductive layer 42 in the xy plane.

At least a portion of the second unit conductor 421 overlaps at least one of the first unit resonator 41X or the first divisional resonator 41Y in the z direction. The second unit conductor 421 can overlap the plurality of first unit resonators 41X. The second unit conductor 421 can overlap the plurality of first divisional resonators 41Y. The second unit conductor 421 can overlap one first unit resonator 41X and four first divisional resonators 41Y. The second unit conductor 421 can overlap only one first unit resonator 41X. The center of gravity of the second unit conductor 421 can overlap one first unit resonator 41X. The center of gravity of the second unit conductor 421 can be positioned between the plurality of first unit resonators 41X and the first divisional resonator 41Y. The center of gravity of the second unit conductor 421 can be positioned between two first unit resonators 41X arranged in the x direction or the y direction.

At least a portion of the second unit conductor 421 can overlap two first unit conductors 411. The second unit conductor 421 can overlap only one first unit conductor 411. The center of gravity of the second unit conductor 421 can be positioned between two first unit conductors 411. The center of gravity of the second unit conductor 421 can overlap one first unit conductor 411. At least a portion of the second unit conductor 421 can overlap the first unit slot 412. The second unit conductor 421 can overlap only one first unit slot 412. The center of gravity of the second unit conductor 421 can be positioned between two first unit slots 412 arranged in the x direction or the y direction. The center of gravity of the second unit conductor 421 can overlap one first unit slot 412.

In a case where the second unit resonator 42X is a slot-type resonator, as the second conductive layer 42, at least one conductive layer extends along the xy plane. The second conductive layer 42 includes at least one second unit slot 422. The second unit slot 422 can function as the second unit resonator 42X or the second divisional resonator 42Y. The second conductive layer 42 can include a plurality of second unit slots 422 arranged in the xy plane. The second unit slots 422 can be arranged in a square grid, an oblique grid, a rectangular grid, or a hexagonal grid. The second unit slot 422 corresponding to the second divisional resonator 42Y is positioned at an end portion of the second conductive layer 42 in the xy plane.

At least a portion of the second unit slot 422 overlaps at least one of the first unit resonator 41X or the first divisional resonator 41Y in the y direction. The second unit slot 422 can overlap the plurality of first unit resonators 41X. The second unit slot 422 can overlap the plurality of first divisional resonators 41Y. The second unit slot 422 can overlap one first unit resonator 41X and four first divisional resonators 41Y. The second unit slot 422 can overlap only one first unit resonator 41X. The center of gravity of the second unit slot 422 can overlap one first unit resonator 41X. The center of gravity of the second unit slot 422 can be positioned between the plurality of first unit resonators 41X. The center of gravity of the second unit slot 422 can be positioned between one first unit resonator 41X and one first divisional resonator 41Y arranged in the x direction or the y direction.

At least a portion of the second unit slot 422 can overlap two first unit conductors 411. The second unit slot 422 can overlap only one first unit conductor 411. The center of gravity of the second unit slot 422 can be positioned between two first unit conductors 411. The center of gravity of the second unit slot 422 may overlap one first unit conductor 411. At least a portion of the second unit slot 422 can overlap the first unit slot 412. The second unit slot 422 can overlap only one first unit slot 412. The center of gravity of the second unit slot 422 can be positioned between two first unit slots 412 arranged in the x direction or the y direction. The center of the second unit slot 422 can overlap one first unit slot 412.

The unit resonator 40X includes parts equivalent to at least one first unit resonator 41X and parts equivalent to at least one second unit resonator 42X. The unit resonator 40X can include one first unit resonator 41X. The unit resonator 40X can include a plurality of first unit resonators 41X. The unit resonator 40X can include one first divisional resonator 41Y. The unit resonator 40X can include a plurality of first divisional resonators 41Y. The unit resonator 40X can include a portion of the first unit resonator 41X. The unit resonator 40X can include one or more partial first unit resonators 41X. The unit resonator 40X includes a plurality of partial resonators of one or more partial first unit resonators 41X and one or more first divisional resonators 41Y. The plurality of partial resonators included in the unit resonator 40X are combined into at least one first unit resonator 41X. The unit resonator 40X can include a plurality of first divisional resonators 41Y without including the first unit resonator 41X. The unit resonator 40X can include, for example, four first divisional resonators 41Y. The unit resonator 40X can include only a plurality of partial first unit resonators 41X. The unit resonator 40X can include one or more partial first unit resonators 41X and one or more first divisional resonators 41Y. The unit resonator 40X can include, for example, two partial first unit resonators 41X and two first divisional resonators 41Y. The unit resonator 40X can have substantially the same mirror image of the included first conductive layer 41 at opposite ends of the unit resonator 40X in the x direction. In the unit resonator 40X, the included first conductive layer 41 can be substantially symmetrical with respect to the center line extending in the z direction.

The unit resonator 40X can include one second unit resonator 42X. The unit resonator 40X can include a plurality of second unit resonators 42X. The unit resonator 40X can include one second divisional resonator 42Y. The unit resonator 40X can include a plurality of second divisional resonators 42Y. The unit resonator 40X can include a portion of the second unit resonator 42X. The unit resonator 40X can include one or more partial second unit resonators 42X. The unit resonator 40X includes a plurality of partial resonators of one or more partial second unit resonators 42X and one or more second divisional resonators 42Y. The plurality of partial resonators included in the unit resonator 40X are combined into at least one second unit resonator 42X. The unit resonator 40X can include a plurality of second divisional resonators 42Y without including the second unit resonator 42X. The unit resonator 40X can include, for example, four second divisional resonators 42Y. The unit resonator 40X can include only a plurality of partial second unit resonators 42X. The unit resonator 40X can include one or more partial second unit resonators 42X and one or more second divisional resonators 42Y. The unit resonator 40X can include, for example, two partial second unit resonators 42X and two second divisional resonators 42Y. The unit resonator 40X can have substantially the same mirror image of the included second conductive layer 42 at opposite ends of the unit resonator 40X in the x direction. In the unit resonator 40X, the included second conductive layer 42 can be substantially symmetrical with respect to the center line extending in the y direction.

In one example of embodiments, the unit resonator 40X includes one first unit resonator 41X and a plurality of partial second unit resonators 42X. For example, the unit resonator 40X includes one first unit resonator 41X and half of four second unit resonators 42X. The unit resonator 40X includes parts equivalent to one first unit resonator 41X and parts equivalent to two second unit resonators 42X. Components included in the unit resonator 40X are not limited to this example.

The resonator 10 can include at least one unit structure 10X. The resonator 10 can include a plurality of unit structures 10X. The plurality of unit structures 10X can be arranged in the xy plane. The plurality of unit structures 10X can be arranged in a square grid, an oblique grid, a rectangular grid, or a hexagonal grid. The unit structure 10X includes a repeating unit of any one of a square grid, an oblique grid, a rectangular grid, or a hexagonal grid. The unit structures 10X can function as artificial magnetic conductors (AMC) when arranged infinitely in the xy plane.

The unit structure 10X can include at least a portion of the base 20, at least a portion of the third conductor 40, and at least a portion of the fourth conductor 50. Portions of the base 20, the third conductor 40, and the fourth conductor 50 included in the unit structure 10X overlap in the z direction. The unit structure 10X includes the unit resonator 40X, a portion of the base 20 that overlaps the unit resonator 40X in the z direction, and the fourth conductor 50 that overlaps the unit resonator 40X in the z direction. The resonator 10 can include, for example, six unit structures 10X arranged in two rows and three columns.

The resonator 10 can include at least one unit structure 10X between two pair conductors 30 facing each other in the x direction. The two pair conductors 30 can be seen as electric conductors extending in the yz plane for the unit structure 10X. Ends of the unit structure 10X in the y direction are opened. In the unit structure 10X, zx planes at the opposite ends in the y direction are in a high impedance state. In the unit structure 10X, the zx planes at the opposite ends in the y direction can be seen as magnetic conductors. The unit structures 10X may have a line symmetry with respect to the z direction when repeatedly arranged. Since the unit structure 10X is surrounded by two electric conductors and two high impedance surfaces (magnetic conductors), the unit structure 10X has an artificial magnetic conductor character in the z direction. Since the unit structure 10X is surrounded by two electric conductors and two high impedance surfaces (magnetic conductors), the unit structure 10X has the artificial magnetic conductor character with a finite value.

The operating frequency of the resonator 10 can be different from the operating frequency of the first unit resonator 41X. The operating frequency of the resonator 10 can be different from the operating frequency of the second unit resonator 42X. The operating frequency of the resonator 10 can be changed by the coupling of the first unit resonator 41X and the second unit resonator 42X that form the unit resonator 40X, or the like.

The third conductor 40 can include the first conductive layer 41 and the second conductive layer 42. The first conductive layer 41 includes at least one first unit conductor 411. The first unit conductor 411 includes a first connecting conductor 413 and a first floating conductor 414. The first connecting conductor 413 is connected to any one of the pair conductors 30. The first floating conductor 414 is not connected to the pair conductors 30. The second conductive layer 42 includes at least one second unit conductor 421. The second unit conductor 421 includes a second connecting conductor 423 and a second floating conductor 424. The second connecting conductor 423 is connected to any one of the pair conductors 30. The second floating conductor 424 is not connected to the pair conductors 30. The third conductor 40 can include the first unit conductor 411 and the second unit conductor 421.

The first connecting conductor 413 can have a length larger than that of the first floating conductor 414 in the x direction. The first connecting conductor 413 can have a length smaller than that of the first floating conductor 414 in the x direction. The first connecting conductor 413 can have a length that is half that of the first floating conductor 414 in the x direction. The second connecting conductor 423 can have a length larger than that of the second floating conductor 424 in the x direction. The second connecting conductor 423 can have a length smaller than that of the second floating conductor 424 in the x direction. The second connecting conductor 423 can have a length that is half that of the second floating conductor 424 in the x direction.

The third conductor 40 can include a current path 40I that serves as a current path between the first conductor 31 and the second conductor 32 when the resonator 10 resonates. The current path 40I can be connected to the first conductor 31 and the second conductor 32. The current path 40I has a capacitance between the first conductor 31 and the second conductor 32. The capacitance of the current path 40I is electrically connected in series between the first conductor 31 and the second conductor 32. In the current path 40I, a conductor is positioned between the first conductor 31 and the second conductor 32 while being in a separated state. The current path 40I can include a conductor connected to the first conductor 31 and a conductor connected to the second conductor 32.

In embodiments, in the current path 40I, the first unit conductor 411 and the second unit conductor 421 partially face each other in the z direction. In the current path 40I, the first unit conductor 411 and the second unit conductor 421 are capacitively coupled to each other. The first unit conductor 411 includes a capacitive component at an end portion in the x direction. The first unit conductor 411 can include a capacitive component at an end portion in the y direction that faces the second unit conductor 421 in the z direction. The first unit conductor 411 can include capacitive components at an end portion in the x direction that faces the second unit conductor 421 in the z direction and at an end portion in the y direction. The second unit conductor 421 includes a capacitive component at an end portion in the x direction. The second unit conductor 421 can include a capacitive component at an end portion in the y direction that faces the first unit conductor 411 in the z direction. The second unit conductor 421 can include capacitive components at an end portion in the x direction that faces the first unit conductor 411 in the z direction and at an end portion in the y direction.

The resonator 10 can reduce the resonant frequency by increasing the capacitive coupling in the current path 40I. When realizing a desired operating frequency, the resonator 10 can reduce the length in the x direction by increasing the capacitive coupling in the current path 40I. In the third conductor 40, the first unit conductor 411 and the second unit conductor 421 face each other in a stacking direction of the base 20 and are capacitively coupled to each other. In the third conductor 40, the capacitance between the first unit conductor 411 and the second unit conductor 421 can be adjusted by a surface integral of an area by which the first unit conductor 411 and the second unit conductor 421 face each other.

In embodiments, the length of the first unit conductor 411 in the y direction is different from the length of the second unit conductor 421 in the y direction. When the relative positions of the first unit conductor 411 and the second unit conductor 421 are deviated from ideal positions in the xy plane, in the resonator 10, a change in magnitude of the capacitance can be reduced due to a difference in length along the third axis between the first unit conductor 411 and the second unit conductor 421.

In embodiments, the current path 40I includes one conductor that is spatially separated from the first conductor 31 and the second conductor 32 and is capacitively coupled to the first conductor 31 and the second conductor 32.

In embodiments, the current path 40I includes the first conductive layer 41 and the second conductive layer 42. The current path 40I includes at least one first unit conductor 411 and at least one second unit conductor 421. The current path 40I includes two first connecting conductors 413, two second connecting conductors 423, and one first connecting conductor 413 or one second connecting conductor 423. In the current path 40I, the first unit conductor 411 and the second unit conductor 421 can be arranged alternately along the first axis.

In embodiments, the current path 40I includes the first connecting conductor 413 and the second connecting conductor 423. The current path 40I includes at least one first connecting conductor 413 and at least one second connecting conductor 423. In the current path 40I, the third conductor 40 has a capacitance between the first connecting conductor 413 and the second connecting conductor 423. In one example of embodiments, the first connecting conductor 413 can face the second connecting conductor 423 and have a capacitance. In one example of embodiments, the first connecting conductor 413 can be capacitively connected to the second connecting conductor 423 via another conductor.

In embodiments, the current path 40I includes the first connecting conductor 413 and the second floating conductor 424. The current path 40I includes two first connecting conductors 413. In the current path 40I, the third conductor 40 has a capacitance between two first connecting conductors 413. In one example of embodiments, two first connecting conductors 413 can be capacitively connected to each other via at least one second floating conductor 424. In one example of embodiments, two first connecting conductors 413 can be capacitively connected to each other via at least one first floating conductor 414 and a plurality of second floating conductors 424.

In embodiments, the current path 40I includes the first floating conductor 414 and the second connecting conductor 423. The current path 40I includes two second connecting conductors 423. In the current path 40I, the third conductor 40 has a capacitance between two second connecting conductors 423. In one example of embodiments, two second connecting conductors 423 can be capacitively connected to each other via at least one first floating conductor 414. In one example of embodiments, two second connecting conductors 423 can be capacitively connected to each other via a plurality of first floating conductors 414 and at least one second floating conductor 424.

In embodiments, the first connecting conductor 413 and the second connecting conductor 423 can each have a length corresponding to ¼ of the wavelength λ at the resonant frequency. The first connecting conductor 413 and the second connecting conductor 423 can each function as a resonator having a length corresponding to a half of the wavelength λ. The first connecting conductor 413 and the second connecting conductor 423 can each be operated in such a manner as to oscillate in an odd mode and an even mode due to capacitive coupling of the respective resonators. The resonator 10 can use, as the operating frequency, a resonant frequency in the even mode after the capacitive coupling.

The current path 40I can be connected to the first conductor 31 at a plurality of points. The current path 40I can be connected to the second conductor 32 at a plurality of points. The current path 40I can include a plurality of conductive paths that independently conduct electricity from the first conductor 31 to the second conductor 32.

In the second floating conductor 424 that is capacitively coupled to the first connecting conductor 413, a distance between an end of the second floating conductor 424 on the side where the capacitive coupling is made and the first connecting conductor 413 is smaller than a distance between the end of the second floating conductor 424 and the pair conductors 30. In the first floating conductor 414 that is capacitively coupled to the second connecting conductor 423, a distance between an end of the first floating conductor 414 on the side where the capacitive coupling is made and the second connecting conductor 423 is smaller than a distance between the end of the first floating conductor 414 and the pair conductors 30.

In the resonators 10 of embodiments, each conductive layer of the third conductor 40 can have a different length in the y direction. The conductive layer of the third conductor 40 is capacitively coupled to another conductive layer in the z direction. When each conductive layer of the resonator 10 has a different length in the y direction, a change in capacitance is reduced even in a case where the conductive layer is displaced in the y direction. Since each conductive layer of the resonator 10 has a different length in the y direction, it is possible to widen an allowable range of the displacement of the conductive layer in the y direction.

In the resonators 10 of embodiments, the third conductor 40 has a capacitance due to capacitive coupling between the conductive layers. A plurality of capacitive portions having the capacitance can be arranged in the y direction. The plurality of capacitive portions arranged in the y direction can have an electromagnetically parallel relationship. As the resonator 10 has a plurality of capacitive portions that are arranged in electrically parallel with each other, individual capacitive errors can be mutually complemented.

When the resonator 10 is in a resonance state, a current flowing through the pair conductors 30, the third conductor 40, and the fourth conductor 50 loops. When the resonator 10 is in a resonance state, an alternating current flows through the resonator 10. In the resonator 10, the current flowing through the third conductor 40 is a first current, and the current flowing through the fourth conductor 50 is a second current. When the resonator 10 is in a resonance state, the first current flows toward a direction different from that of the second current in the x direction. For example, when the first current flows in the +x direction, the second current flows in the −x direction. For example, when the first current flows in the −x direction, the second current flows in the +x direction. That is, when the resonator 10 is in a resonance state, a loop current alternately flows in the +x direction and the −x direction. The resonator 10 radiates electromagnetic waves by repeating reversal of a loop current that forms a magnetic field.

In embodiments, the third conductor 40 includes the first conductive layer 41 and the second conductive layer 42. Since the first conductive layer 41 and the second conductive layer 42 are capacitively coupled to each other in the third conductor 40, it seems that a current flows over a large area in one direction in a resonance state. In embodiments, a current flowing through each conductor has a high density at an end portion in the y direction.

In the resonator 10, the first current and the second current loop through the pair conductors 30. In the resonator 10, the first conductor 31, the second conductor 32, the third conductor 40, and the fourth conductor 50 form a resonant circuit. The resonant frequency of the resonator 10 is the resonant frequency of the unit resonator. In a case where the resonator 10 includes one unit resonator, or in a case where the resonator 10 includes a portion of the unit resonator, the resonant frequency of the resonator 10 is changed by electromagnetic coupling with the base 20, the pair conductors 30, the third conductor 40, the fourth conductor 50, and the periphery of the resonator 10. For example, when the third conductor 40 has a poor periodicity, the entire resonator 10 forms one unit resonator or a portion of one unit resonator. For example, the resonant frequency of the resonator 10 is changed depending on the lengths of the first conductor 31 and the second conductor 32 in the z direction, the lengths of the third conductor 40 and the fourth conductor 50 in the x direction, the capacitances of the third conductor 40 and the fourth conductor 50. For example, in the resonator 10 in which the capacitance between the first unit conductor 411 and the second unit conductor 421 is large, the lengths of the first conductor 31 and the second conductor 32 in the z direction, and the lengths of the third conductor 40 and the fourth conductor 50 in the x direction can be reduced while reducing the resonant frequency.

In embodiments, in the resonator 10, the first conductive layer 41 serves as an effective radiation surface for electromagnetic waves in the z direction. In embodiments, in the resonator 10, the first surface integral of the first conductive layer 41 is larger than the first surface integral of another conductive layer. The resonator 10 can increase the radiation of electromagnetic waves by increasing the first surface integral of the first conductive layer 41.

In embodiments, the resonator 10 can include one or more impedance elements 45. The impedance element 45 has an impedance value between a plurality of terminals. The impedance element 45 changes the resonant frequency of the resonator 10. The impedance element 45 can include a register, a capacitor, and an inductor. The impedance element 45 can include a variable element whose impedance value can be changed. The variable element can change the impedance value according to an electric signal. The variable element can change the impedance value by a physical mechanism.

The impedance element 45 can be connected to two unit conductors of the third conductor 40 that are arranged in the x direction. The impedance element 45 can be connected to two first unit conductors 411 arranged in the x direction. The impedance element 45 can be connected to the first connecting conductor 413 and the first floating conductor 414 arranged in the x direction. The impedance element 45 can be connected to the first conductor 31 and the first floating conductor 414. The impedance element 45 is connected to the unit conductor of the third conductor 40 at a central portion in the y direction. The impedance element 45 is connected to a central portion of each of two first unit conductors 411 in the y direction.

The impedance element 45 is electrically connected in series between two conductors arranged in the x direction in the xy plane. The impedance element 45 can be electrically connected in series between two first unit conductors 411 arranged in the x direction. The impedance element 45 can be electrically connected in series between the first connecting conductor 413 and the first floating conductor 414 arranged in the x direction. The impedance element 45 can be electrically connected in series between the first conductor 31 and the first floating conductor 414.

The impedance element 45 can be electrically connected in parallel with the first unit conductors 411 and the second unit conductor 421 that overlap each other in the z direction and have a capacitance. The impedance element 45 can be electrically connected in parallel with the second connecting conductor 423 and the first floating conductor 414 that overlap each other in the z direction and have a capacitance.

The resonator 10 can reduce the resonant frequency by adding a capacitor as the impedance element 45. The resonator 10 can increase the resonant frequency by adding an inductor as the impedance element 45. The resonator 10 can include impedance elements 45 with different impedance values. The resonator 10 can include capacitors with different electric capacities as the impedance elements 45. The resonator 10 can include inductors with different inductances as the impedance elements 45. In the resonator 10, an adjustment range of the resonant frequency is increased by adding impedance elements 45 with different impedance values. The resonator 10 can include both a capacitor and an inductor as the impedance elements 45. In the resonator 10, the adjustment range of the resonant frequency is increased by adding both a capacitor and an inductor as the impedance elements 45. As the resonator 10 includes the impedance element 45, the entire resonator 10 can form one unit resonator, or a portion of one unit resonator.

Figure 4:
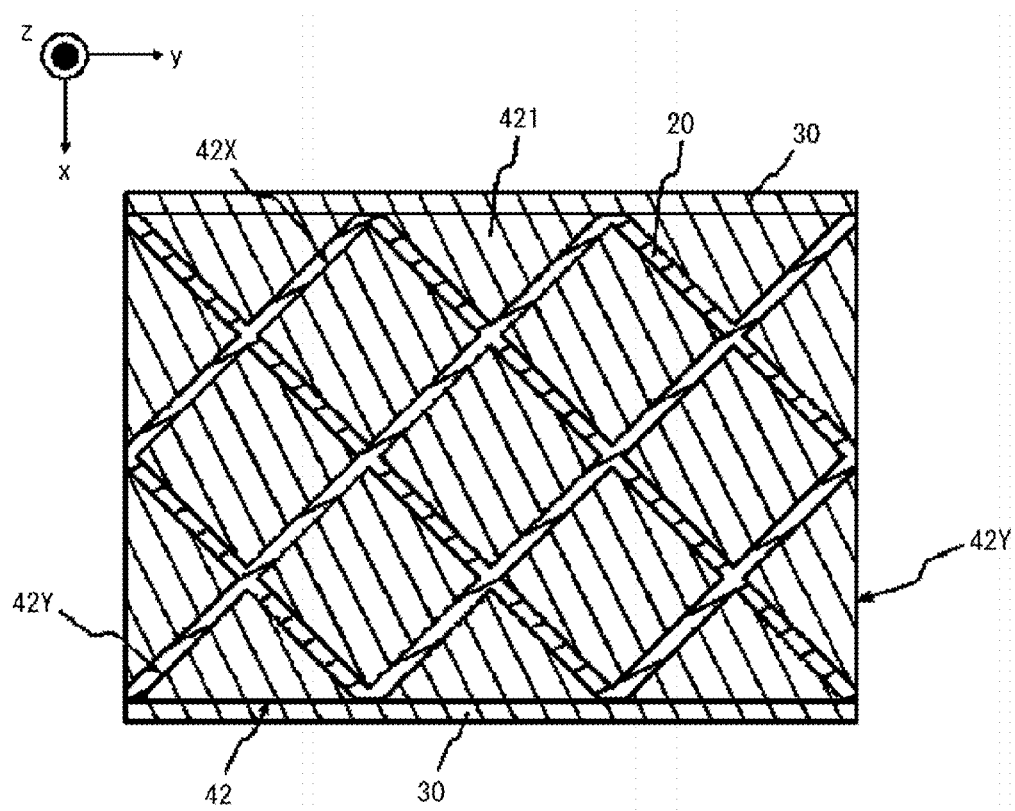
FIG. 4 is a cross-sectional view of the resonator illustrated in FIG. 1.
Figure 5:
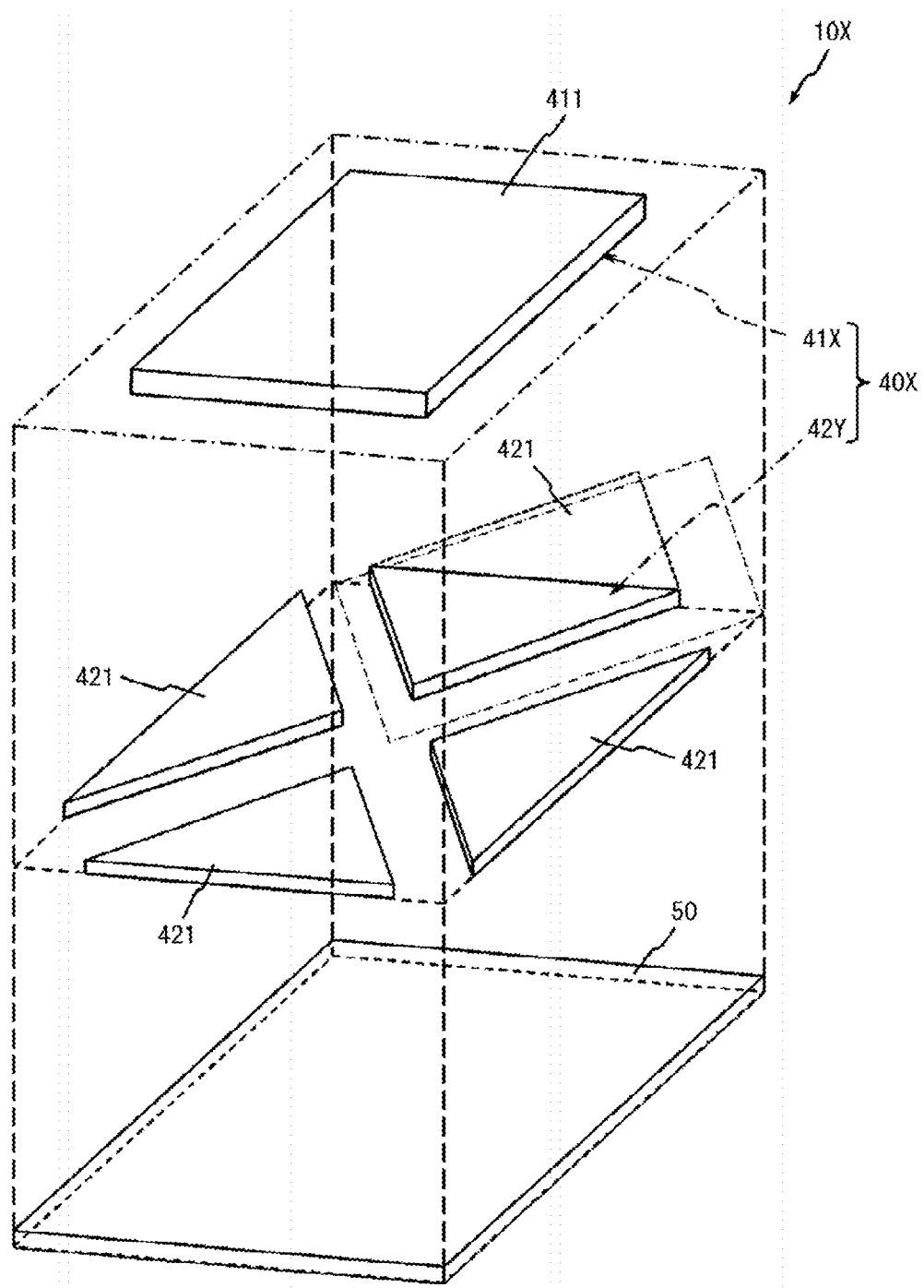
FIG. 5 is a conceptual view illustrating a unit structure of the resonator illustrated in FIG. 1.

FIGS. 1 to 5 are views each illustrating the resonator 10 as an example of embodiments. FIG. 1 is a schematic view of the resonator 10. FIG. 2 is a plan view illustrating the xy plane viewed from the z direction. FIG. 3A is a cross-sectional view taken along line IIIa-IIIa illustrated in FIG. 2. FIG. 3B is a cross-sectional view taken along line IIIb-IIIb illustrated in FIG. 2. FIG. 4 is a cross-sectional view taken along line IV-IV illustrated in FIGS. 3A and 3B. FIG. 5 is a conceptual view illustrating the unit structure 10X as an example of embodiments.

In the resonator 10 illustrated in FIGS. 1 to 5, the first conductive layer 41 includes a patch-type resonator as the first unit resonator 41X. The second conductive layer 42 includes a patch-type resonator as the second unit resonator 42X. The unit resonator 40X includes one first unit resonator 41X and four second divisional resonators 42Y. The unit structure 10X includes the unit resonator 40X, and a portion of the base 20 and a portion of the fourth conductor 50 that overlap the unit resonator 40X in the z direction.

Figure 6:
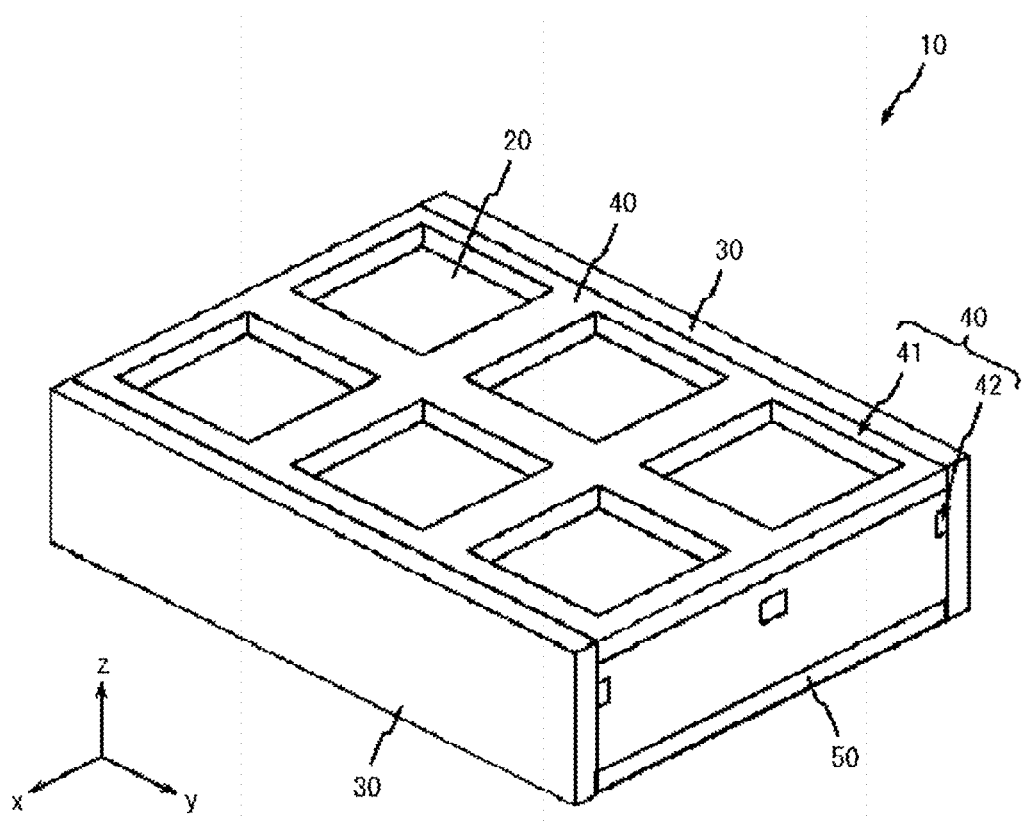
FIG. 6 is a perspective view illustrating an embodiment of a resonator.
Figure 7:
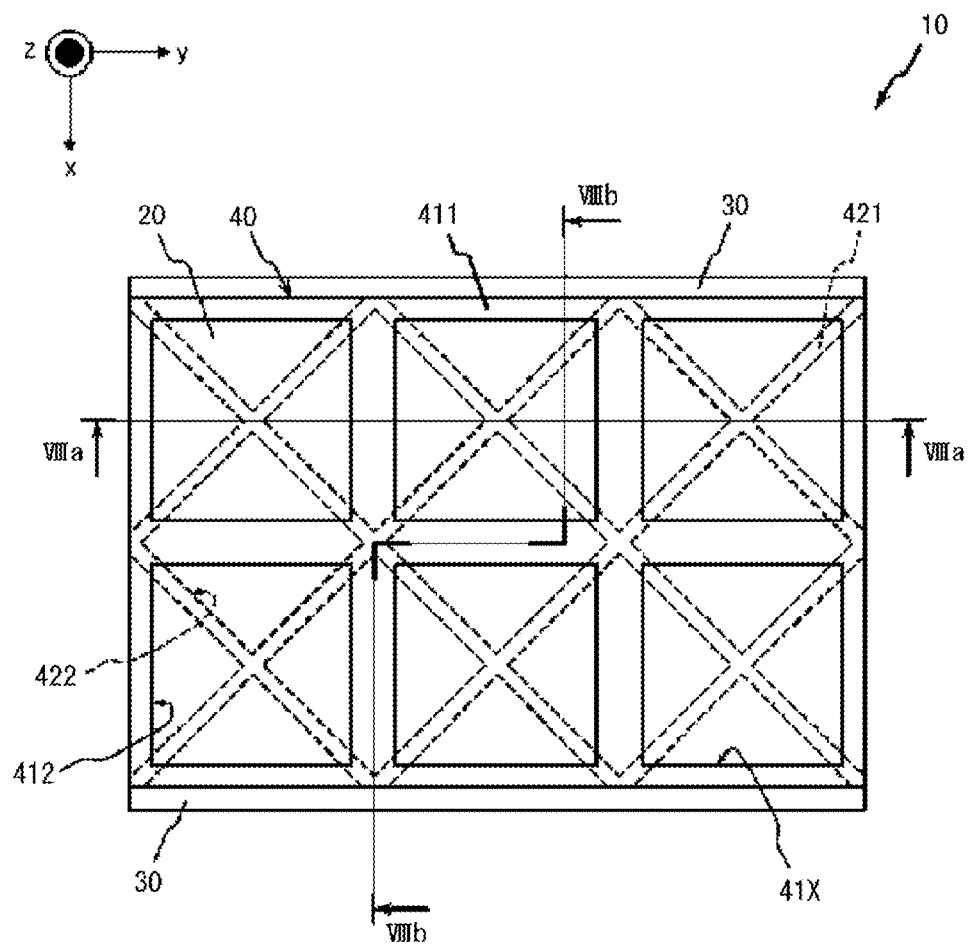
FIG. 7 is a plan view of the resonator illustrated in FIG. 6.
Figure 8A:
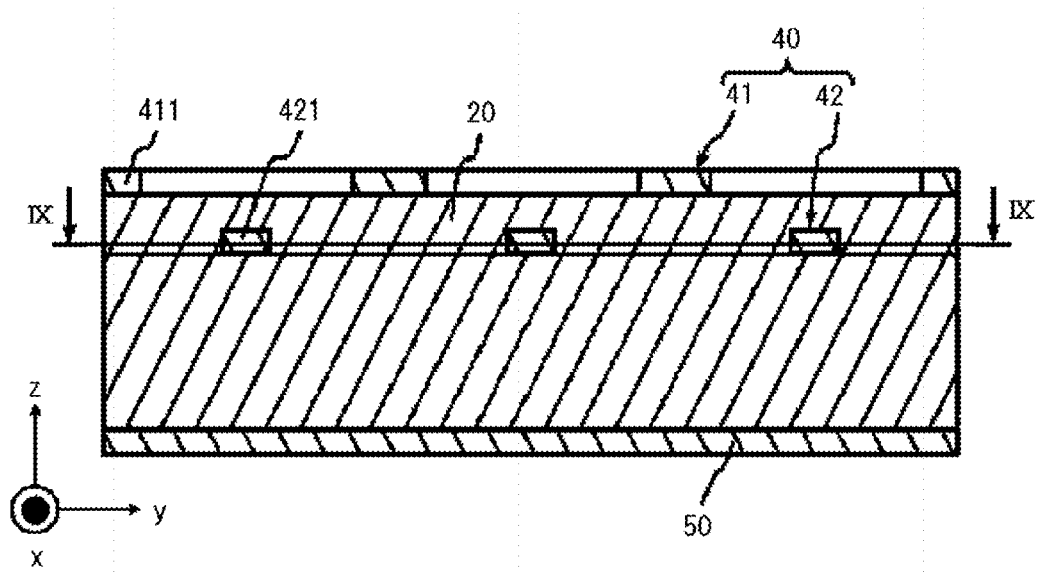
FIG. 8A is a cross-sectional view of the resonator illustrated in FIG. 6.
Figure 8B:
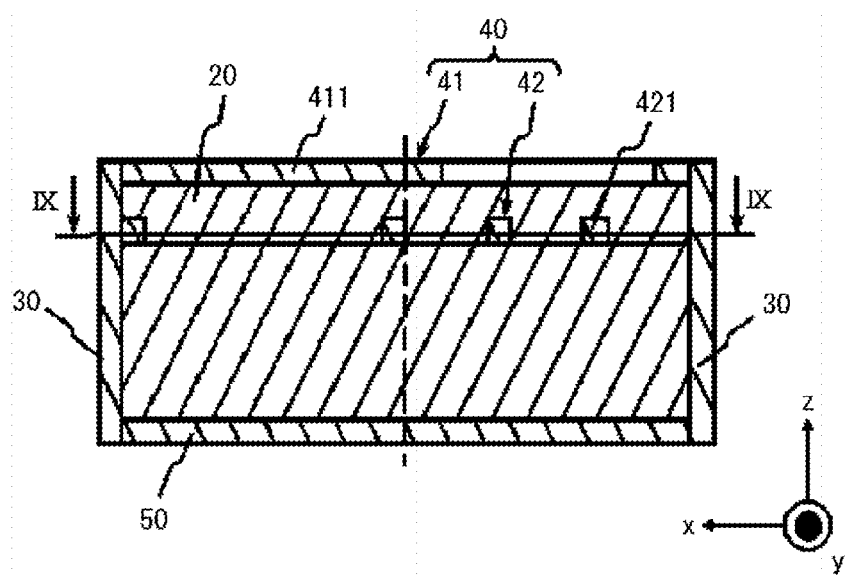
FIG. 8B is a cross-sectional view of the resonator illustrated in FIG. 6.
Figure 9:
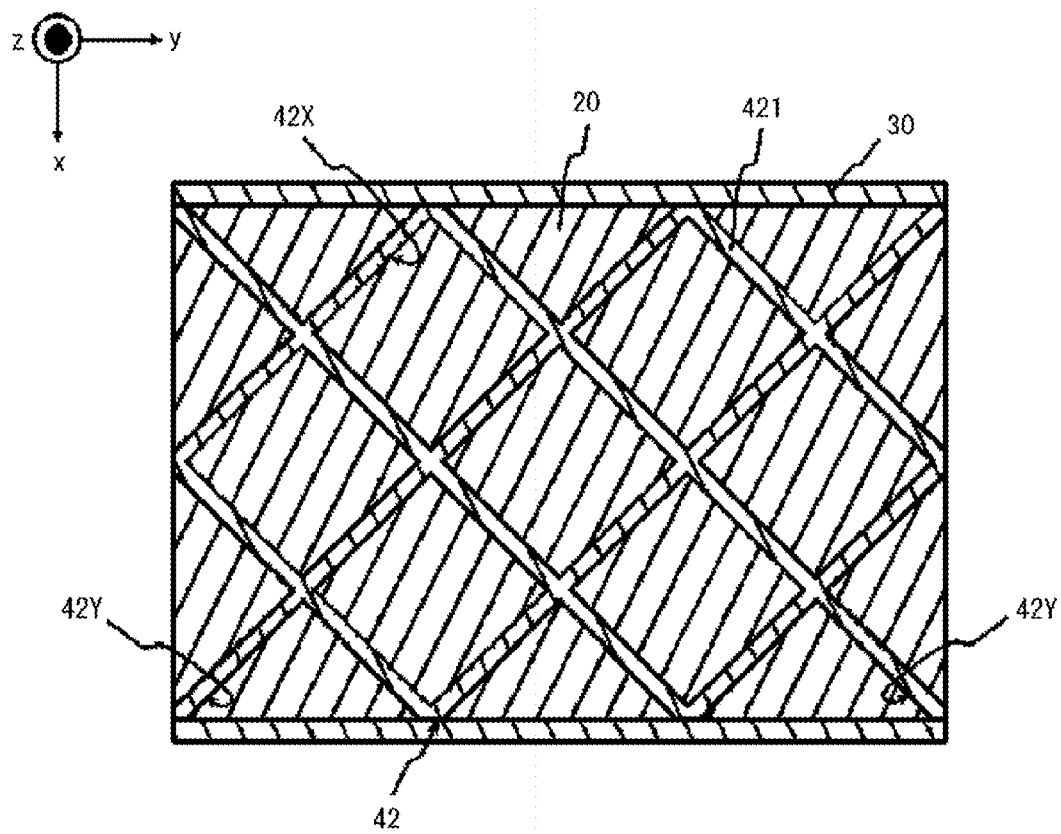
FIG. 9 is a cross-sectional view of the resonator illustrated in FIG. 6.

FIGS. 6 to 9 are views each illustrating the resonator 10 as an example of embodiments. FIG. 6 is a schematic view of the resonator 10. FIG. 7 is a plan view illustrating the xy plane viewed from the z direction. FIG. 8A is a cross-sectional view taken along line VIIIa-VIIIa illustrated in FIG. 7. FIG. 8B is a cross-sectional view taken along line VIIIb-VIIIb illustrated in FIG. 7. FIG. 9 is a cross-sectional view taken along line IX-IX illustrated in FIGS. 8A and 8B.

In the resonator 10 illustrated in FIGS. 6 to 9, the first conductive layer 41 includes a slot-type resonator as the first unit resonator 41X. The second conductive layer 42 includes a slot-type resonator as the second unit resonator 42X. The unit resonator 40X includes one first unit resonator 41X and four second divisional resonators 42Y. The unit structure 10X includes the unit resonator 40X, and a portion of the base 20 and a portion of the fourth conductor 50 that overlap the unit resonator 40X in the z direction.

Figure 10:
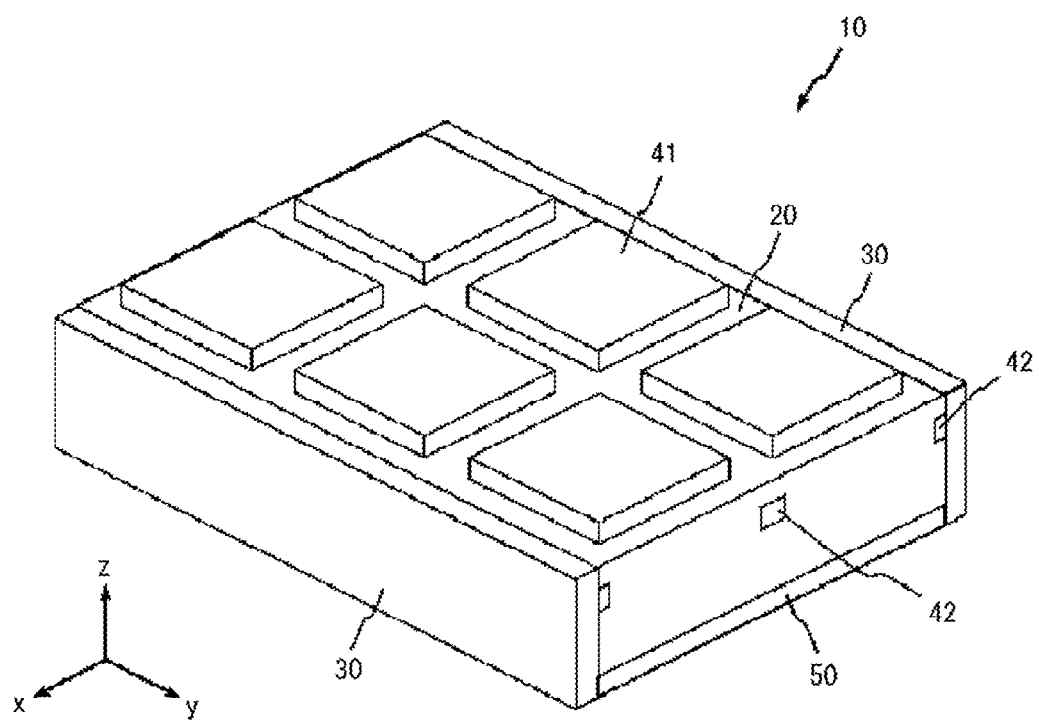
FIG. 10 is a perspective view illustrating an embodiment of a resonator.
Figure 11:
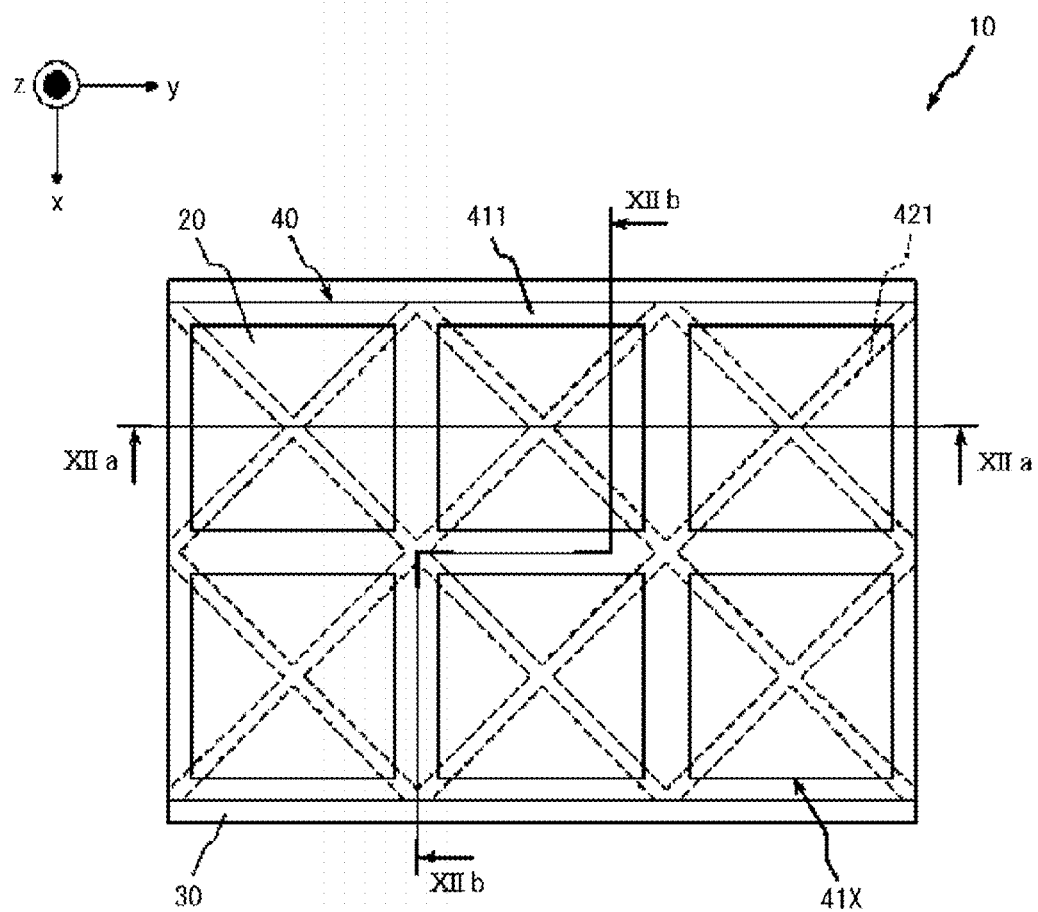
FIG. 11 is a plan view of the resonator illustrated in FIG. 10.
Figure 12A:
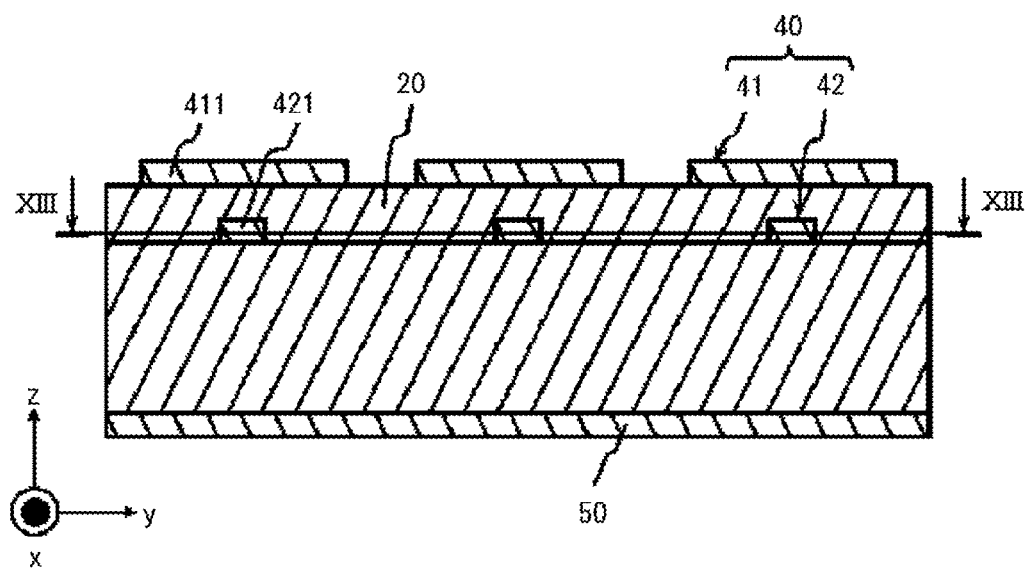
FIG. 12A is a cross-sectional view of the resonator illustrated in FIG. 10.
Figure 12B:
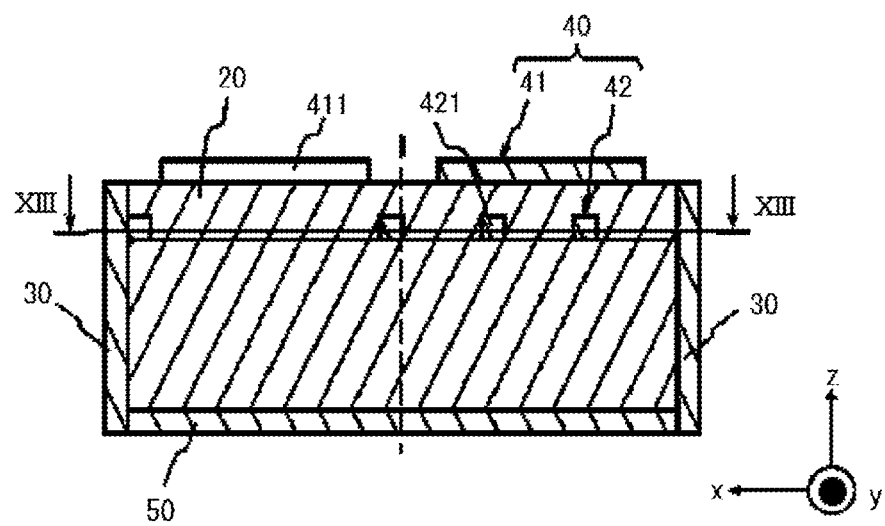
FIG. 12B is a cross-sectional view of the resonator illustrated in FIG. 10.
Figure 13:
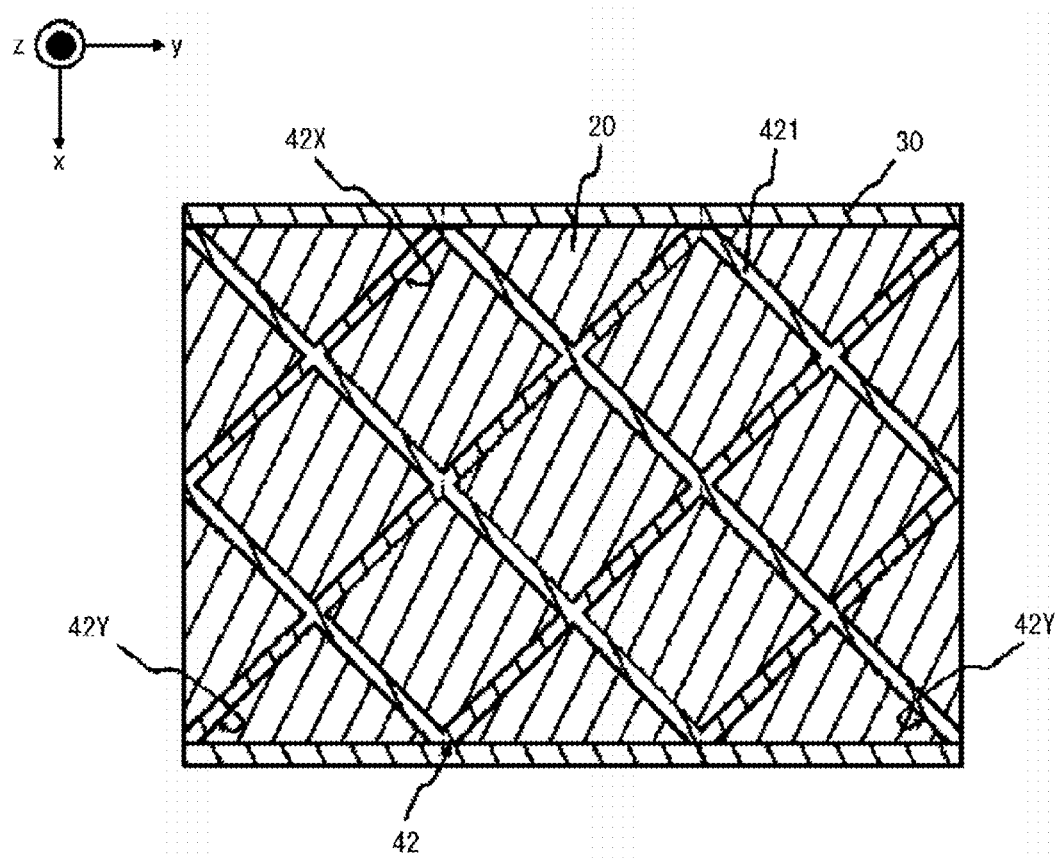
FIG. 13 is a cross-sectional view of the resonator illustrated in FIG. 10.

FIGS. 10 to 13 are views each illustrating the resonator 10 as an example of embodiments. FIG. 10 is a schematic view of the resonator 10. FIG. 11 is a plan view illustrating the xy plane viewed from the z direction. FIG. 12A is a cross-sectional view taken along line XIIa-XIIa illustrated in FIG. 11. FIG. 12B is a cross-sectional view taken along line XIIb-XIIb illustrated in FIG. 11. FIG. 13 is a cross-sectional view taken along line XIII-XIII illustrated in FIGS. 12A and 12B.

In the resonator 10 illustrated in FIGS. 10 to 13, the first conductive layer 41 includes a patch-type resonator as the first unit resonator 41X. The second conductive layer 42 includes a slot-type resonator as the second unit resonator 42X. The unit resonator 40X includes one first unit resonator 41X and four second divisional resonators 42Y. The unit structure 10X includes the unit resonator 40X, and a portion of the base 20 and a portion of the fourth conductor 50 that overlap the unit resonator 40X in the z direction.

Figure 14:
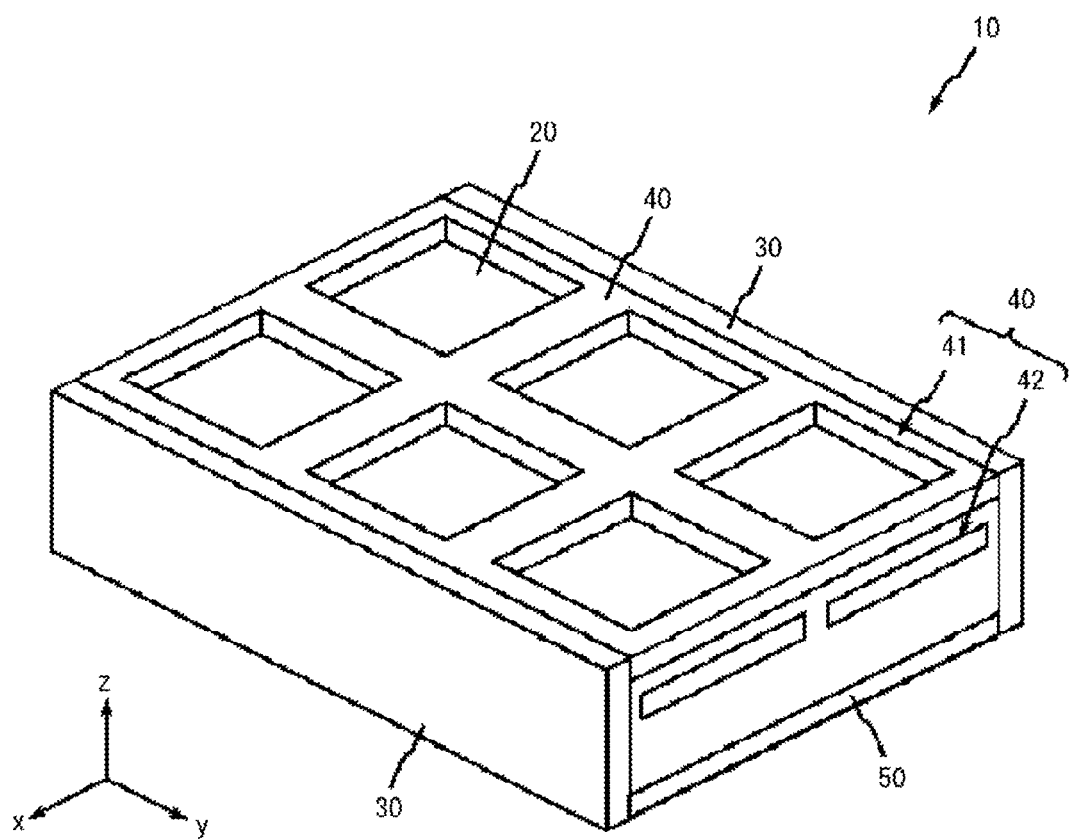
FIG. 14 is a perspective view illustrating an embodiment of a resonator.
Figure 15:
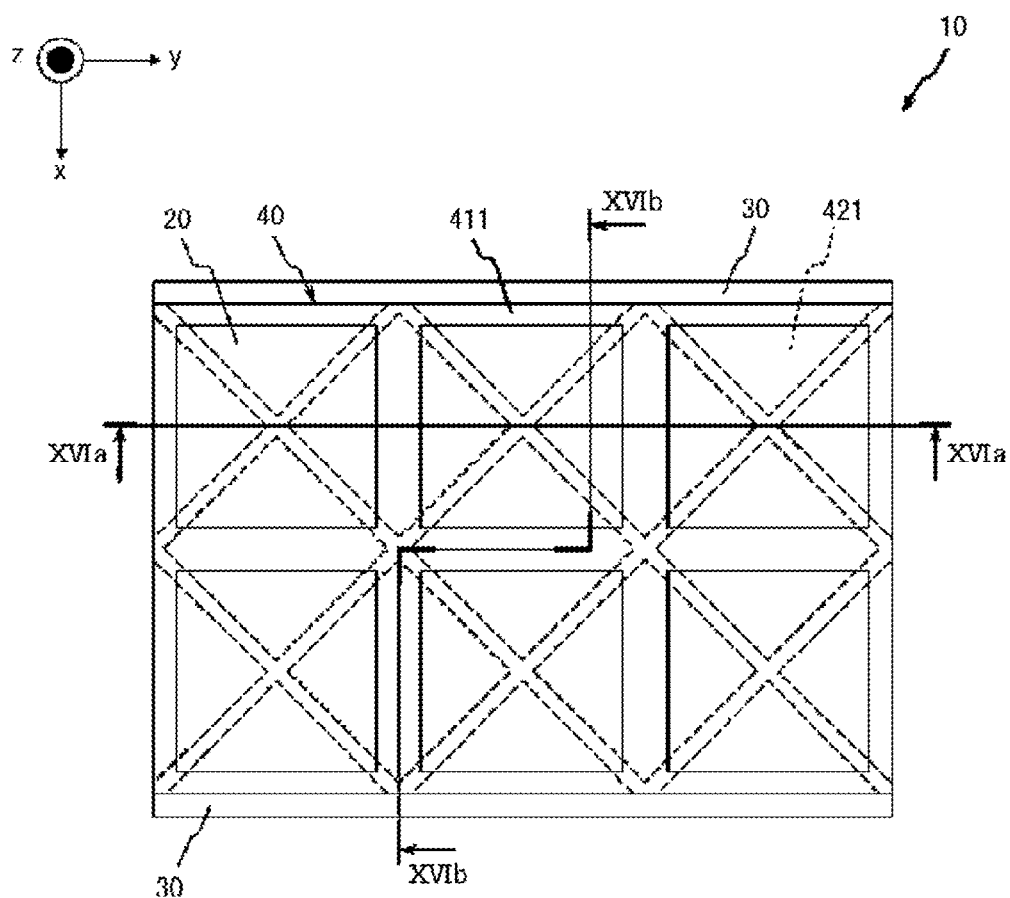
FIG. 15 is a plan view of the resonator illustrated in FIG. 14.
Figure 16A:
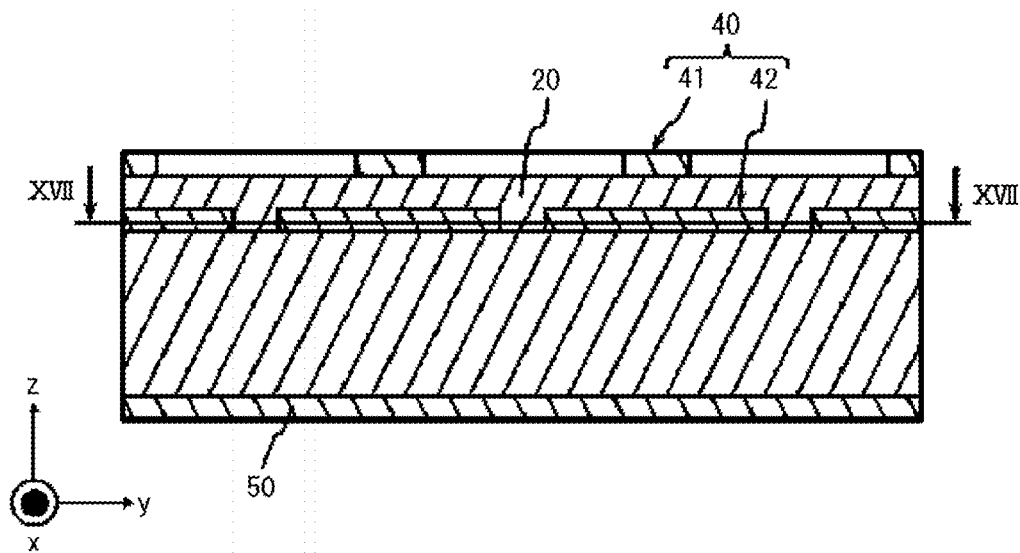
FIG. 16A is a cross-sectional view of the resonator illustrated in FIG. 14.
Figure 16B:
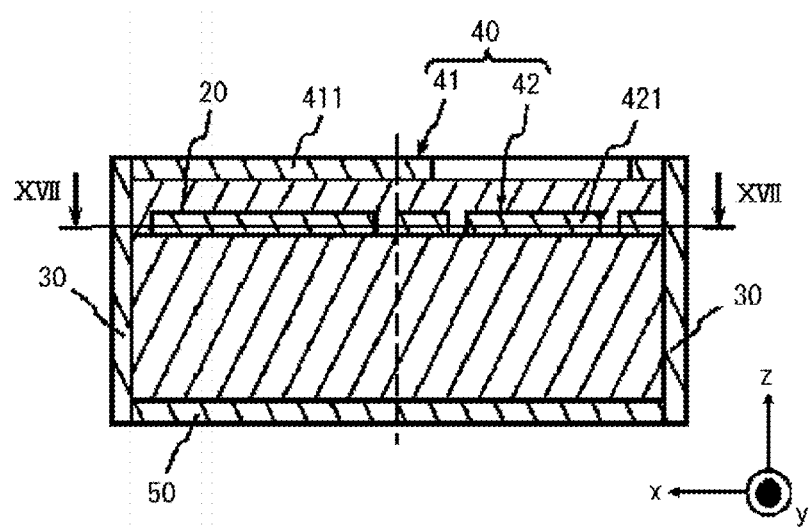
FIG. 16B is a cross-sectional view of the resonator illustrated in FIG. 14.
Figure 17:
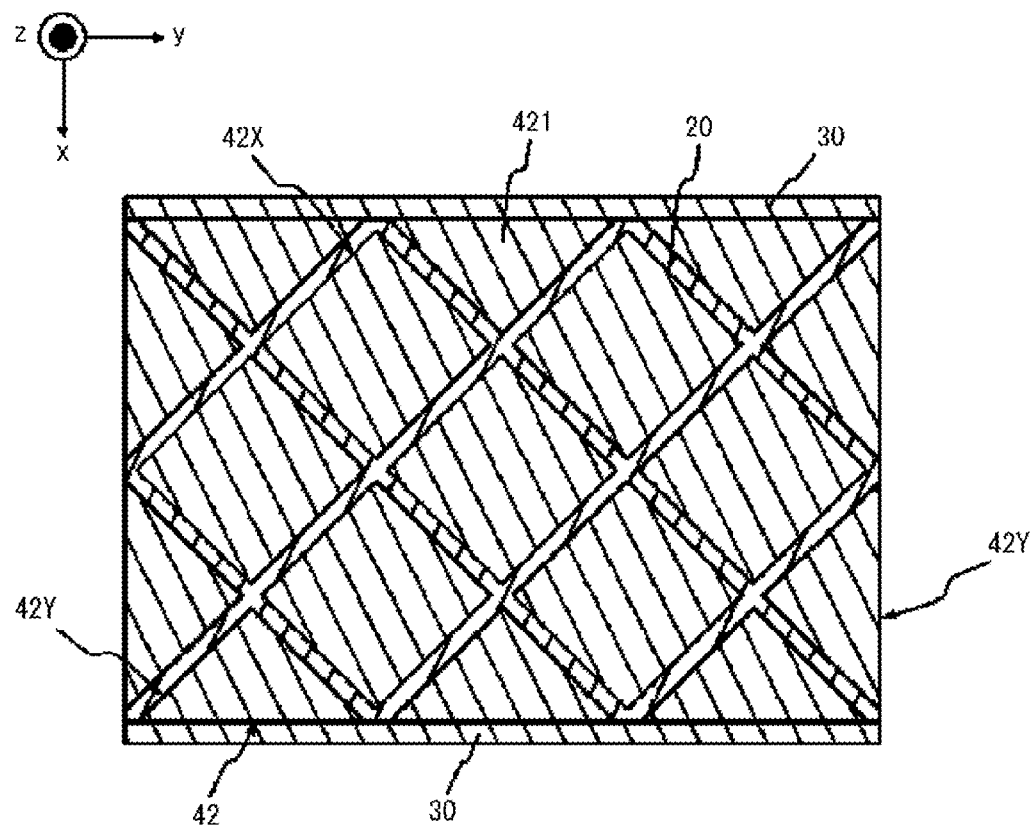
FIG. 17 is a cross-sectional view of the resonator illustrated in FIG. 14.

FIGS. 14 to 17 are views each illustrating the resonator 10 as an example of embodiments. FIG. 14 is a schematic view of the resonator 10. FIG. 15 is a plan view illustrating the xy plane viewed from the z direction. FIG. 16A is a cross-sectional view taken along line XVIa-XVIa illustrated in FIG. 15. FIG. 16B is a cross-sectional view taken along line XVIb-XVIb illustrated in FIG. 15. FIG. 17 is a cross-sectional view taken along line XVII-XVII illustrated in FIGS. 16A and 16B.

In the resonator 10 illustrated in FIGS. 14 to 17, the first conductive layer 41 includes a slot-type resonator as the first unit resonator 41X. The second conductive layer 42 includes a patch-type resonator as the second unit resonator 42X. The unit resonator 40X includes one first unit resonator 41X and four second divisional resonators 42Y. The unit structure 10X includes the unit resonator 40X, and a portion of the base 20 and a portion of the fourth conductor 50 that overlap the unit resonator 40X in the z direction.

Figure 18:
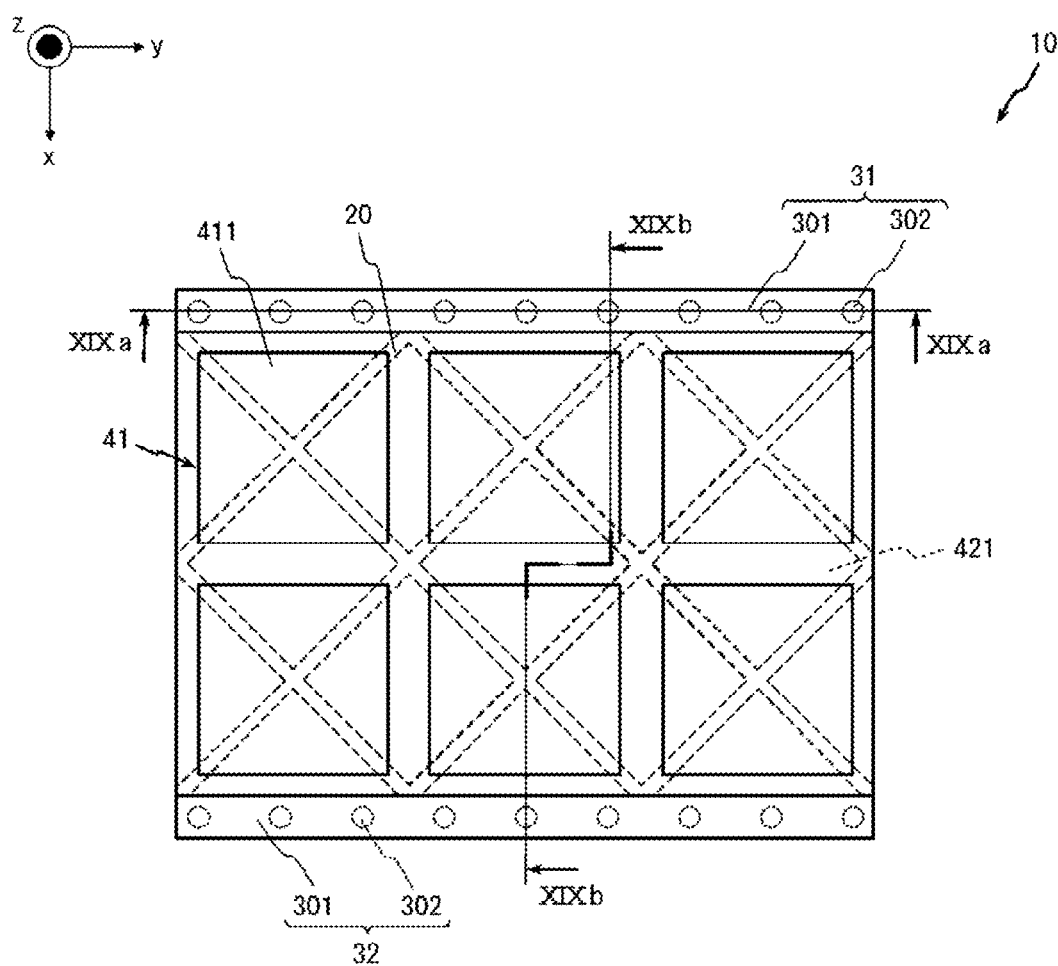
FIG. 18 is a plan view illustrating an embodiment of a resonator.
Figure 19A:
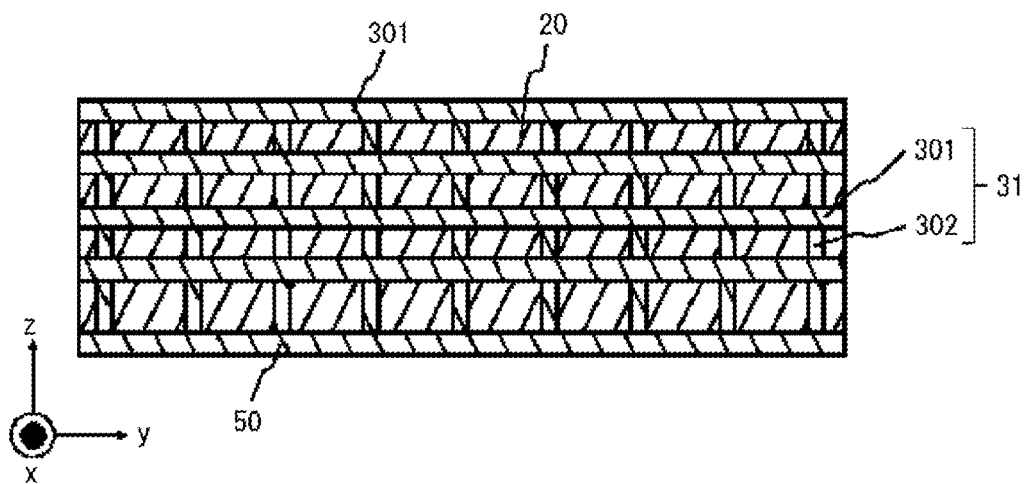
FIG. 19A is a cross-sectional view of the resonator illustrated in FIG. 18.
Figure 19B:
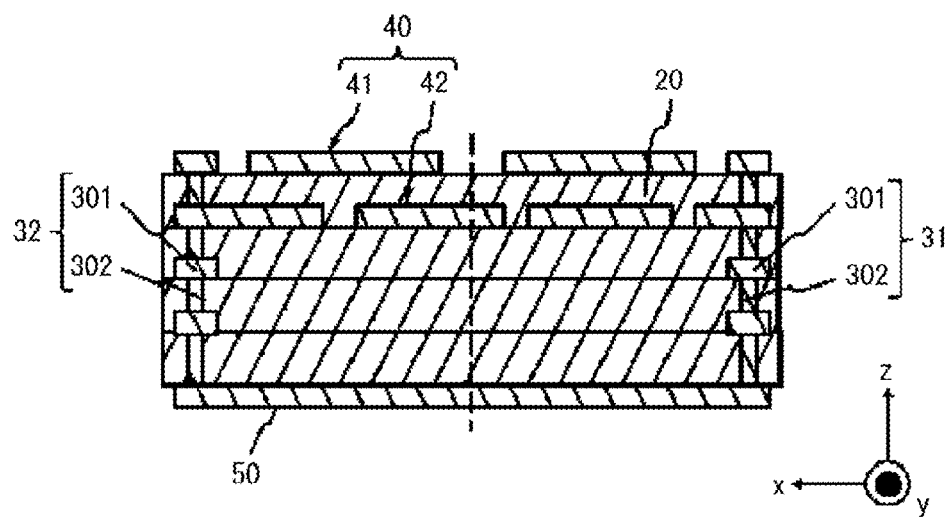
FIG. 19B is a cross-sectional view of the resonator illustrated in FIG. 18.

The resonator 10 illustrated in each of FIGS. 1 to 17 is an example. The configuration of the resonator 10 is not limited to the structures illustrated in FIGS. 1 to 17. FIG. 18 is a view illustrating the resonator 10 including pair conductors 30 having another configuration. FIG. 19A is a cross-sectional view taken along line XIXa-XIXa illustrated in FIG. 18. FIG. 19B is a cross-sectional view taken along line XIXb-XIXb illustrated in FIG. 18.

Figure 20:
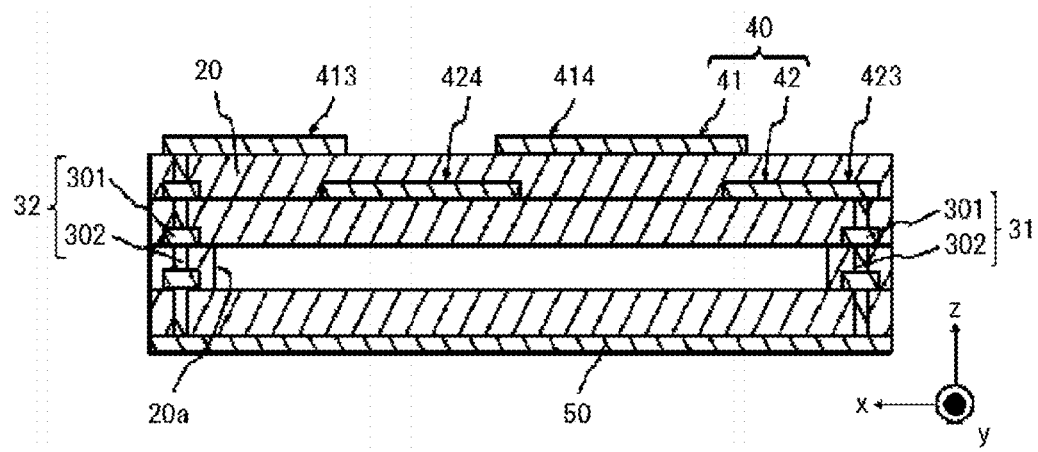
FIG. 20 is a cross-sectional view illustrating an embodiment of a resonator.

The base 20 illustrated in each of FIGS. 1 to 19 is an example. The configuration of the base 20 is not limited to the configurations illustrated in FIGS. 1 to 19. The base 20 can have a cavity 20a therein, as illustrated in FIG. 20. The cavity 20a is positioned between the third conductor 40 and the fourth conductor 50 in the z direction. The dielectric constant in the cavity 20a is lower than that of the base 20. Since the base 20 has the cavity 20a, an electromagnetic distance between the third conductor 40 and the fourth conductor 50 can be shortened.

Figure 21:
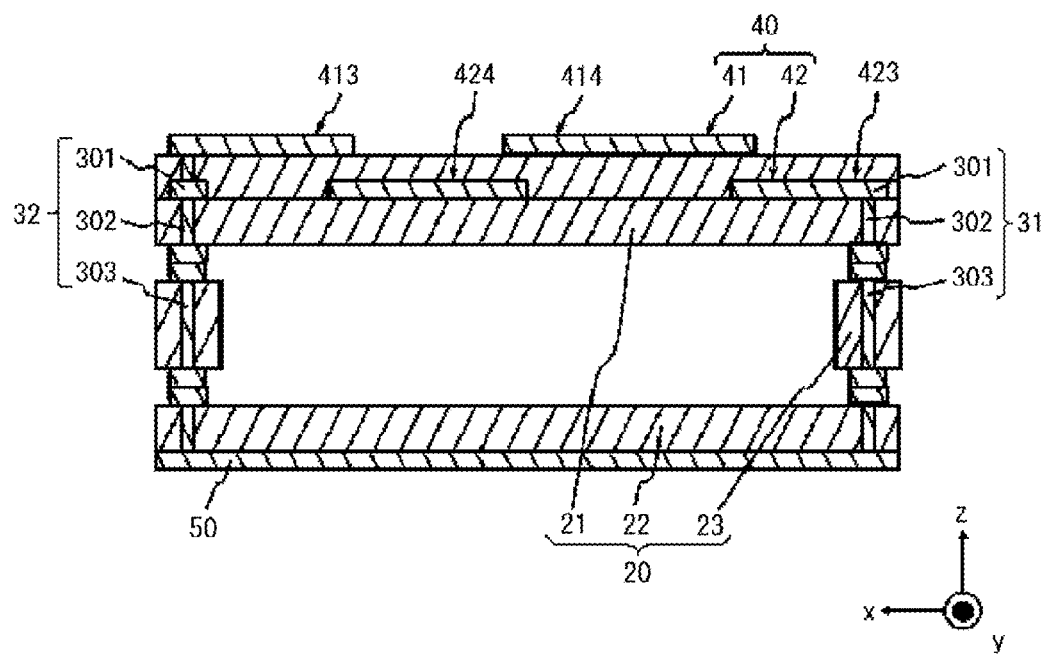
FIG. 21 is a plan view of an embodiment of a resonator.

The base 20 can include a plurality of members, as illustrated in FIG. 21. The base 20 can include a first base 21, a second base 22, and a connector 23. The first base 21 and the second base 22 can be mechanically connected via the connector 23. The connector 23 can include a sixth conductor 303 therein. The sixth conductor 303 is electrically connected to the fourth conductor 301 or the fifth conductor 302. The sixth conductor 303 forms the first conductor 31 or the second conductor 32, in combination with the fourth conductor 301 and the fifth conductor 302.

Figure 22A:
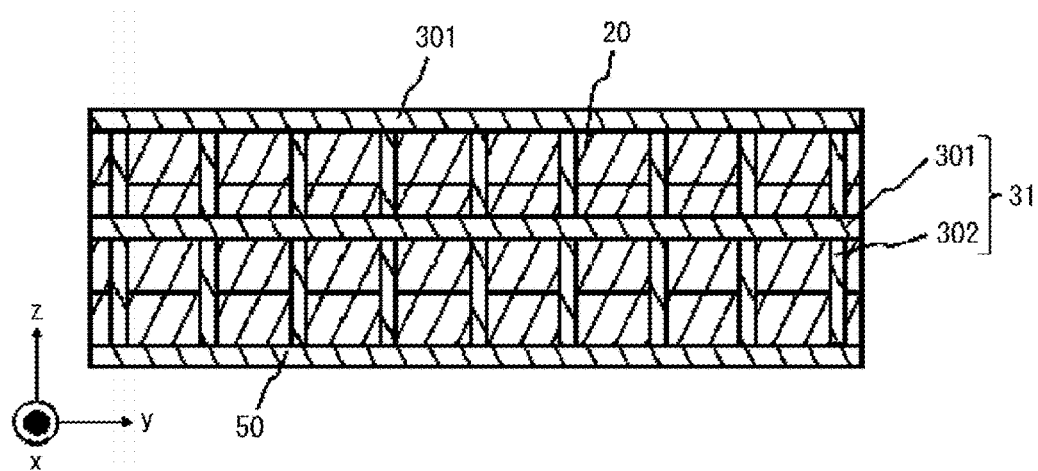
FIG. 22A is a cross-sectional view illustrating an embodiment of a resonator.
Figure 22B:
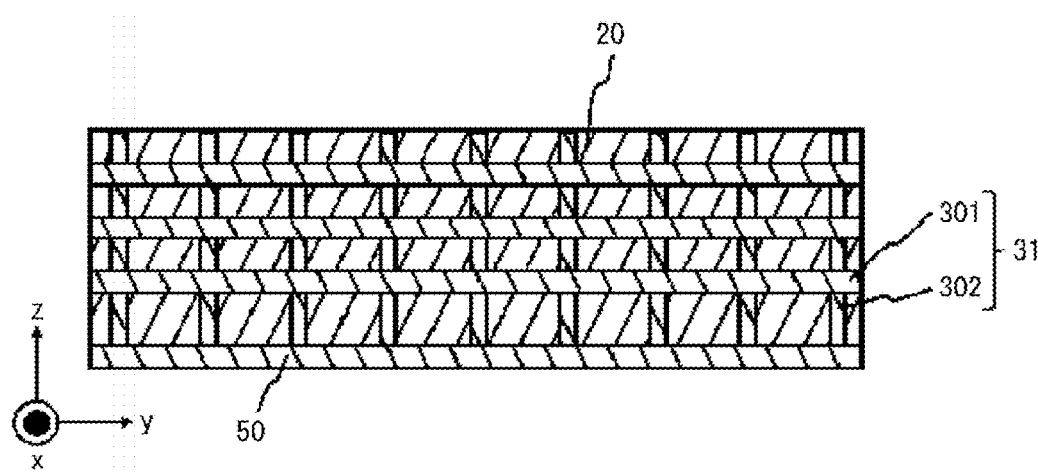
FIG. 22B is a cross-sectional view illustrating an embodiment of a resonator.
Figure 22C:
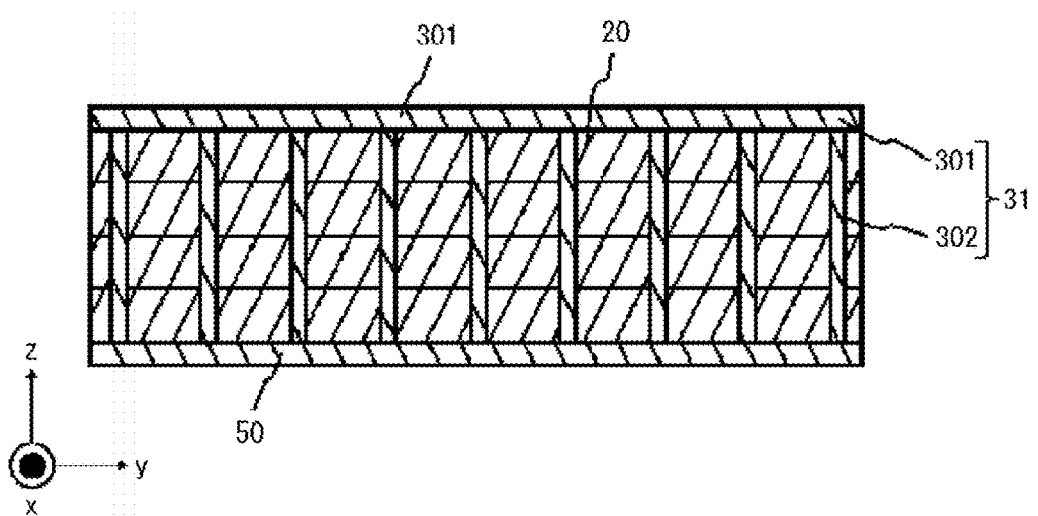
FIG. 22C is a cross-sectional view illustrating an embodiment of a resonator.

The pair conductors 30 illustrated in each of FIGS. 1 to 21 is an example. The configuration of the pair conductors 30 is not limited to the configurations illustrated in FIGS. 1 to 21. FIGS. 22 to 28 are views illustrating the resonator 10 including pair conductors 30 having another configuration. FIG. 22 is a cross-sectional view corresponding to FIG. 19A. As illustrated in FIG. 22A, the number of fifth conductive layers 301 can be changed as appropriate. As illustrated in FIG. 22B, the fifth conductive layer 301 does not have to be positioned on the base 20. As illustrated in FIG. 22B, the fifth conductive layer 301 does not have to be positioned inside the base 20.

Figure 23:
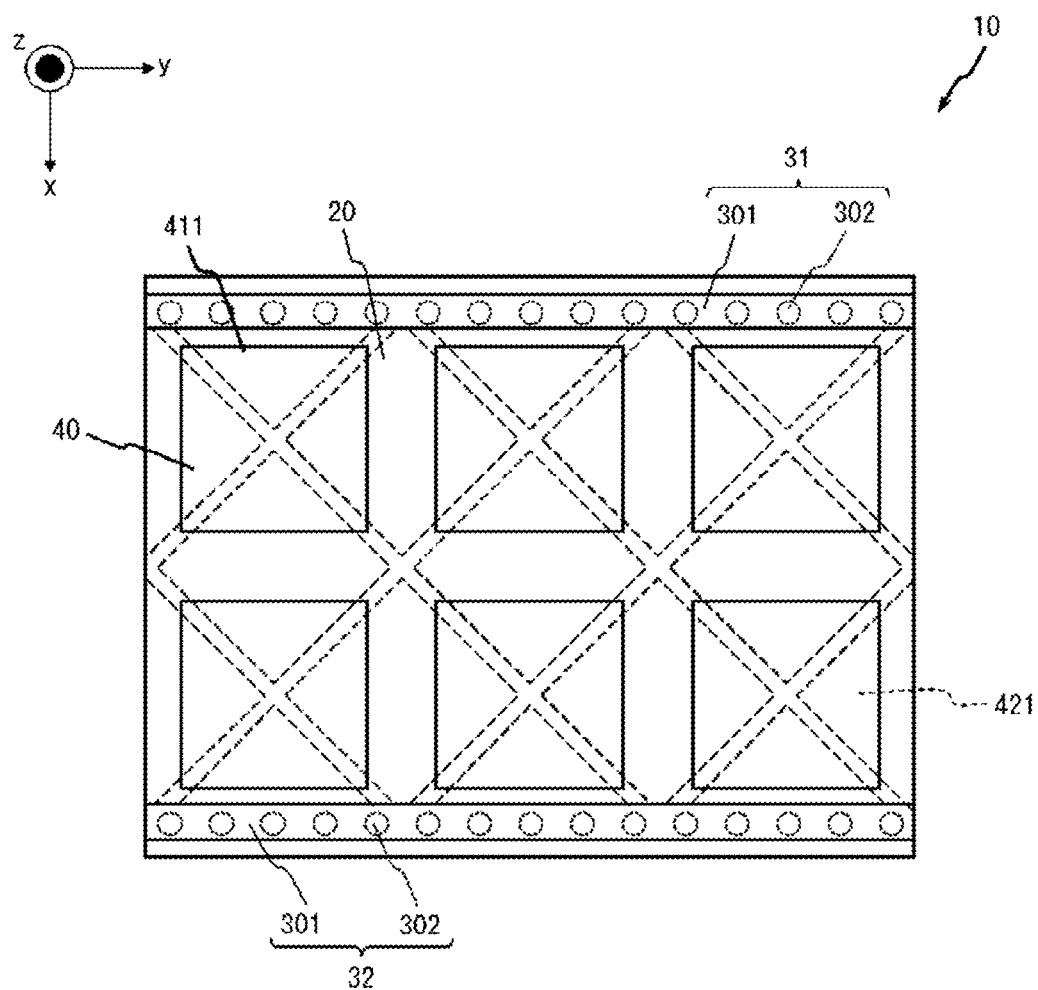
FIG. 23 is a plan view of an embodiment of a resonator.
Figure 24:
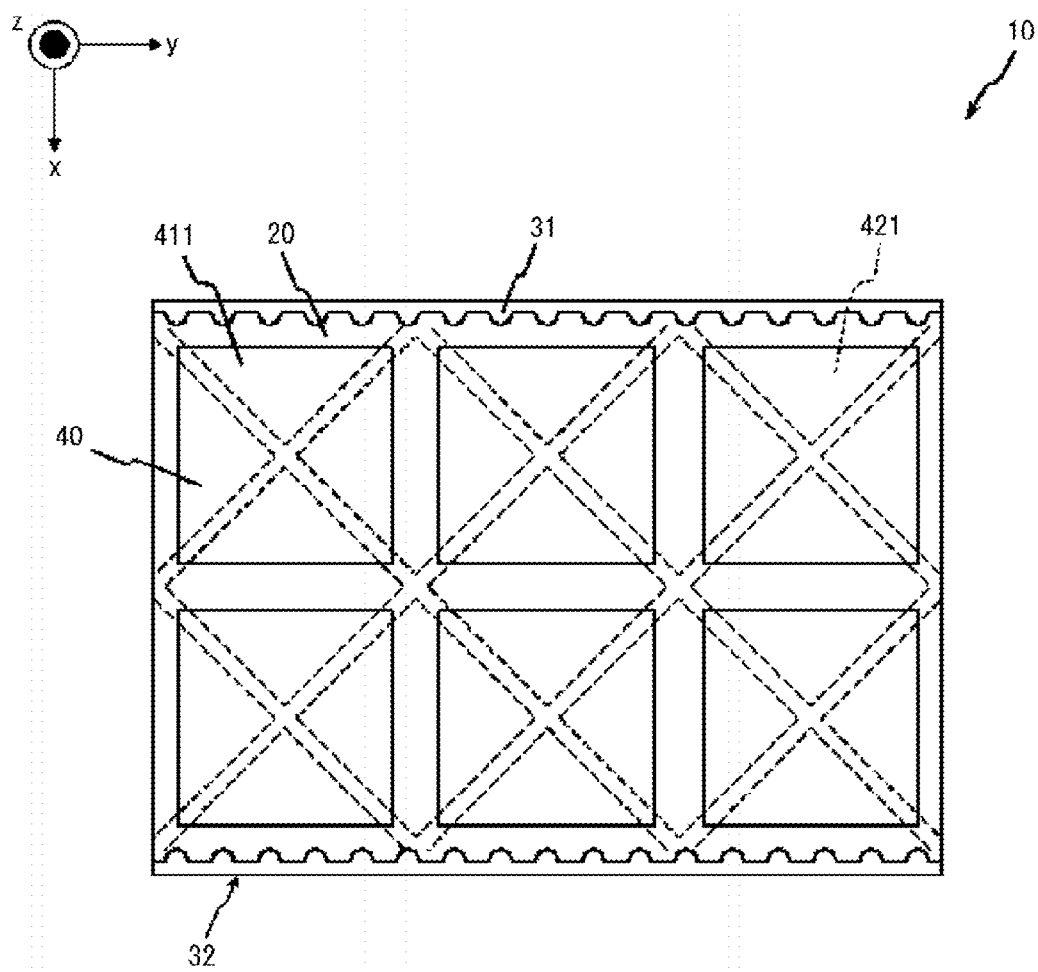
FIG. 24 is a plan view of an embodiment of a resonator.

FIG. 23 is a plan view corresponding to FIG. 18. As illustrated in FIG. 23, in the resonator 10, the fifth conductor 302 can be separate from the boundary of the unit resonator 40X. FIG. 24 is a plan view corresponding to FIG. 18. As illustrated in FIG. 24, each of two pair conductors 30 can have a protruding portion that protrudes toward the other pair conductor 30 that is paired therewith. Such a resonator 10 can be formed, for example, by applying a metal paste to the base 20 having recessed portions and hardening the metal paste.

Figure 25:
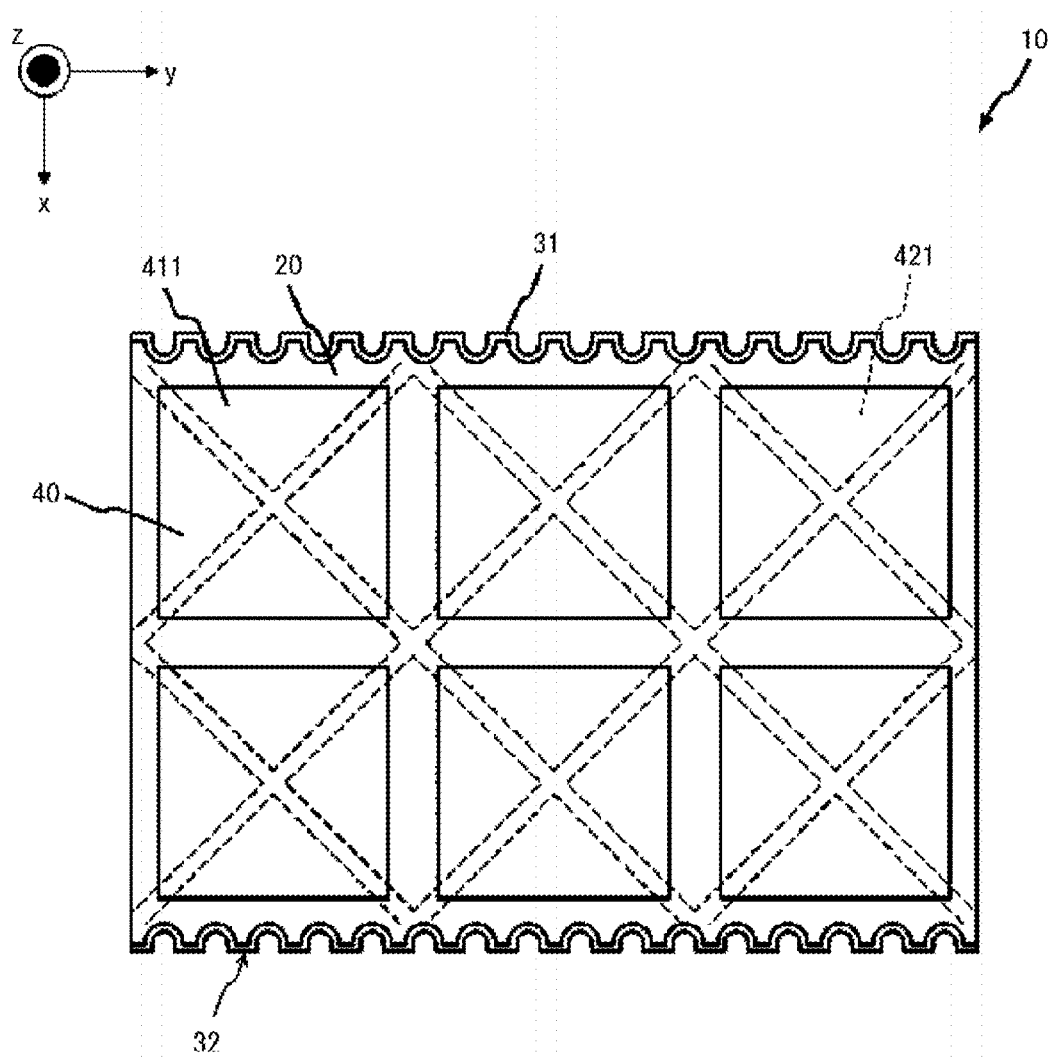
FIG. 25 is a plan view of an embodiment of a resonator.

FIG. 25 is a plan view corresponding to FIG. 18. As illustrated in FIG. 25, the base 20 can have recessed portions. As illustrated in FIG. 25, the pair conductors 30 each have recessed portions that are recessed inward from an outer surface in the x direction. As illustrated in FIG. 25, the pair conductors 30 each extend along a surface of the base 20. Such a resonator 10 can be formed, for example, by spraying a fine metal material on the base 20 having recessed portions.

Figure 26:
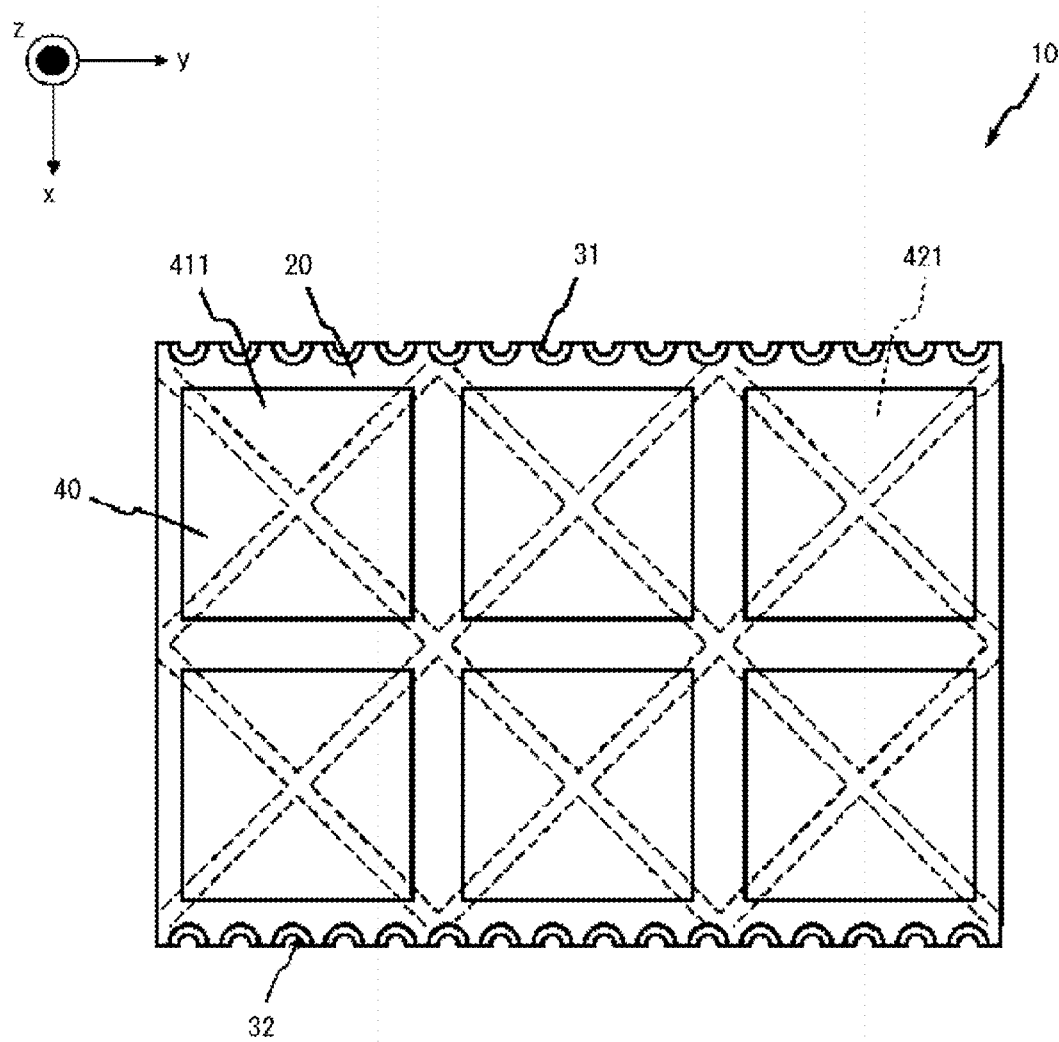
FIG. 26 is a plan view of an embodiment of a resonator.

FIG. 26 is a plan view corresponding to FIG. 18. As illustrated in FIG. 26, the base 20 can have recessed portions. As illustrated in FIG. 25, the pair conductors 30 each have recessed portions that are recessed inward from an outer surface in the x direction. As illustrated in FIG. 26, the pair conductors 30 each extend along the recessed portions of the base 20. Such a resonator 10 can be produced, for example, by dividing a mother substrate along a row of through-hole conductors. Such pair conductors 30 can be referred to as castellated holes or the like.

Figure 27:
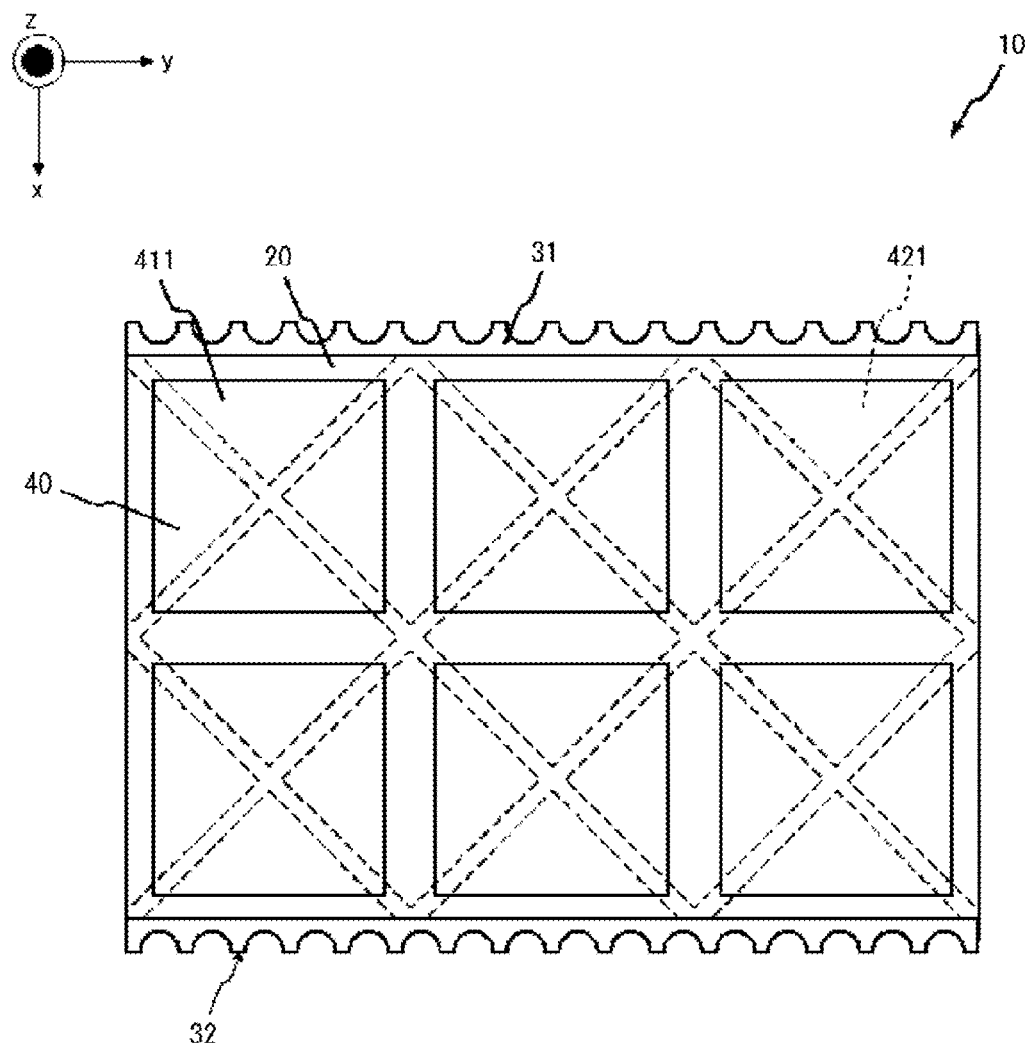
FIG. 27 is a plan view of an embodiment of a resonator.

FIG. 27 is a plan view corresponding to FIG. 18. As illustrated in FIG. 27, the base 20 can have recessed portions. As illustrated in FIG. 27, the pair conductors 30 each have recessed portions that are recessed inward from an outer surface in the x direction. Such a resonator 10 can be produced, for example, by dividing a mother substrate along a row of through-hole conductors. Such pair conductors 30 can be referred to as castellated holes or the like.

Figure 28:
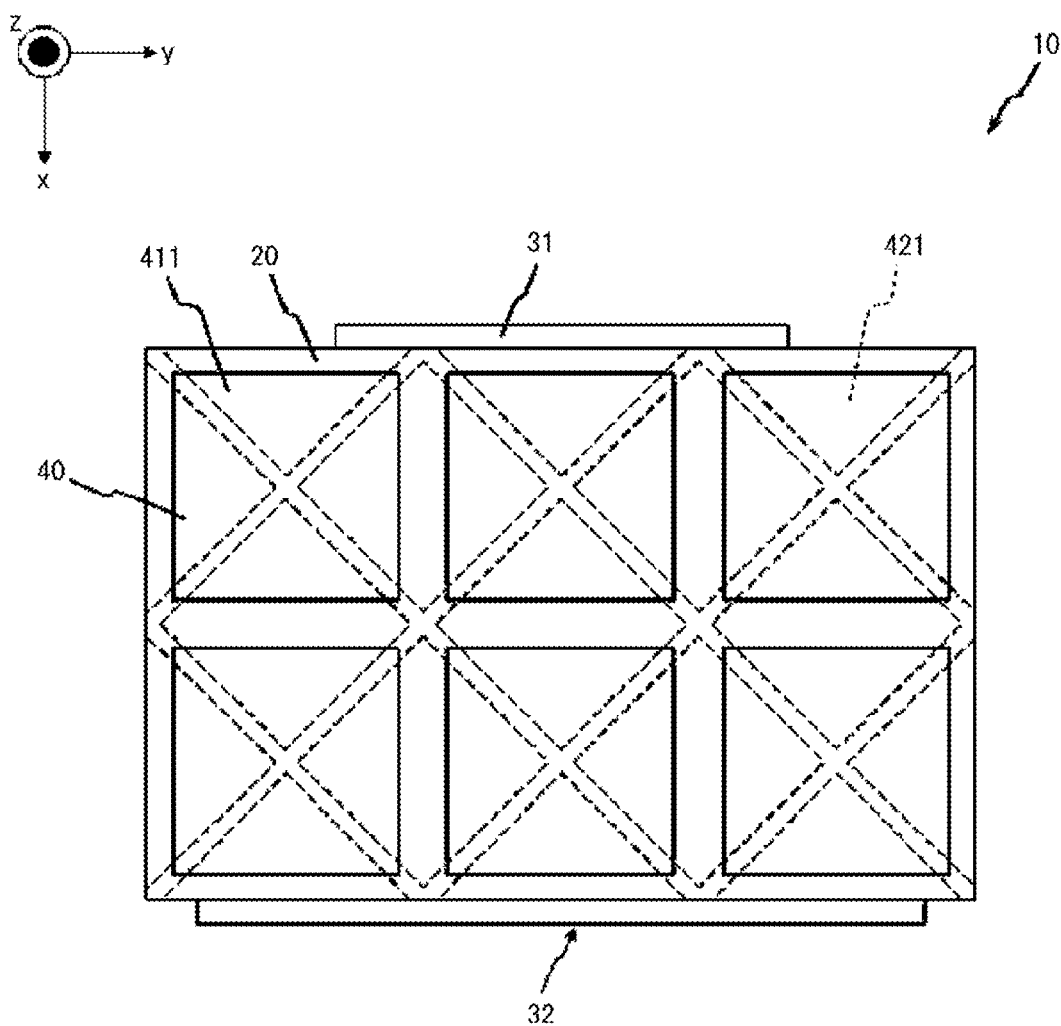
FIG. 28 is a plan view of an embodiment of a resonator.

FIG. 28 is a plan view corresponding to FIG. 18. As illustrated in FIG. 28, the pair conductors 30 may each have a smaller length in the x direction than that of the base 20. The configuration of the pair conductors 30 is not limited thereto. Two pair conductors 30 can have different configurations. For example, one of the pair conductors 30 can include the fifth conductive layer 301 and the fifth conductor 302, and the other one of the pair conductors 30 can be a castellated hole.

Figure 29A:
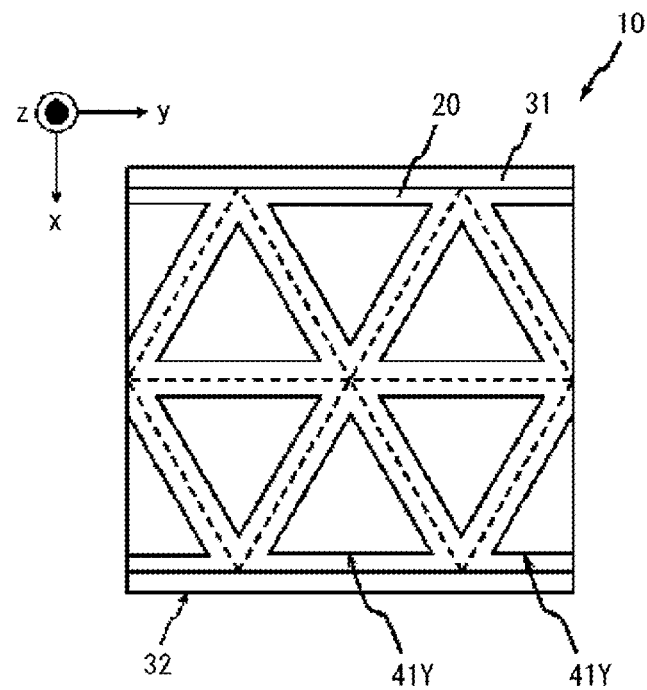
FIG. 29A is a plan view of an embodiment of a resonator.
Figure 29B:
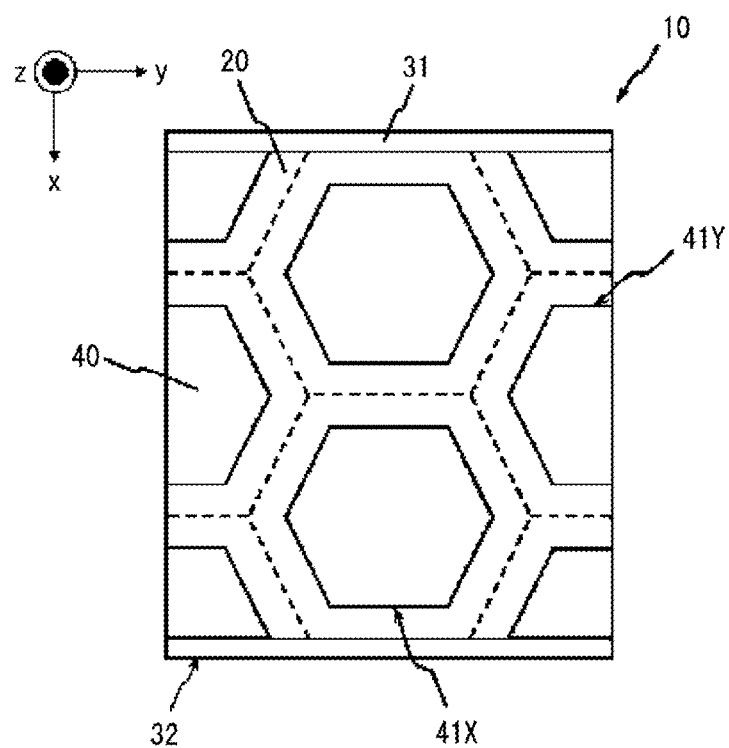
FIG. 29B is a plan view of an embodiment of a resonator.
Figure 30:
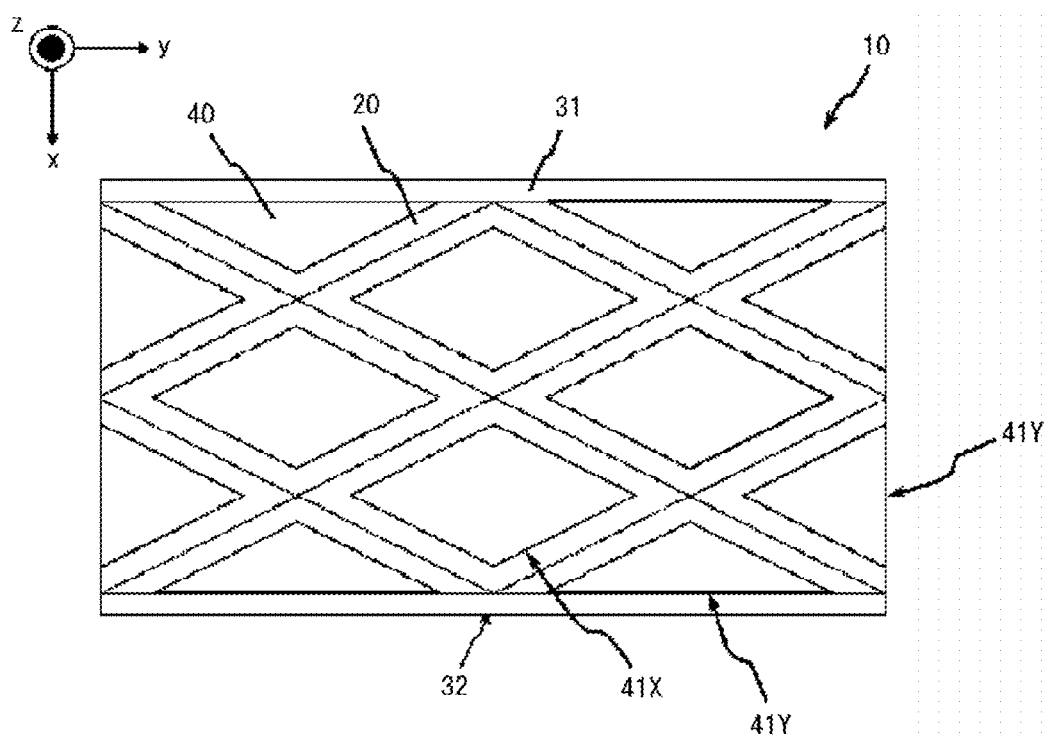
FIG. 30 is a plan view of an embodiment of a resonator.

The third conductor 40 illustrated in each of FIGS. 1 to 28 is an example. The configuration of the third conductor 40 is not limited to the configurations illustrated in FIGS. 1 to 28. The unit resonator 40X, the first unit resonator 41X, and the second unit resonator 42X are not limited to have a rectangular shape. The unit resonator 40X, the first unit resonator 41X, and the second unit resonator 42X can be referred to as the unit resonator 40X or the like. For example, the unit resonator 40X or the like may have a triangular shape as illustrated in FIG. 29A or may have a hexagonal shape as illustrated in FIG. 29B. As illustrated in FIG. 30, each side of the unit resonator 40X or the like can extend in a direction different from the x direction and the y direction. In the third conductor 40, the second conductive layer 42 can be positioned on the base 20 and the first conductive layer 41 can be positioned inside the base 20. In the third conductor 40, the second conductive layer 42 can be positioned farther from the fourth conductor 50 than the first conductive layer 41 is.

Figure 31A:
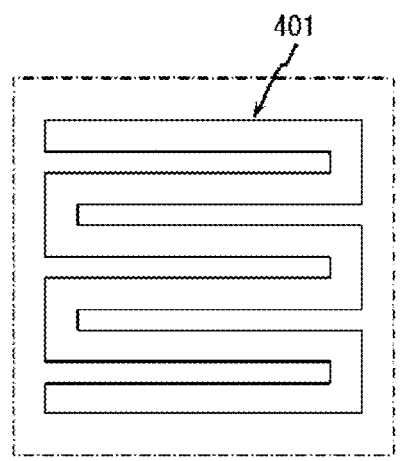
FIG. 31A is a schematic view illustrating an example of a resonator.
Figure 31B:
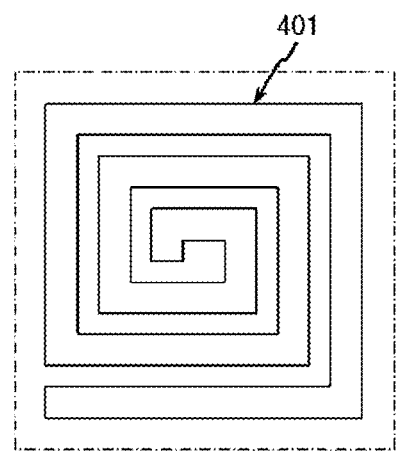
FIG. 31B is a schematic view illustrating an example of a resonator.
Figure 31C:
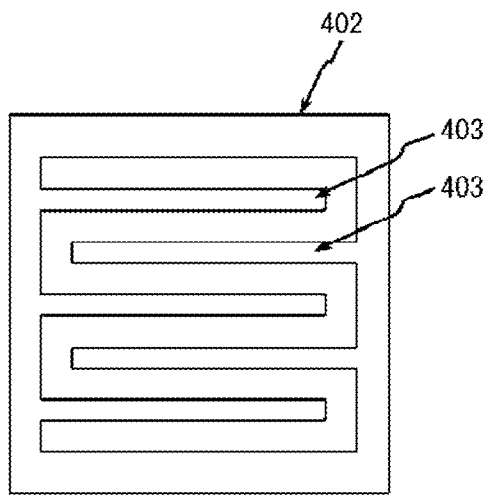
FIG. 31C is a schematic view illustrating an example of a resonator.
Figure 31D:
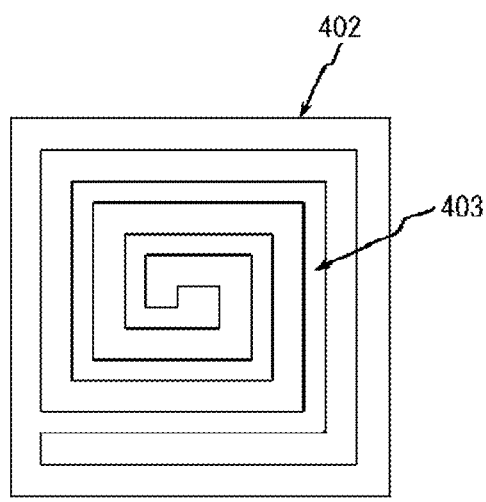
FIG. 31D is a schematic view illustrating an example of a resonator.
Figure 32A:
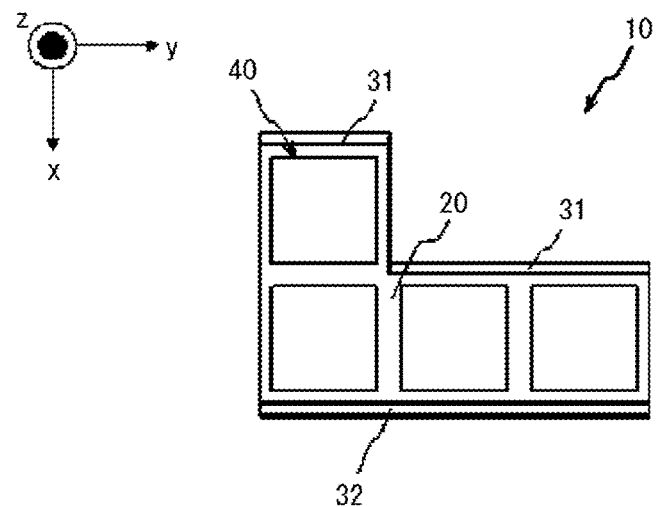
FIG. 32A is a plan view of an embodiment of a resonator.
Figure 32B:
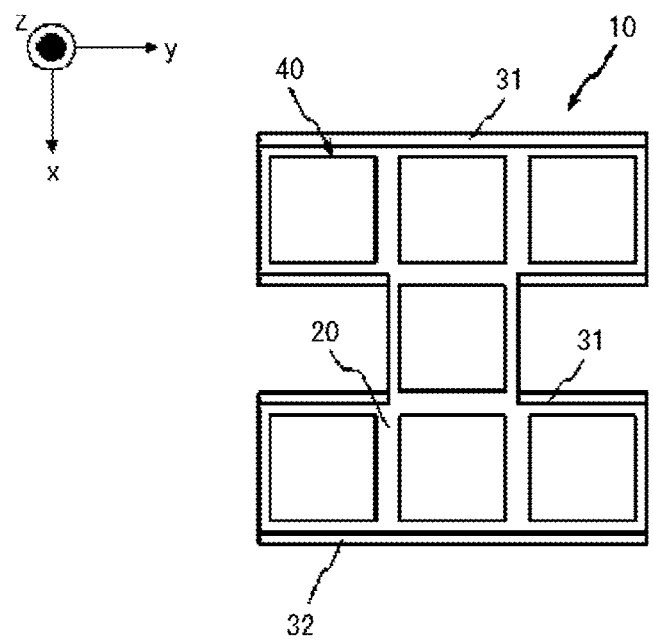
FIG. 32B is a plan view of an embodiment of a resonator.
Figure 32C:
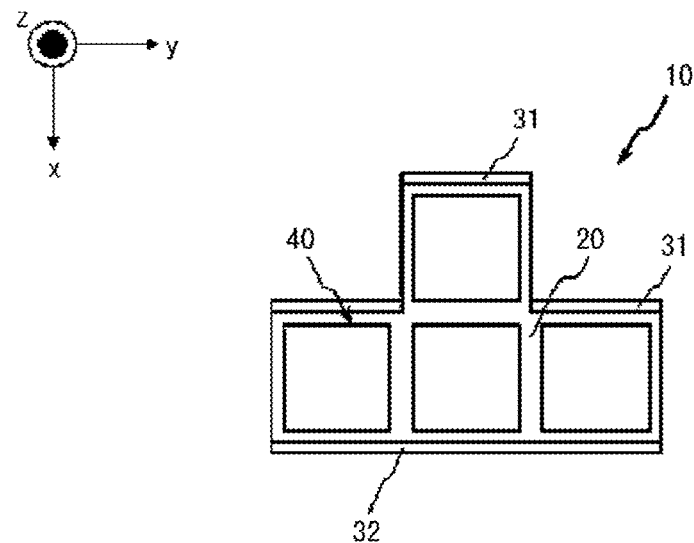
FIG. 32C is a plan view of an embodiment of a resonator.
Figure 32D:
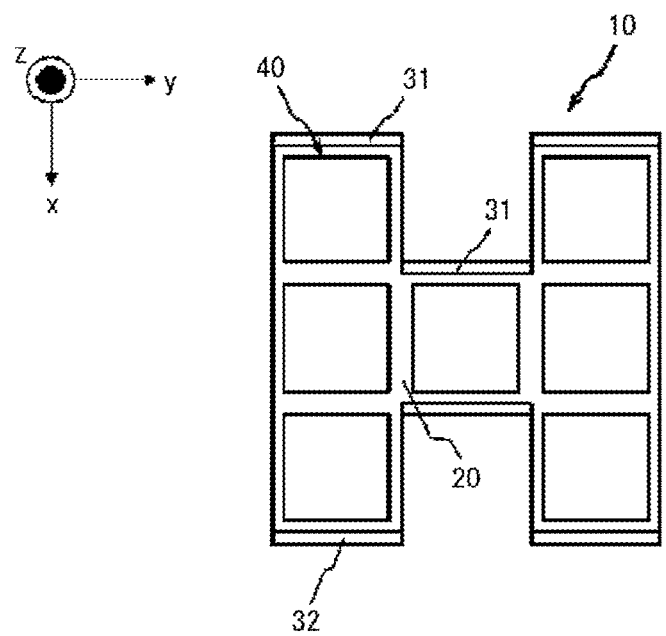
FIG. 32D is a plan view of an embodiment of a resonator.
Figure 33A:
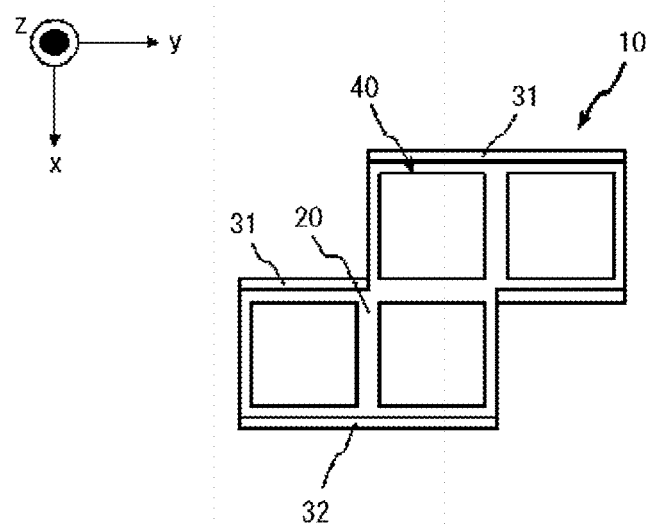
FIG. 33A is a plan view of an embodiment of a resonator.
Figure 33B:
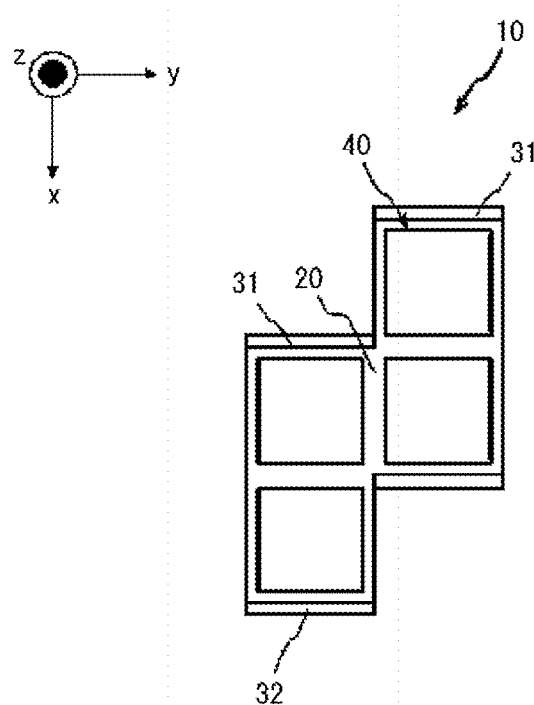
FIG. 33B is a plan view of an embodiment of a resonator.
Figure 33C:
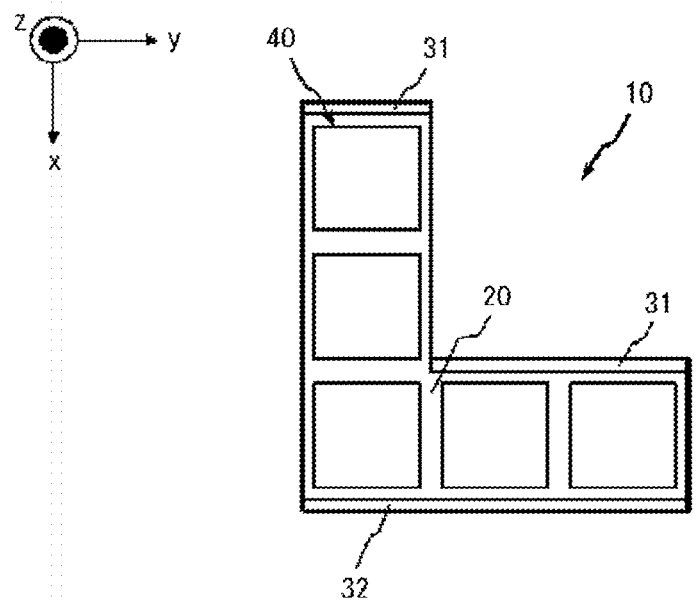
FIG. 33C is a plan view of an embodiment of a resonator.
Figure 33D:
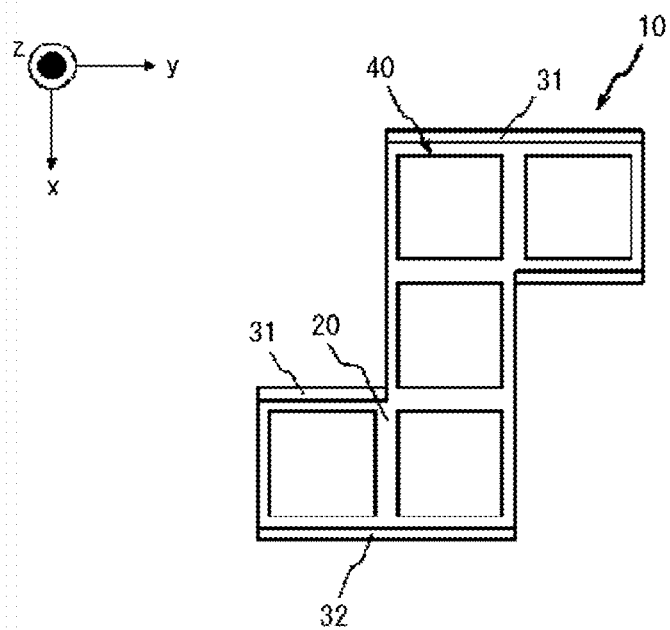
FIG. 33D is a plan view of an embodiment of a resonator.
Figure 34A:
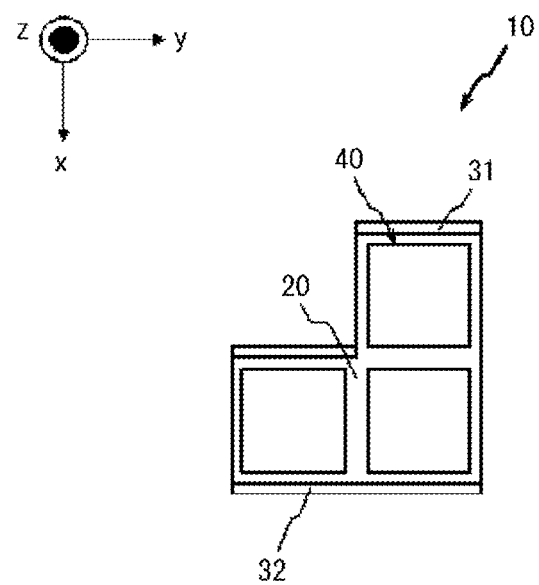
FIG. 34A is a plan view of an embodiment of a resonator.
Figure 34B:
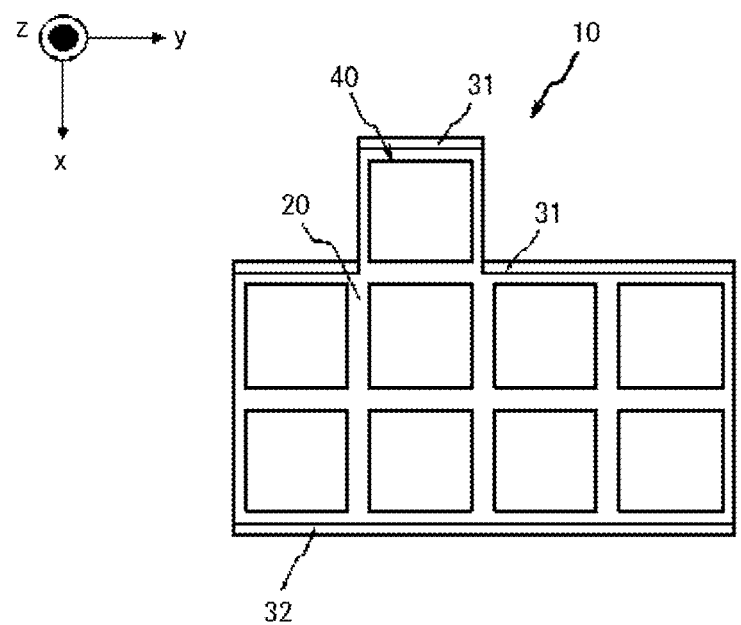
FIG. 34B is a plan view of an embodiment of a resonator.
Figure 34C:
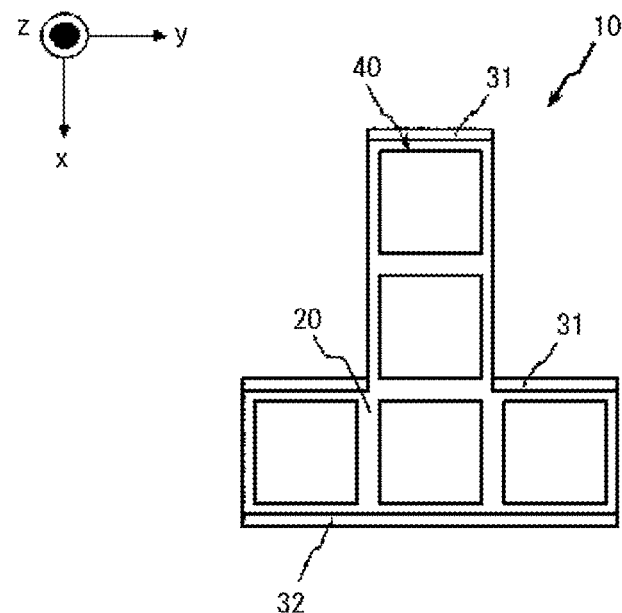
FIG. 34C is a plan view of an embodiment of a resonator.
Figure 34D:
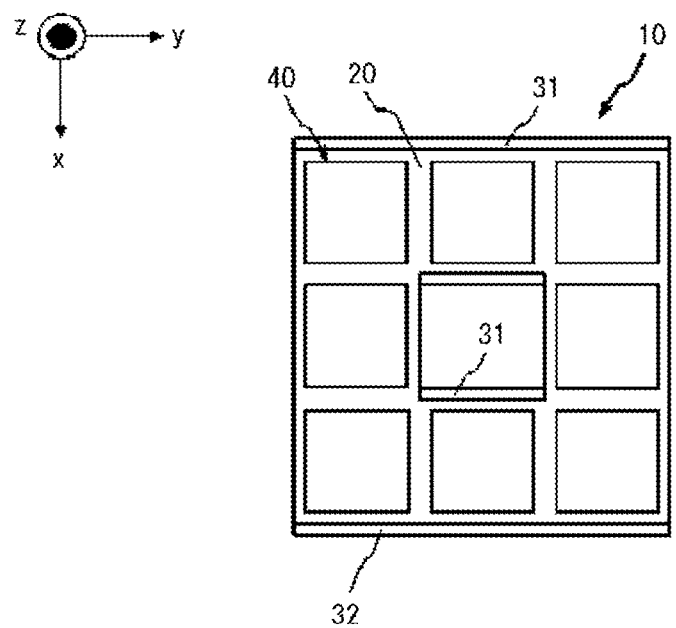
FIG. 34D is a plan view of an embodiment of a resonator.

The third conductor 40 illustrated in each of FIGS. 1 to 30 is an example. The configuration of the third conductor 40 is not limited to the configurations illustrated in FIGS. 1 to 30. The resonator including the third conductor 40 may be a line-type resonator 401. FIG. 31A illustrates a meander-line-type resonator 401. FIG. 31B illustrates a spiral-type resonator 401. The resonator including the third conductor 40 may be a slot-type resonator 402. The slot-type resonator 402 can include one or more seventh conductors 403 in an opening. The seventh conductor 403 in the opening has one end opened and the other end electrically connected to a conductor defining the opening. In a unit slot illustrated in FIG. 31C, five seventh conductors 403 are positioned in the opening. The unit slot has a shape corresponding to a meander line by the seventh conductors 403. In a unit slot illustrated in FIG. 31D, one seventh conductor 403 is positioned in the opening. The unit slot has a shape corresponding to a spiral by the seventh conductor 403.

The configuration of the resonator 10 illustrated in each of FIGS. 1 to 31 is an example. The configuration of the resonator 10 is not limited to the configurations illustrated in FIGS. 1 to 31. For example, the resonator 10 can include three or more pair conductors 30. For example, one pair conductor 30 can face two pair conductors 30 in the x direction. The two pair conductors 30 are different in distance from the one pair conductor 30. For example, the resonator 10 can include two pairs of pair conductors 30. The two pairs of pair conductors 30 can be different in regard to a distance between each pair and the lengths of each pair. The resonator 10 can include five or more first conductors. The unit structure 10X of the resonator 10 can be aligned with another unit structure 10X in the y direction. The unit structure 10X of the resonator 10 can be aligned with another unit structure 10X in the x direction without interposing the pair conductors 30 therebetween. FIGS. 32 to 34 are views each illustrating an example of the resonator 10. In the resonator 10 illustrated in FIGS. 32 to 34, the unit resonator 40X of the unit structure 10X is shown as having a square shape, but the embodiments are not limited thereto.

Figure 35:
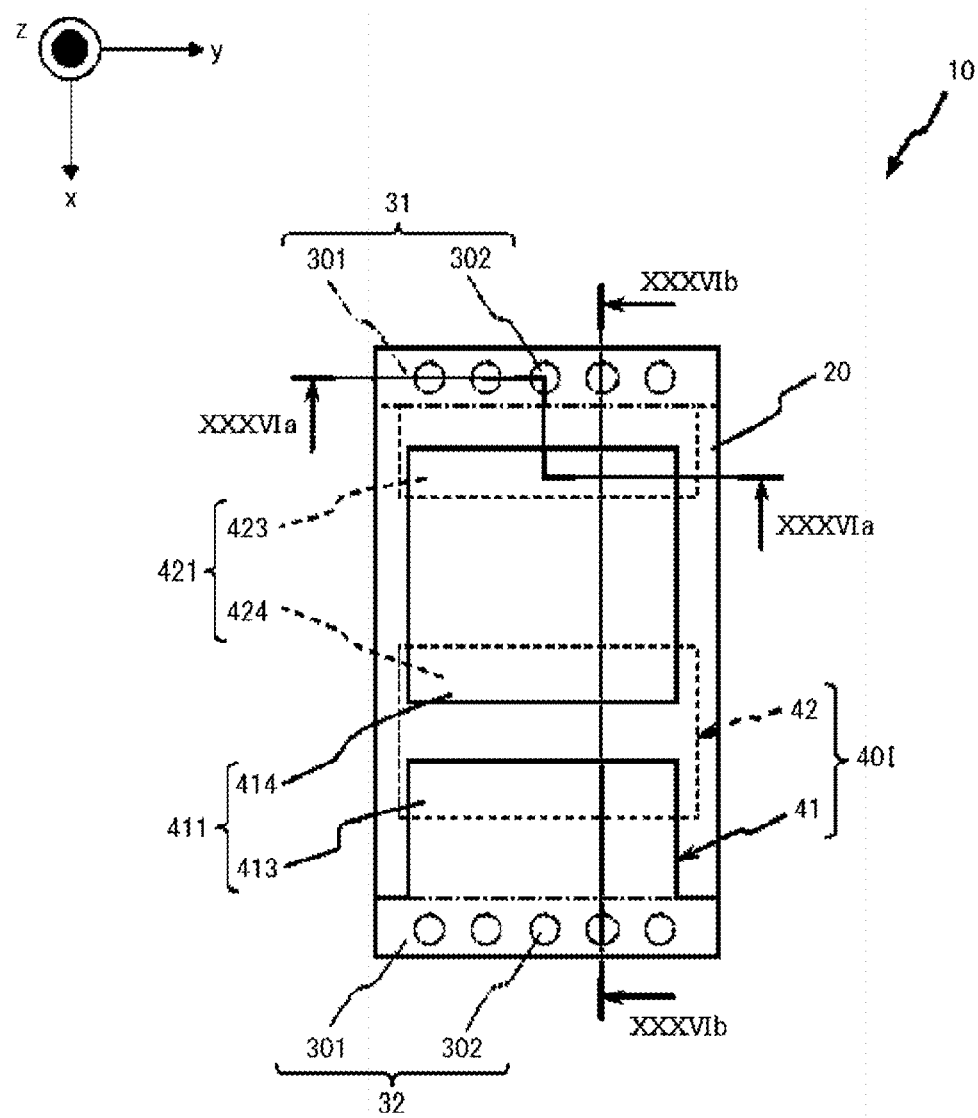
FIG. 35 is a plan view of an embodiment of a resonator.
Figure 36A:
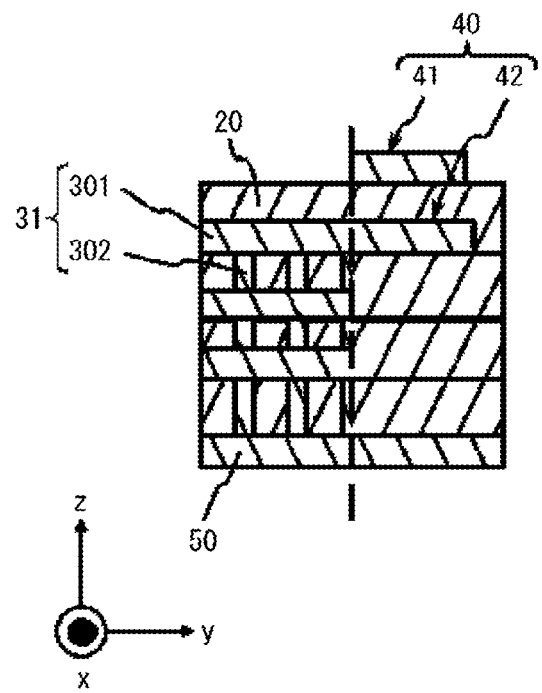
FIG. 36A is a cross-sectional view illustrating an embodiment of a resonator.
Figure 36B:
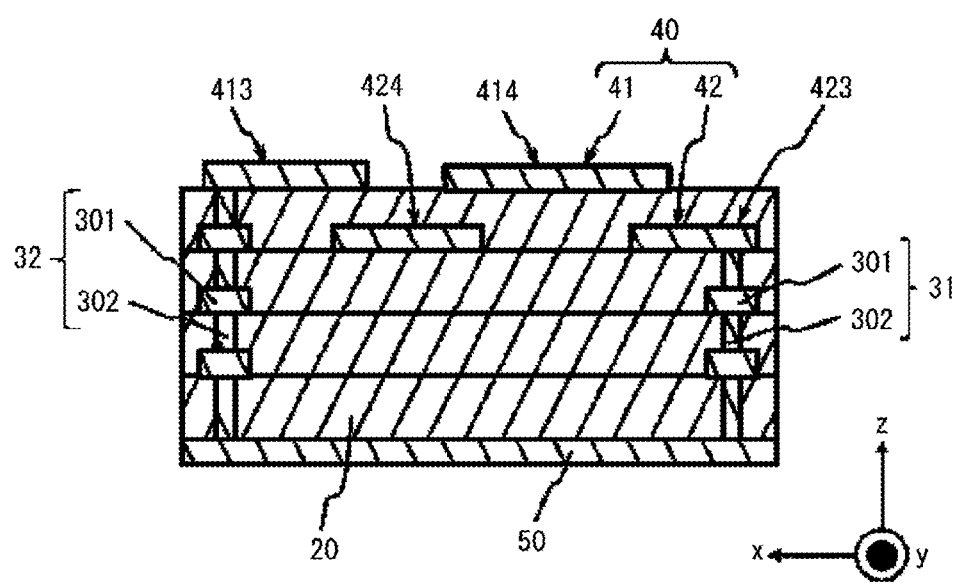
FIG. 36B is a cross-sectional view illustrating an embodiment of a resonator.

The configuration of the resonator 10 illustrated in each of FIGS. 1 to 34 is an example. The configuration of the resonator 10 is not limited to the configurations illustrated in FIGS. 1 to 34. FIG. 35 is a plan view illustrating the xy plane viewed from the z direction. FIG. 36A is a cross-sectional view taken along line XXXVIa-XXXVIa illustrated in FIG. 35. FIG. 36B is a cross-sectional view taken along line XXXVIb-XXXVIb illustrated in FIG. 35.

In the resonator 10 illustrated in FIGS. 35 to 36, the first conductive layer 41 includes a half of a patch-type resonator as the first unit resonator 41X. The second conductive layer 42 includes a half of a patch-type resonator as the second unit resonator 42X. The unit resonator 40X includes one first divisional resonator 41Y and one second divisional resonator 42Y. The unit structure 10X includes the unit resonator 40X, and a portion of the base 20 and a portion of the fourth conductor 50 that overlap the unit resonator 40X in the Z direction. In the resonator 10 illustrated in FIG. 35, three unit resonators 40X are arranged in the x direction. The first unit conductor 411 and the second unit conductor 421 included in the three unit resonators 40X form one current path 40I.

Figure 37:
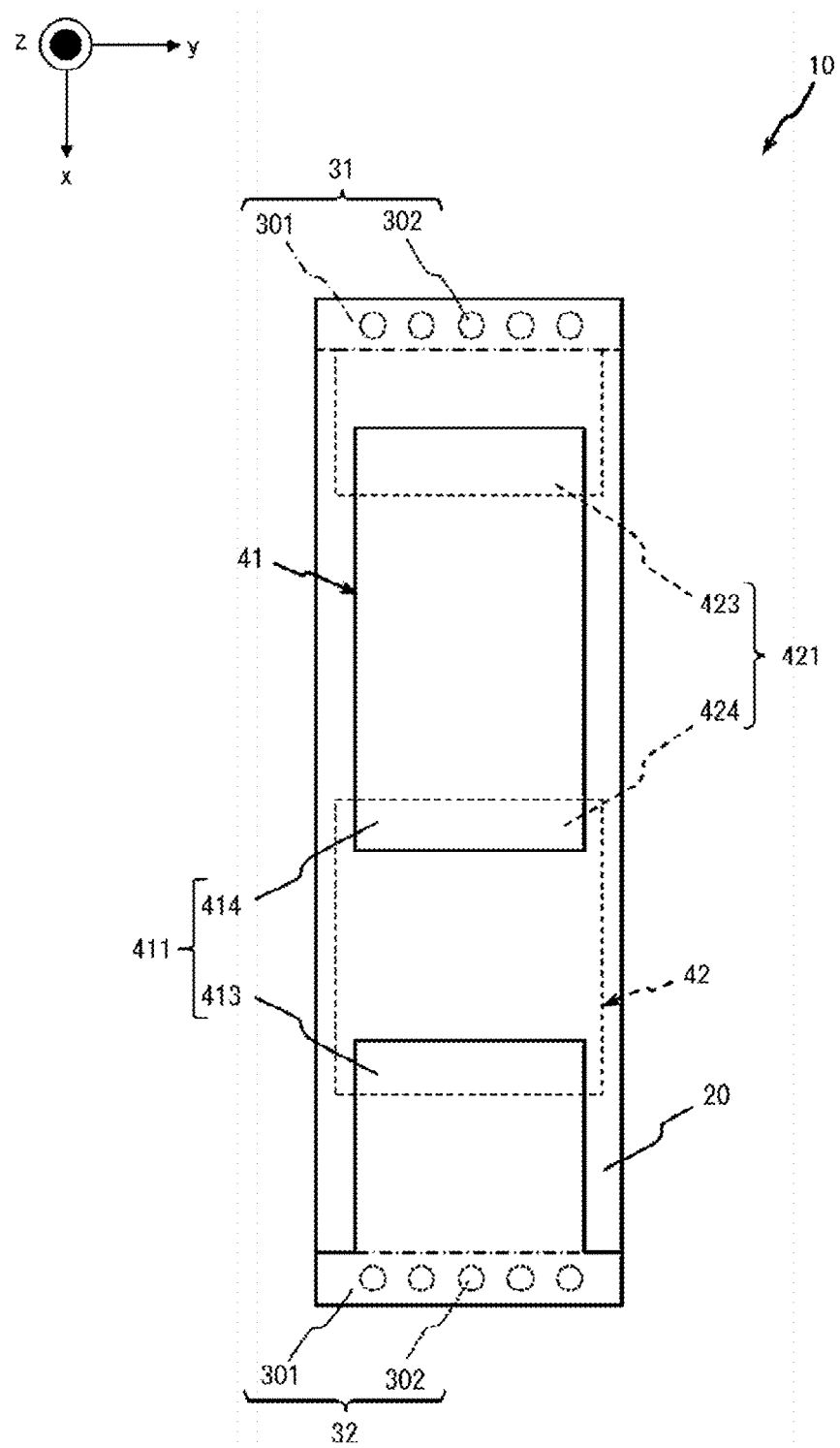
FIG. 37 is a plan view of an embodiment of a resonator.
Figure 38:
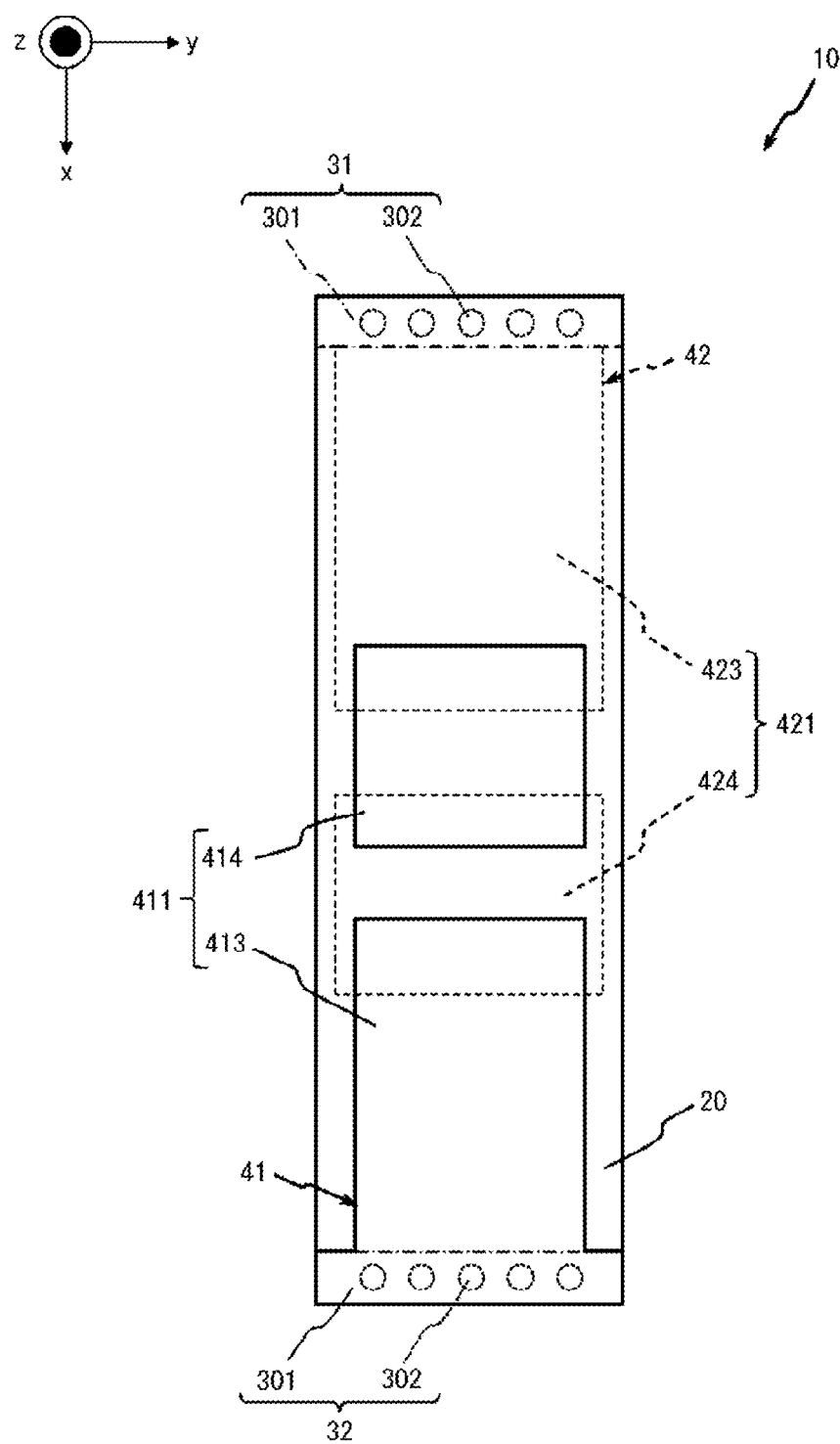
FIG. 38 is a plan view of an embodiment of a resonator.

FIG. 37 illustrates another example of the resonator 10 illustrated in FIG. 35. The resonator 10 illustrated in FIG. 37 is longer in the x direction, as compared with the resonator 10 illustrated in FIG. 35. The size of the resonator 10 is not limited to that of the resonator 10 illustrated in FIG. 37 and can be changed as appropriate. In the resonator 10 of FIG. 37, the length of the first connecting conductor 413 in the x direction is different from that of the first floating conductor 414. In the resonator 10 of FIG. 37, the length of the first connecting conductor 413 in the x direction is smaller than that of the first floating conductor 414. FIG. 38 illustrates another example of the resonator 10 illustrated in FIG. 35. In the resonator 10 illustrated in FIG. 38, the length of the third conductor 40 in the x direction is different. In the resonator 10 of FIG. 38, the length of the first connecting conductor 413 in the x direction is larger than that of the first floating conductor 414.

Figure 39:
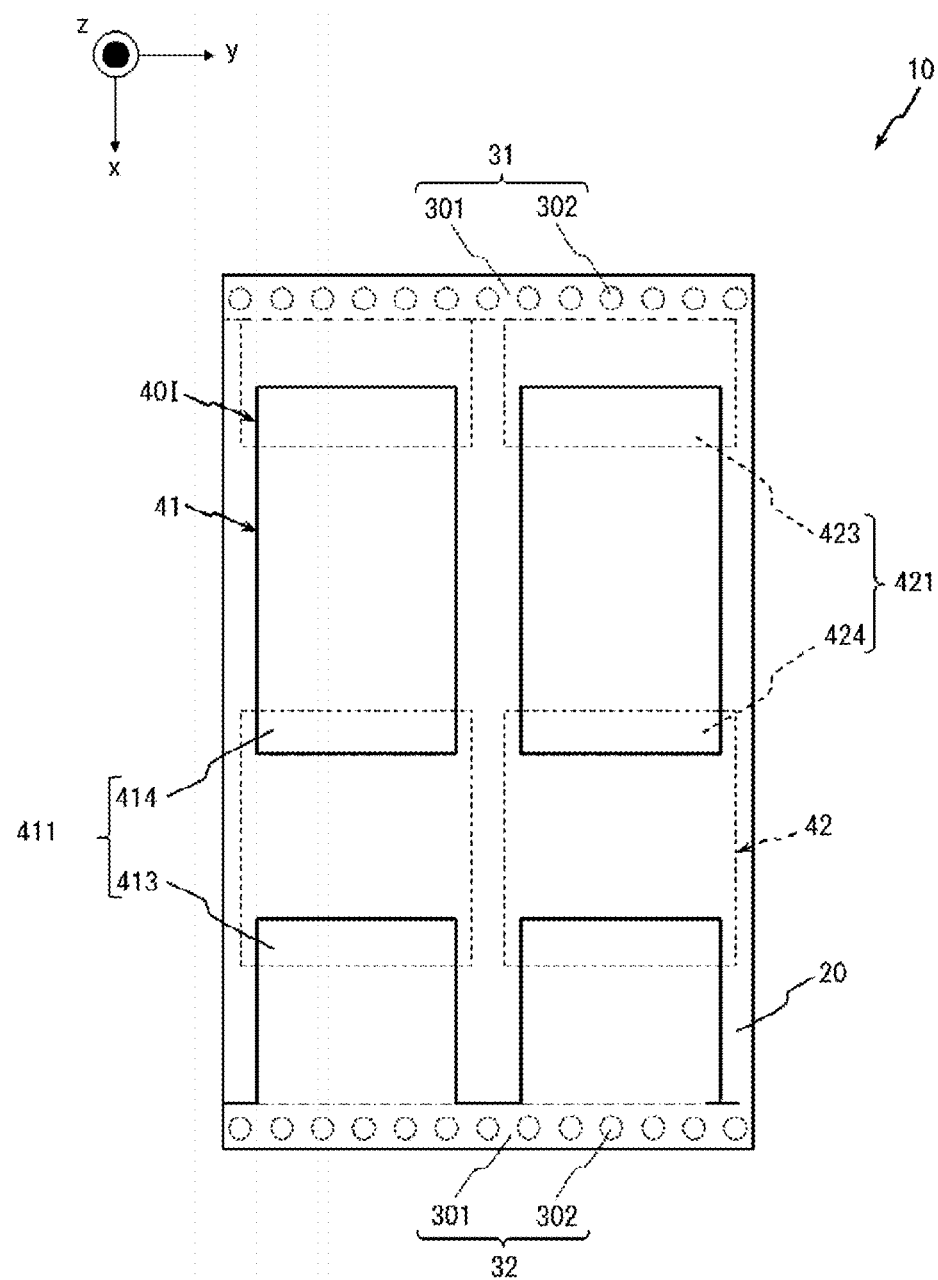
FIG. 39 is a plan view of an embodiment of a resonator.

FIG. 39 illustrates another example of the resonator 10. FIG. 39 illustrates another example of the resonator 10 illustrated in FIG. 37. In embodiments, in the resonator 10, a plurality of first unit conductors 411 arranged in the x direction and the second unit conductors 421 are capacitively coupled to each other. In the resonator 10, two current paths 40I can be arranged in the y direction, in which no current flows from one side to the other side.

Figure 40:
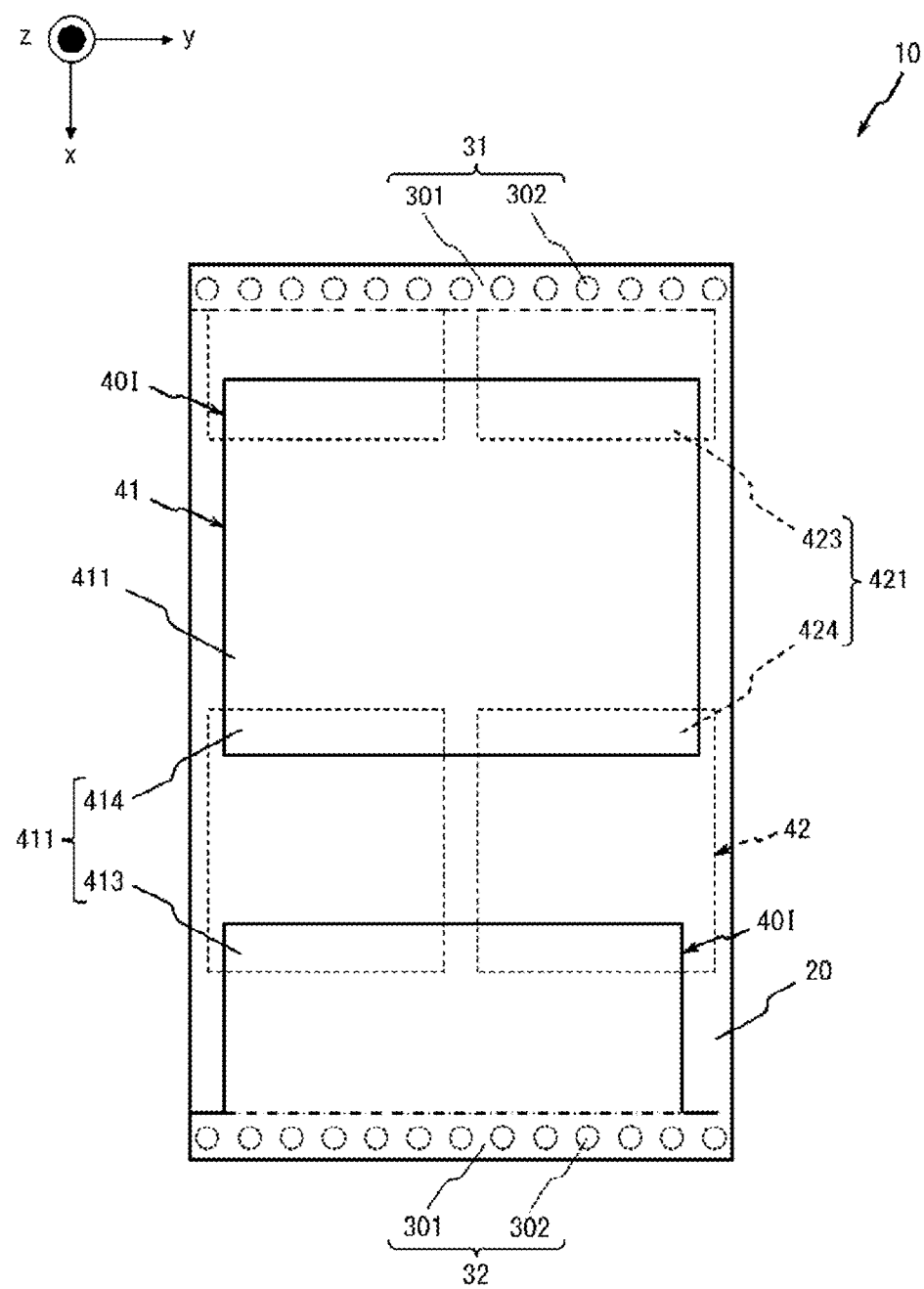
FIG. 40 is a plan view of an embodiment of a resonator.

FIG. 40 illustrates another example of the resonator 10. FIG. 40 illustrates another example of the resonator 10 illustrated in FIG. 39. In embodiments, in the resonator 10, the number of conductors connected to the first conductor 31 and the number of conductors connected to the second conductor 32 can be different from each other. In the resonator 10 of FIG. 40, one first connecting conductor 413 is capacitively coupled to two second floating conductors 424. In the resonator 10 of FIG. 40, two second connecting conductors 423 are capacitively coupled to one first floating conductor 414. In embodiments, the number of first unit conductors 411 can be different from the number of second unit conductors 421 that are capacitively coupled to the first unit conductor 411.

Figure 41:
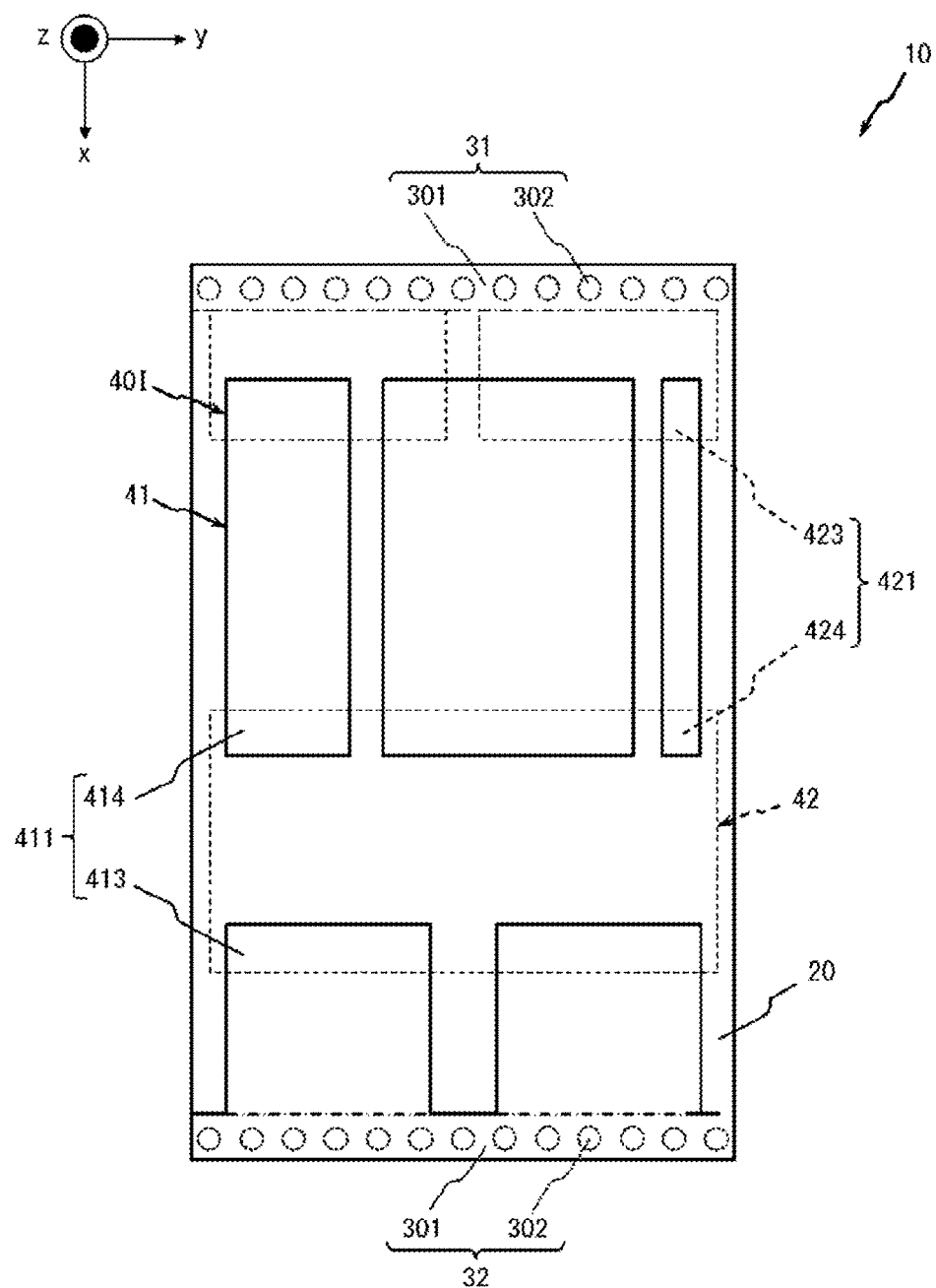
FIG. 41 is a plan view of an embodiment of a resonator.

FIG. 41 illustrates another example of the resonator 10 illustrated in FIG. 39. In embodiments, the number of second unit conductors 421 that are capacitively coupled to a first end portion of the first unit conductor 411 in the x direction, and the number of second unit conductors 421 that are capacitively coupled to a second end portion of the first unit conductor 411 in the x direction can be different from each other. In the resonator 10 of FIG. 41, two first connecting conductors 413 are capacitively coupled to a first end portion of one second floating conductor 424 in the x direction and three second floating conductors 424 are capacitively coupled to a second end portion of the one second floating conductor 424. In embodiments, a plurality of conductors arranged in the y direction can have different lengths in the y direction. In the resonator 10 of FIG. 41, three first floating conductors 414 arranged in the y direction have different lengths in the y direction.

Figure 42:
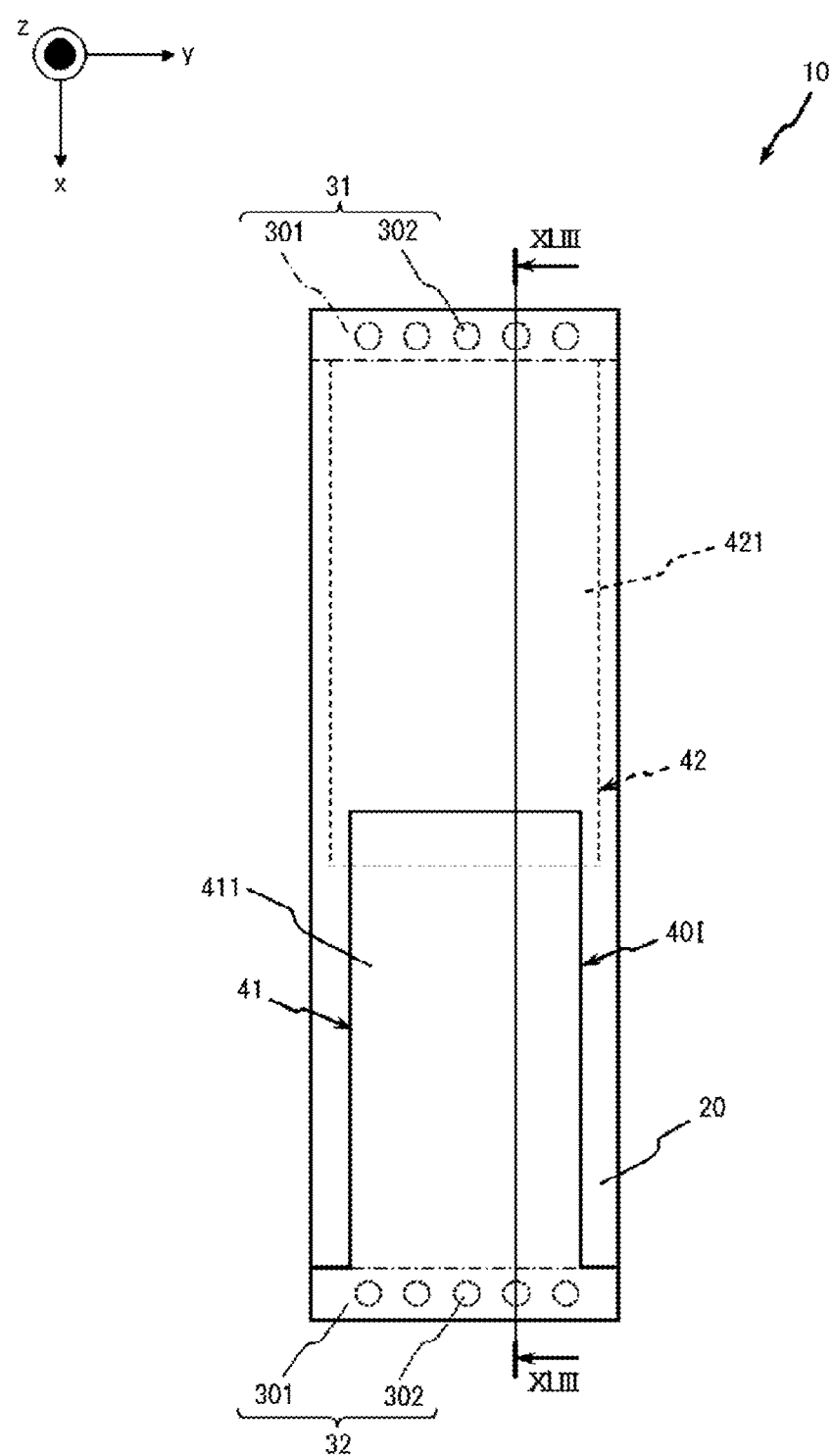
FIG. 42 is a plan view of an embodiment of a resonator.
Figure 43:
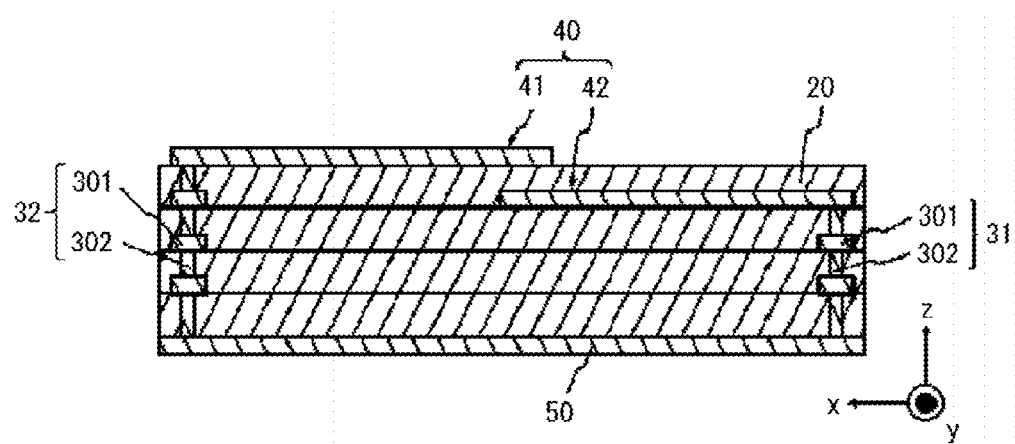
FIG. 43 is a cross-sectional view illustrating an embodiment of a resonator.

FIG. 42 illustrates another example of the resonator 10. FIG. 43 is a cross-sectional view taken along line XLIII-XLIII illustrated in FIG. 42. In the resonator 10 illustrated in FIGS. 42 and 43, the first conductive layer 41 includes a half of a patch-type resonator as the first unit resonator 41X. The second conductive layer 42 includes a half of a patch-type resonator as the second unit resonator 42X. The unit resonator 40X includes one first divisional resonator 41Y and one second divisional resonator 42Y. The unit structure 10X includes the unit resonator 40X, and a portion of the base 20 and a portion of the fourth conductor 50 that overlap the unit resonator 40X in the z direction. In the resonator 10 illustrated in FIG. 42, one unit resonator 40X extends in the x direction.

Figure 44:
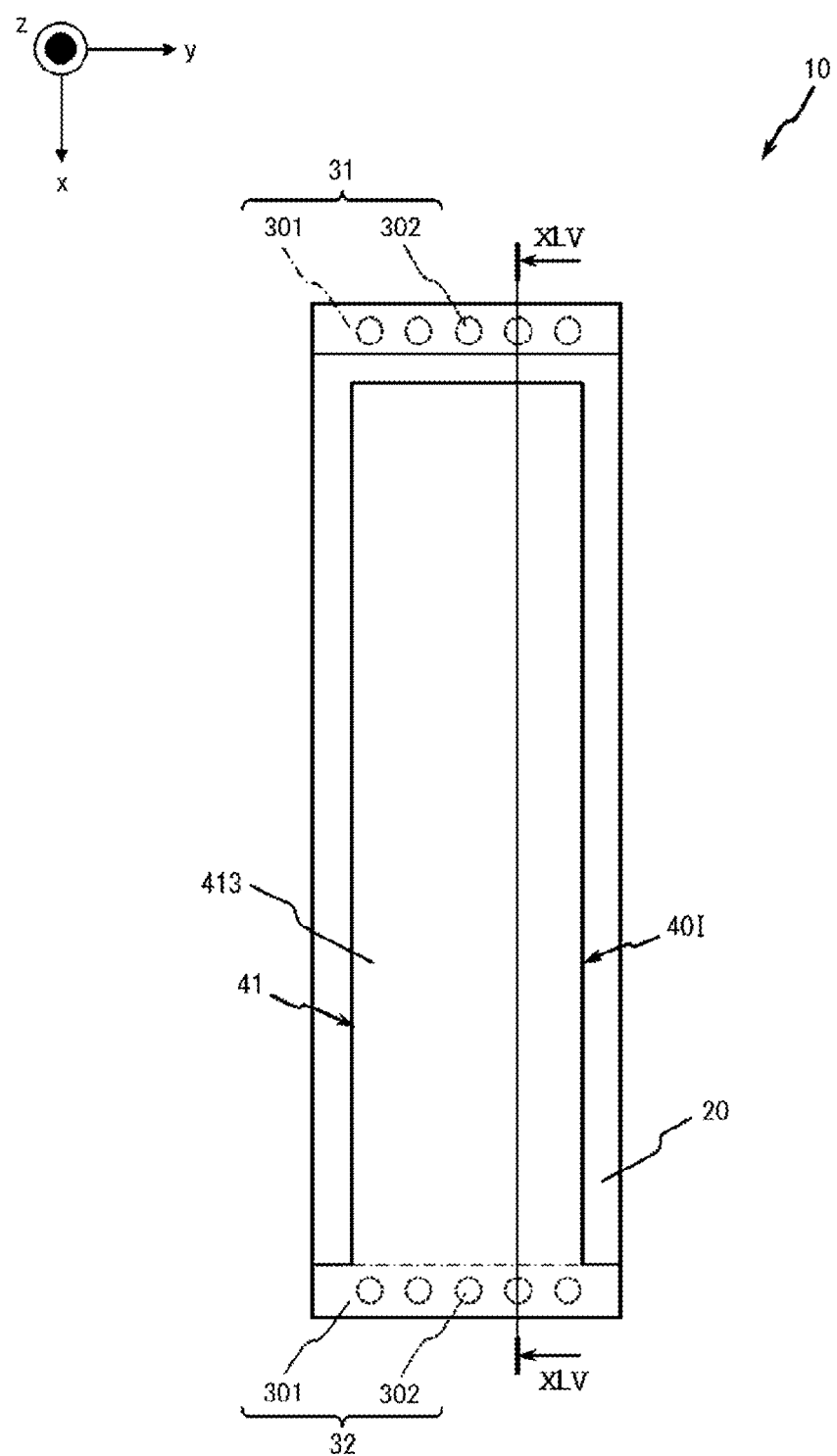
FIG. 44 is a plan view of an embodiment of a resonator.
Figure 45:
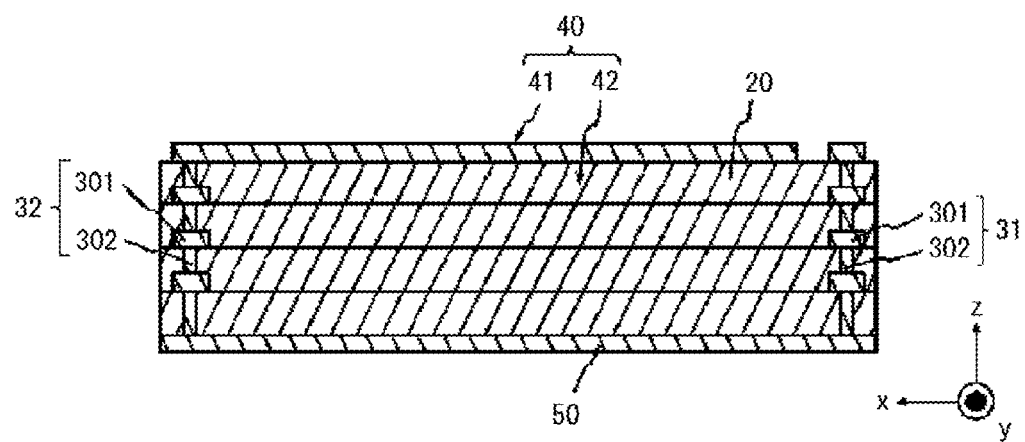
FIG. 45 is a cross-sectional view illustrating an embodiment of a resonator.

FIG. 44 illustrates another example of the resonator 10. FIG. 45 is a cross-sectional view taken along the line XLV-XLV illustrated in FIG. 44. In the resonator 10 illustrated in FIGS. 44 and 45, the third conductor 40 includes only the first connecting conductor 413. The first connecting conductor 413 faces the first conductor 31 in the xy plane. The first connecting conductor 413 is capacitively coupled to the first conductor 31.

Figure 46:
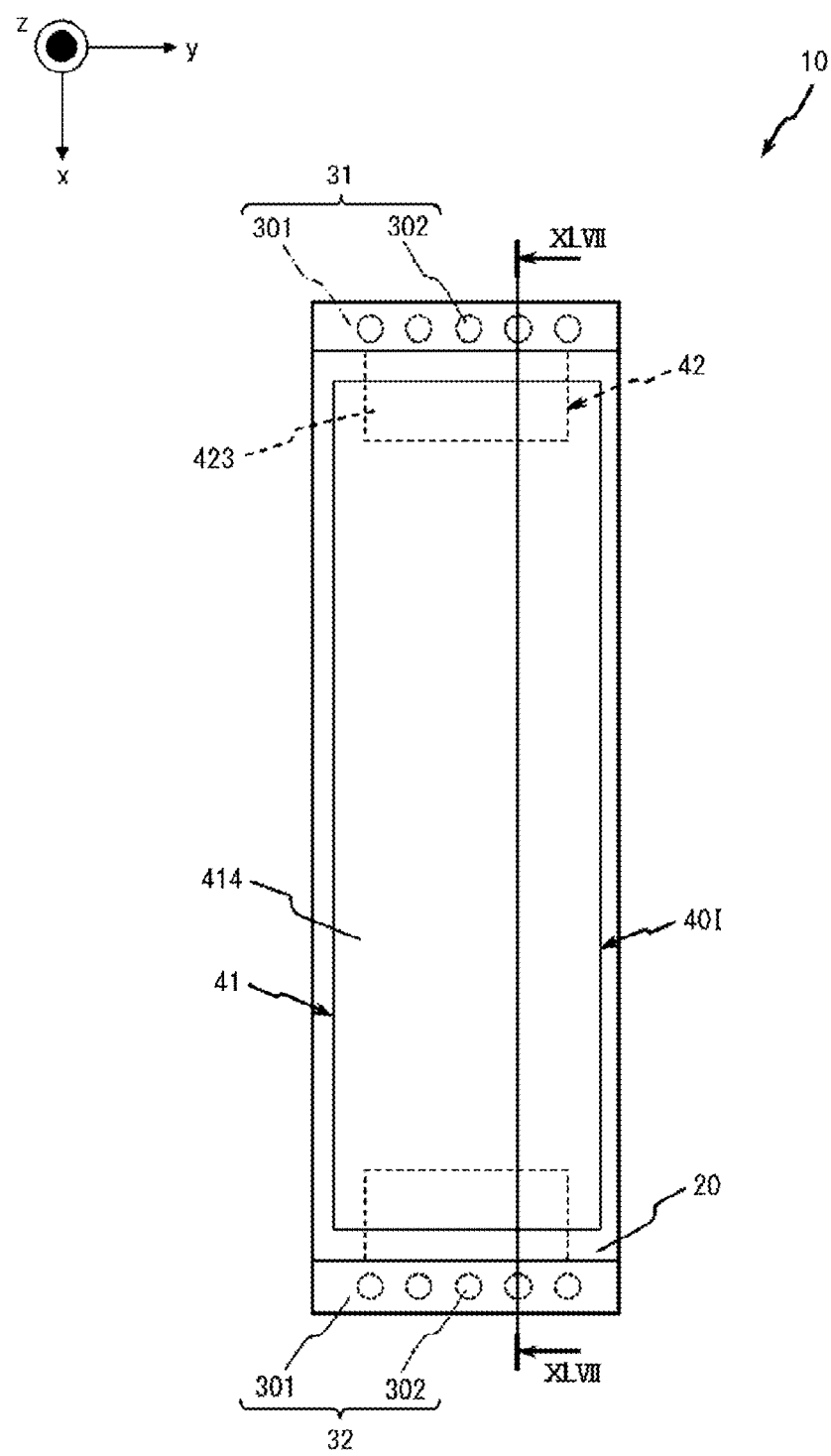
FIG. 46 is a plan view of an embodiment of a resonator.
Figure 47:
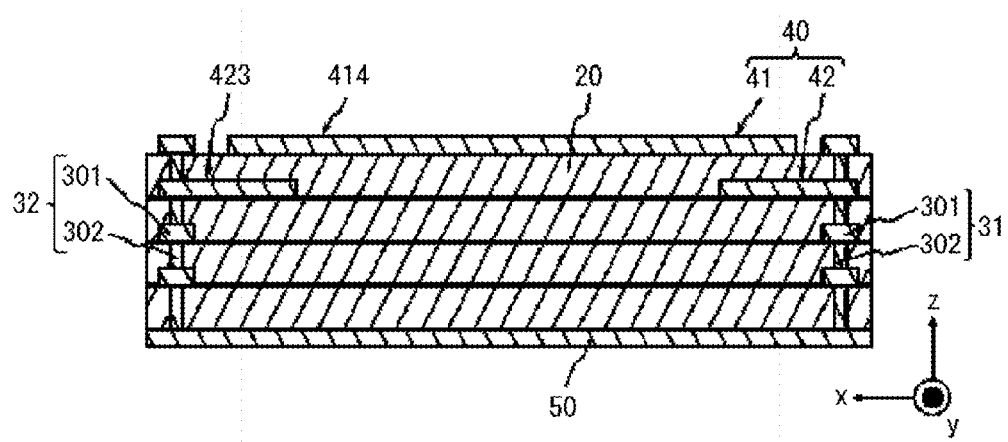
FIG. 47 is a cross-sectional view illustrating an embodiment of a resonator.

FIG. 46 illustrates another example of the resonator 10. FIG. 47 is a cross-sectional view taken along line XLVII-XLVII illustrated in FIG. 46. In the resonator 10 illustrated in FIGS. 46 and 47, the third conductor 40 includes the first conductive layer 41 and the second conductive layer 42. The first conductive layer 41 includes one first floating conductor 414. The second conductive layer 42 includes two second connecting conductors 423. The first conductive layer 41 faces the pair conductors 30 in the xy plane. The two second connecting conductors 423 overlap the one first floating conductor 414 in the z direction. The one first floating conductor 414 is capacitively coupled to the two second connecting conductors 423.

Figure 48:
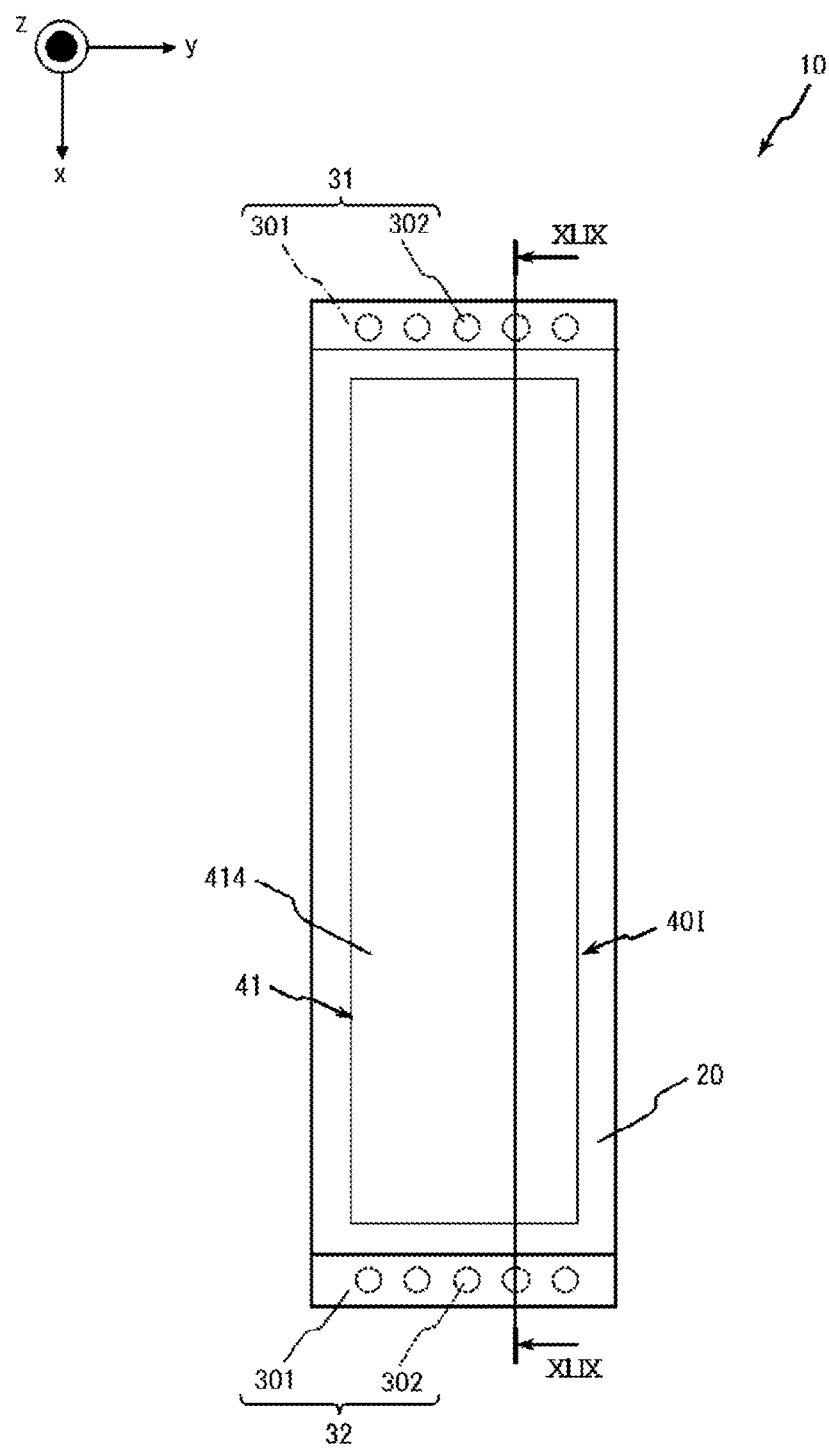
FIG. 48 is a plan view of an embodiment of a resonator.
Figure 49:
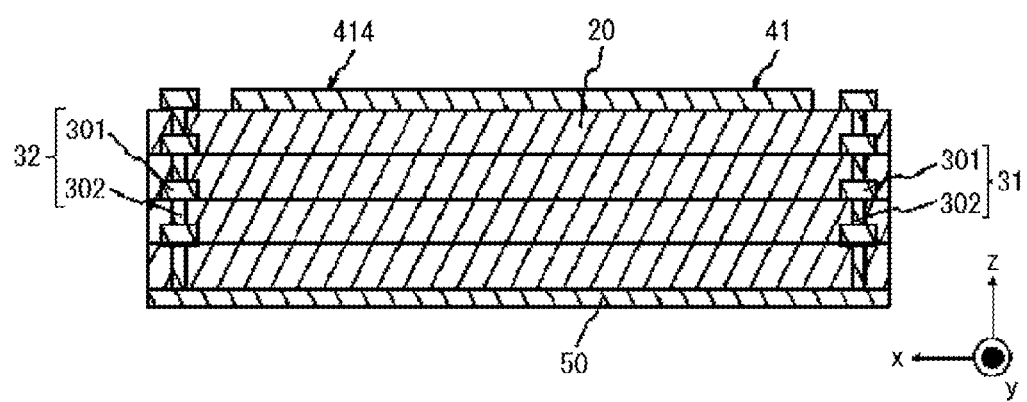
FIG. 49 is a cross-sectional view illustrating an embodiment of a resonator.

FIG. 48 illustrates another example of the resonator 10. FIG. 49 is a cross-sectional view taken along line XLIX-XLIX illustrated in FIG. 48. In the resonator 10 illustrated in FIGS. 48 and 49, the third conductor 40 includes only the first floating conductor 414. The first floating conductor 414 faces the pair conductors 30 in the xy plane. The first connecting conductor 413 is capacitively coupled to the pair conductors 30.

Figure 50:
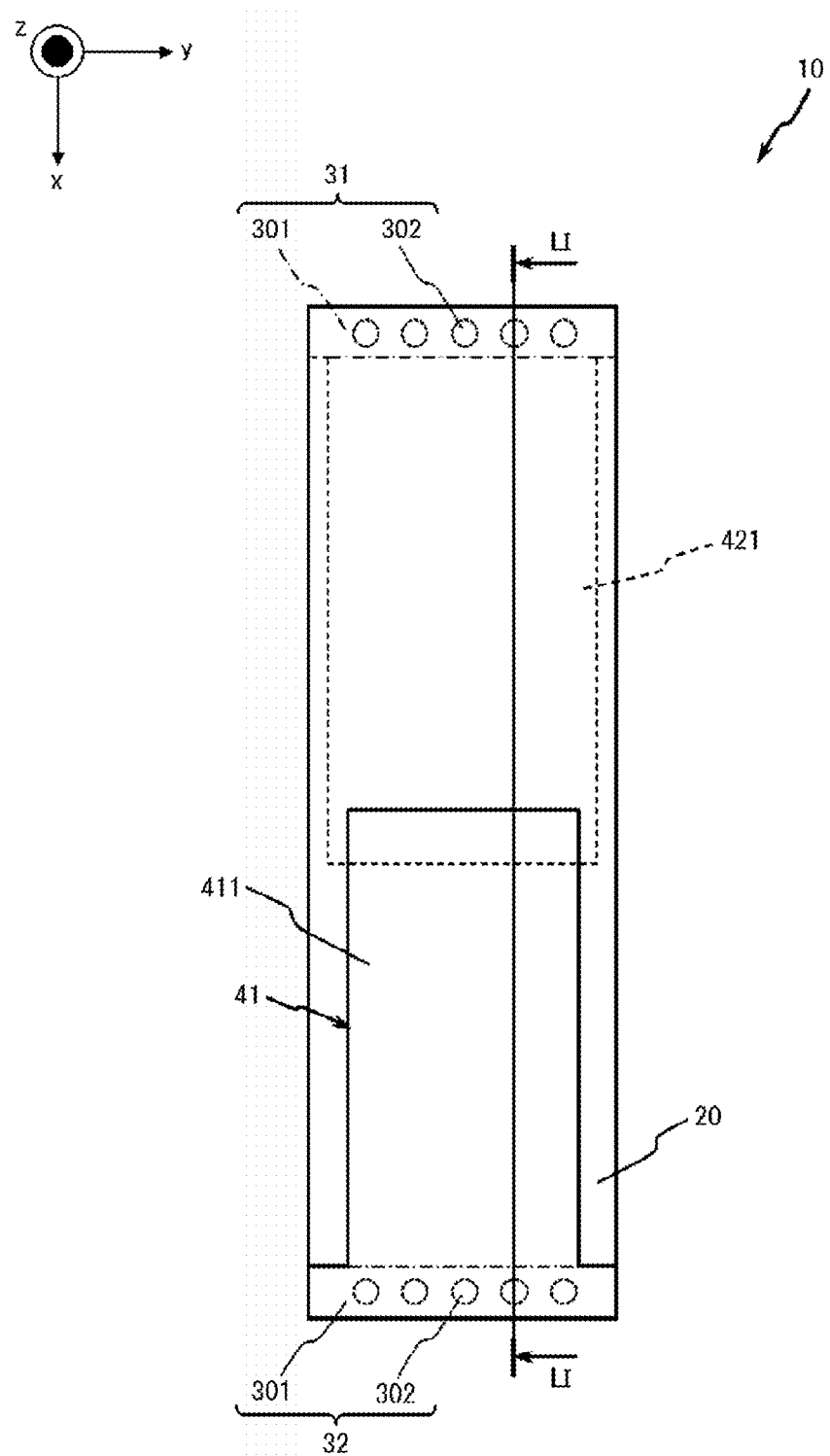
FIG. 50 is a plan view of an embodiment of a resonator.
Figure 51:
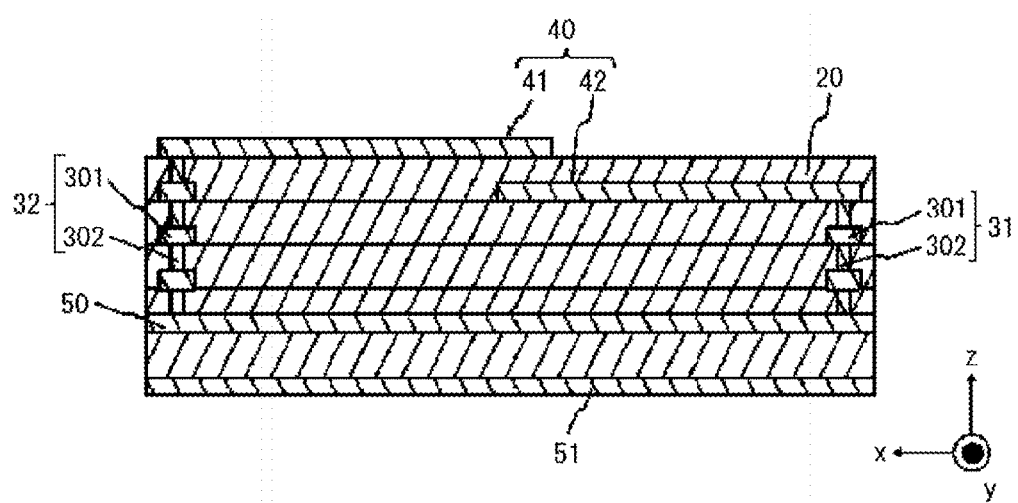
FIG. 51 is a cross-sectional view illustrating an embodiment of a resonator.

FIG. 50 illustrates another example of the resonator 10. FIG. 51 is a cross-sectional view taken along line LI-LI illustrated in FIG. 50. The resonator 10 illustrated in FIGS. 50 and 51 is different from the resonator 10 illustrated in FIGS. 42 and 43 in regard to the configuration of the fourth conductor 50. The resonator 10 illustrated in FIGS. 50 and 51 includes the fourth conductor 50 and the reference potential layer 51. The reference potential layer 51 is electrically connected to the ground of the device including the resonator 10. The reference potential layer 51 faces the third conductor 40 while having the fourth conductor 50 interposed therebetween. The fourth conductor 50 is positioned between the third conductor 40 and the reference potential layer 51. An interval between the reference potential layer 51 and the fourth conductor 50 is smaller than an interval between the third conductor 40 and the fourth conductor 50.

Figure 52:
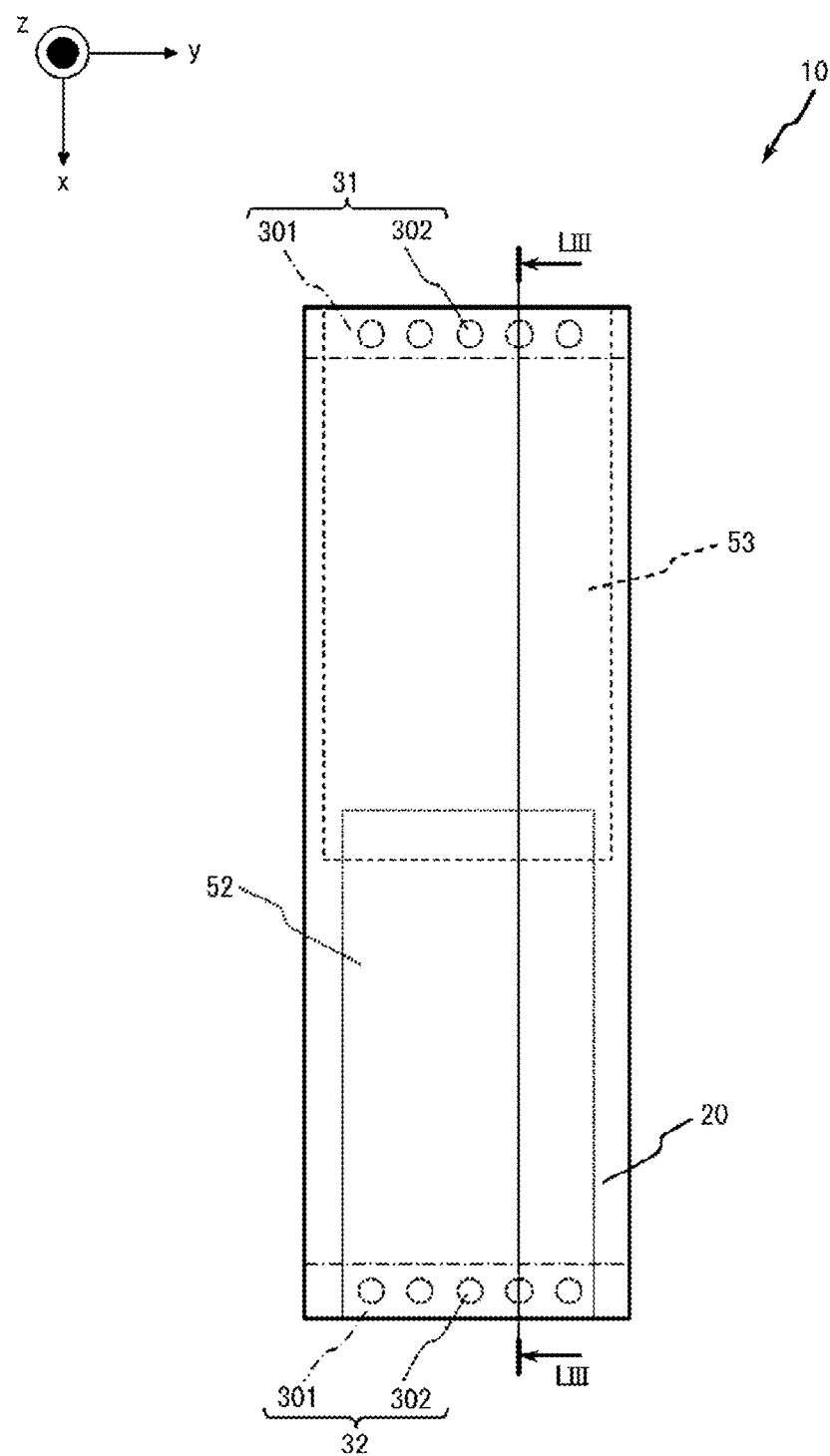
FIG. 52 is a plan view of an embodiment of a resonator.
Figure 53:
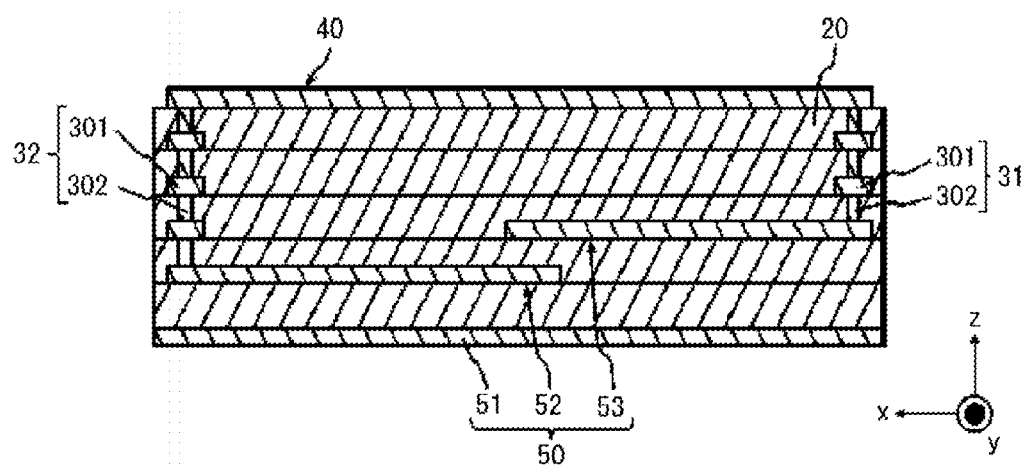
FIG. 53 is a cross-sectional view illustrating an embodiment of a resonator.

FIG. 52 illustrates another example of the resonator 10. FIG. 53 is a cross-sectional view taken along line LIII-LIII illustrated in FIG. 52. The resonator 10 includes the fourth conductor 50 and the reference potential layer 51. The reference potential layer 51 is electrically connected to the ground of the device including the resonator 10. The fourth conductor 50 includes a resonator. The fourth conductor 50 includes the third conductive layer 52 and the fourth conductive layer 53. The third conductive layer 52 and the fourth conductive layer 53 are capacitively coupled to each other. The third conductive layer 52 and the fourth conductive layer 53 face each other in the z direction. A distance between the third conductive layer 52 and the fourth conductive layer 53 is smaller than a distance between the fourth conductive layer 53 and the reference potential layer 51. The distance between the third conductive layer 52 and the fourth conductive layer 53 is smaller than a distance between the fourth conductor 50 and the reference potential layer 51. The third conductor 40 forms one conductive layer.

Figure 54:
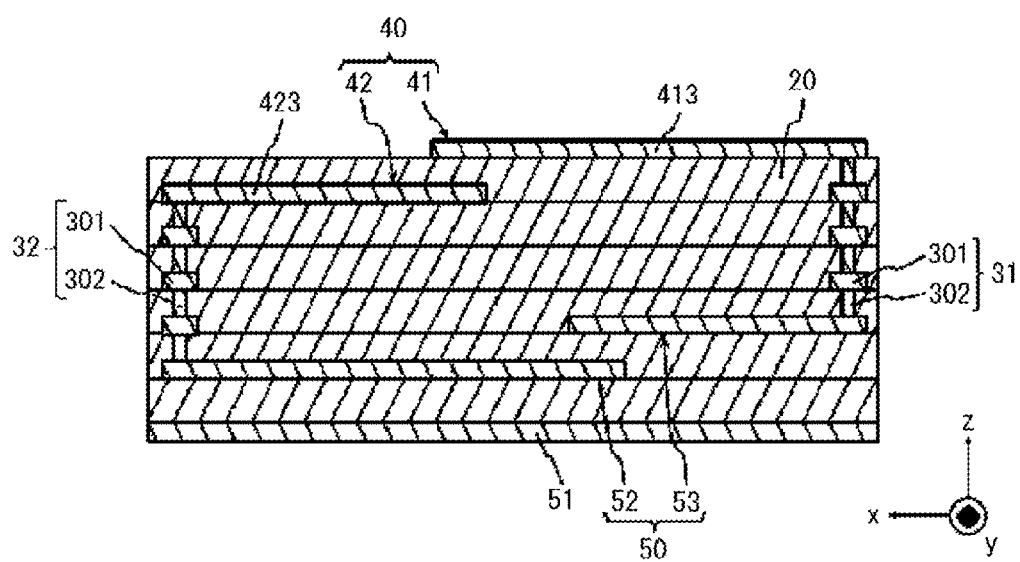
FIG. 54 is a cross-sectional view illustrating an embodiment of a resonator.

FIG. 54 illustrates another example of the resonator 10 illustrated in FIG. 53. The resonator 10 includes the third conductor 40, the fourth conductor 50, and the reference potential layer 51. The third conductor 40 includes the first conductive layer 41 and the second conductive layer 42. The first conductive layer 41 includes the first connecting conductor 413. The second conductive layer 42 includes the second connecting conductor 423. The first connecting conductor 413 is capacitively coupled to the second connecting conductor 423. The reference potential layer 51 is electrically connected to the ground of the device including the resonator 10. The fourth conductor 50 includes the third conductive layer 52 and the fourth conductive layer 53. The third conductive layer 52 and the fourth conductive layer 53 are capacitively coupled to each other. The third conductive layer 52 and the fourth conductive layer 53 face each other in the z direction. A distance between the third conductive layer 52 and the fourth conductive layer 53 is smaller than a distance between the fourth conductive layer 53 and the reference potential layer 51. The distance between the third conductive layer 52 and the fourth conductive layer 53 is smaller than a distance between the fourth conductor 50 and the reference potential layer 51.

Figure 55:
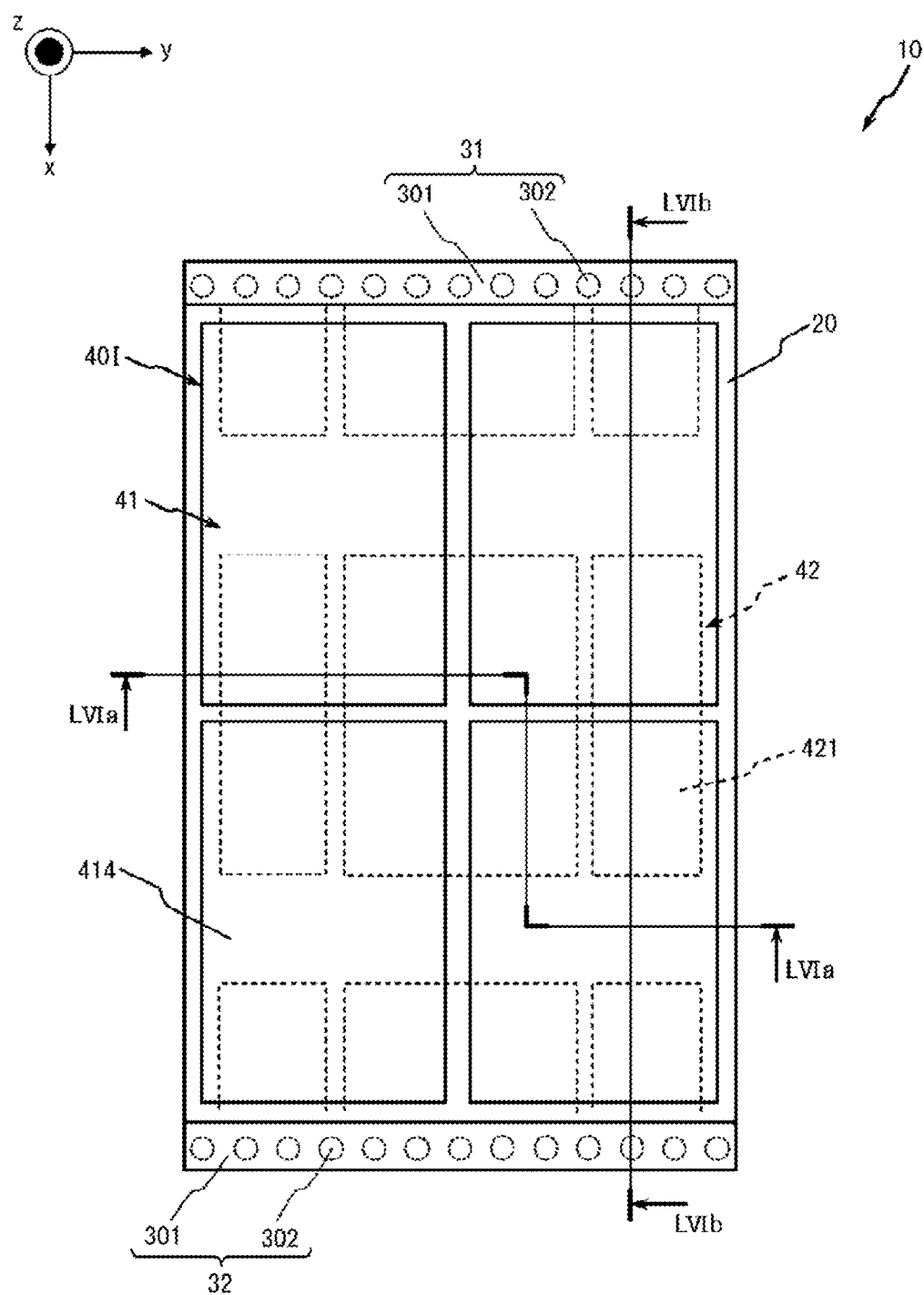
FIG. 55 is a plan view of an embodiment of a resonator.
Figure 56A:
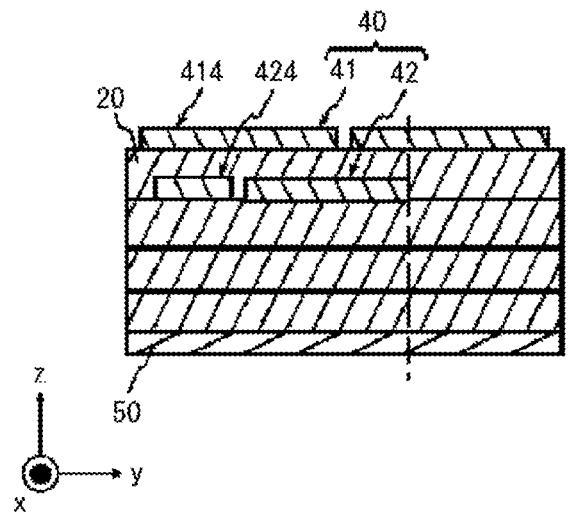
FIG. 56A is a cross-sectional view illustrating an embodiment of a resonator.
Figure 56B:
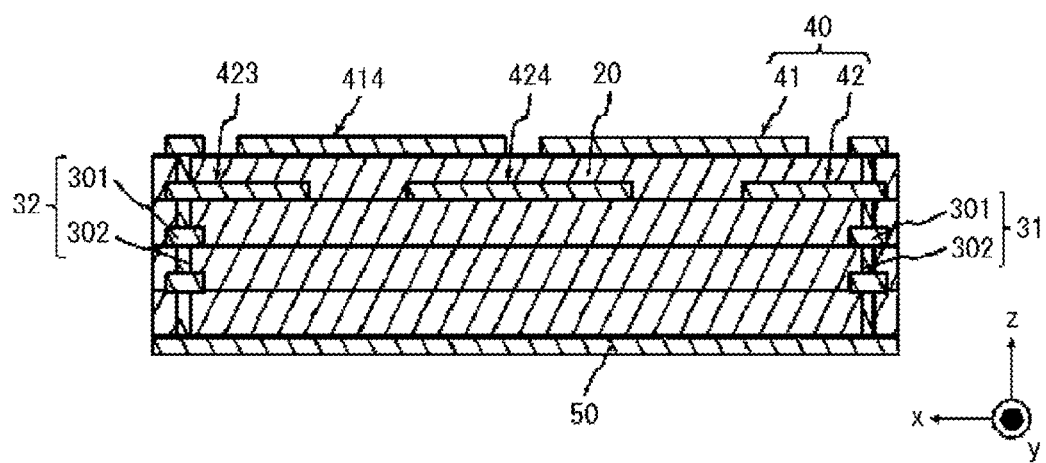
FIG. 56B is a cross-sectional view illustrating an embodiment of a resonator.

FIG. 55 illustrates another example of the resonator 10. FIG. 56A is a cross-sectional view taken along line LVIa-LVIa illustrated in FIG. 55. FIG. 56B is a cross-sectional view taken along line LVIb-LVIb illustrated in FIG. 55. In the resonator 10 illustrated in FIG. 55, the first conductive layer 41 includes four first floating conductors 414. The first conductive layer 41 illustrated in FIG. 55 does not include the first connecting conductor 413. In the resonator 10 illustrated in FIG. 55, the second conductive layer 42 includes six second connecting conductors 423 and three second floating conductors 424. Two second connecting conductors 423 are each capacitively coupled to two first floating conductors 414. One second floating conductor 424 is capacitively coupled to four first floating conductors 414. Two second floating conductors 424 are capacitively coupled to two first floating conductors 414.

Figure 57:
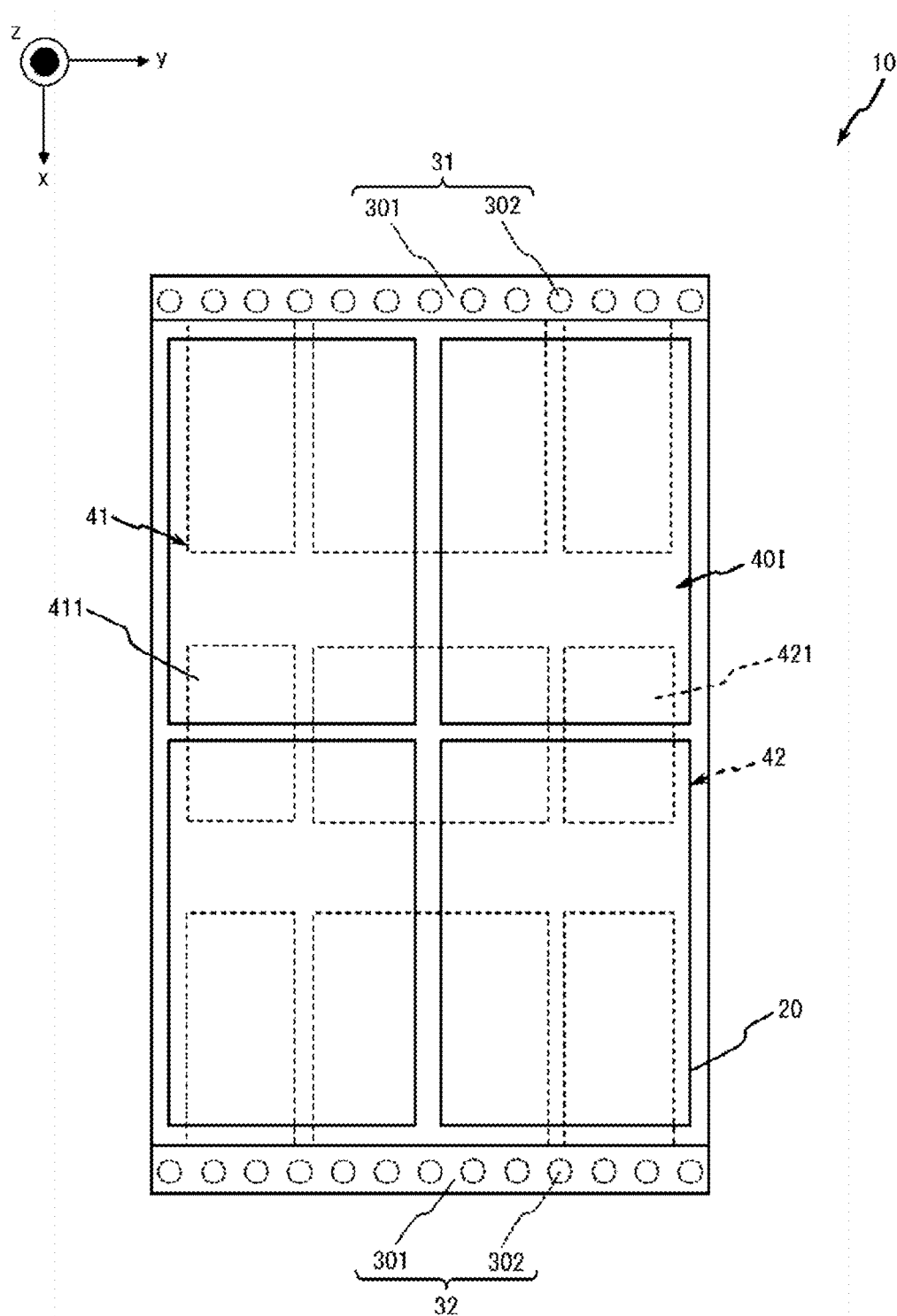
FIG. 57 is a plan view of an embodiment of a resonator.

FIG. 57 is a view illustrating another example of the resonator illustrated in FIG. 55. The resonator 10 of FIG. 57 is different from the resonator 10 illustrated in FIG. 55 in regard to the size of the second conductive layer 42. In the resonator 10 illustrated in FIG. 57, the length of the second floating conductor 424 in the x direction is smaller than the length of the second connecting conductor 423 in the x direction.

Figure 58:
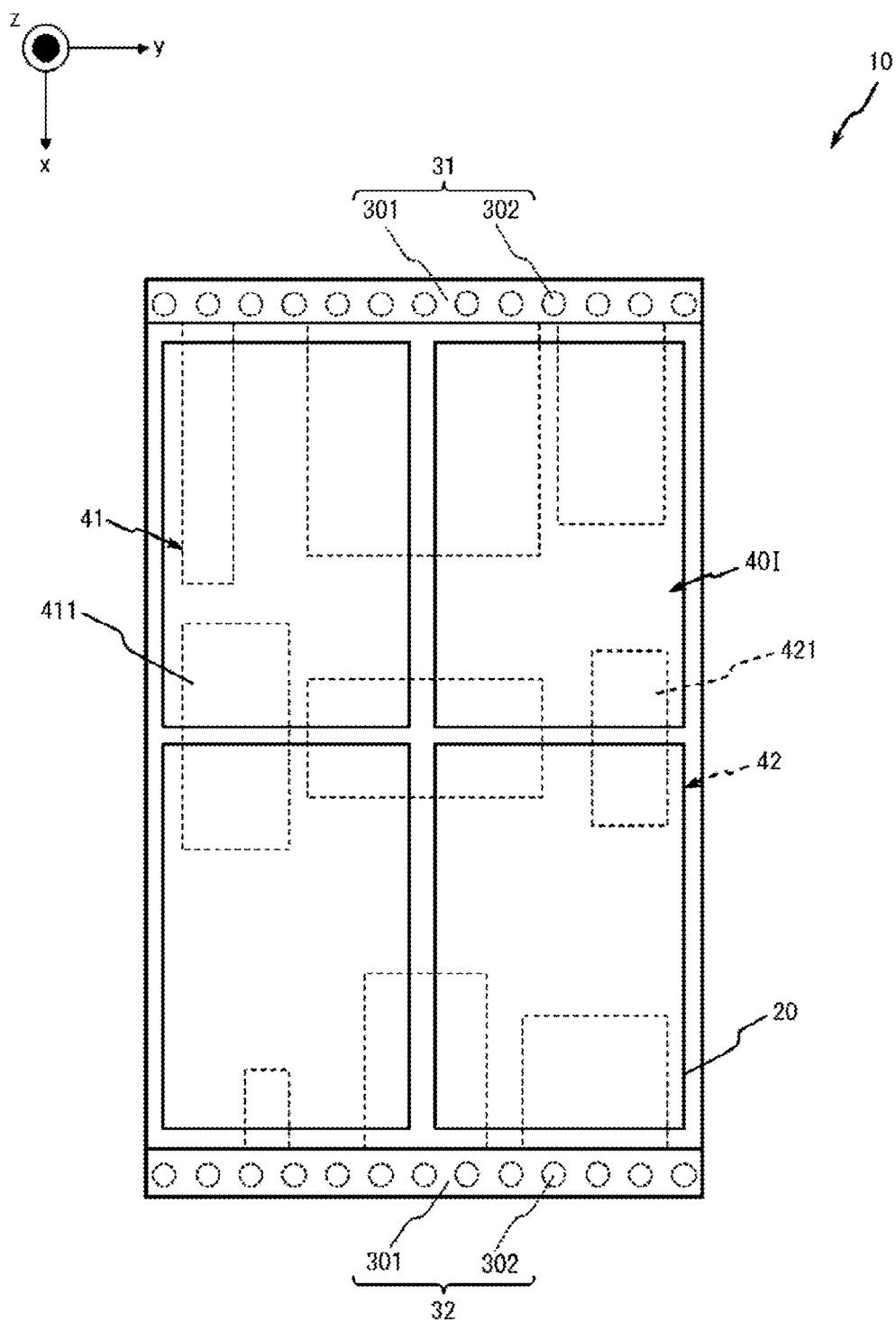
FIG. 58 is a plan view of an embodiment of a resonator.

FIG. 58 is a view illustrating another example of the resonator illustrated in FIG. 55. The resonator 10 of FIG. 58 is different from the resonator 10 illustrated in FIG. 55 in regard to the size of the second conductive layer 42. In the resonator 10 illustrated in FIG. 58, a plurality of second unit conductors 421 have different first surface integrals. In the resonator 10 illustrated in FIG. 58, the plurality of second unit conductors 421 have different lengths in the x direction. In the resonator 10 illustrated in FIG. 58, the plurality of second unit conductors 421 have different lengths in the y direction. In FIG. 58, the plurality of second unit conductors 421 have different first surface integrals, lengths, and widths, but the embodiments are not limited thereto. In FIG. 58, some of the first surface integrals, lengths, and widths of the plurality of second unit conductors 421 can be different from each other. Some or all of the first surface integrals, lengths, and widths of the plurality of second unit conductors 421 can be identical to each other. Some or all of the first surface integrals, lengths, and widths of the plurality of second unit conductors 421 can be different from each other. Some or all of the first surface integrals, lengths, and widths of the plurality of second unit conductors 421 can be identical to each other. Some or all of the first surface integrals, lengths, and widths of some of the plurality of second unit conductors 421 can be identical to each other.

In the resonator 10 illustrated in FIG. 58, a plurality of second connecting conductors 423 arranged in the y direction have different first surface integrals. In the resonator 10 illustrated in FIG. 58, the plurality of second connecting conductors 423 arranged in the y direction have different lengths in the x direction. In the resonator 10 illustrated in FIG. 58, the plurality of second connecting conductors 423 arranged in the y direction have different lengths in the y direction. In FIG. 58, the plurality of second connecting conductors 423 have different first surface integrals, lengths, and widths, but the embodiments are not limited thereto. In FIG. 58, some of the first surface integrals, lengths, and widths of the plurality of second connecting conductors 423 can be different from each other. Some or all of the first surface integrals, lengths, and widths of the plurality of second connecting conductors 423 can be identical to each other. Some or all of the first surface integrals, lengths, and widths of the plurality of second connecting conductors 423 can be different from each other. Some or all of the first surface integrals, lengths, and widths of the plurality of second connecting conductors 423 can be identical to each other. Some or all of the first surface integrals, lengths, and widths of some of the plurality of second connecting conductors 423 can be identical to each other.

In the resonator 10 illustrated in FIG. 58, a plurality of second floating conductors 424 arranged in the y direction have different first surface integrals. In the resonator 10 illustrated in FIG. 58, the plurality of second floating conductors 424 arranged in the y direction have different lengths in the x direction. In the resonator 10 illustrated in FIG. 58, the plurality of second floating conductors 424 arranged in the y direction have different lengths in the y direction. In FIG. 58, the plurality of second floating conductors 424 have different first surface integrals, lengths, and widths, but the embodiments are not limited thereto. In FIG. 58, some of the first surface integrals, lengths, and widths of the plurality of second floating conductors 424 can be different from each other. Some or all of the first surface integrals, lengths, and widths of the plurality of second floating conductors 424 can be identical to each other. Some or all of the first surface integrals, lengths, and widths of the plurality of second floating conductors 424 can be different from each other. Some or all of the first surface integrals, lengths, and widths of the plurality of second floating conductors 424 can be identical to each other. Some or all of the first surface integrals, lengths, and widths of some of the plurality of second floating conductors 424 can be identical to each other.

Figure 59:
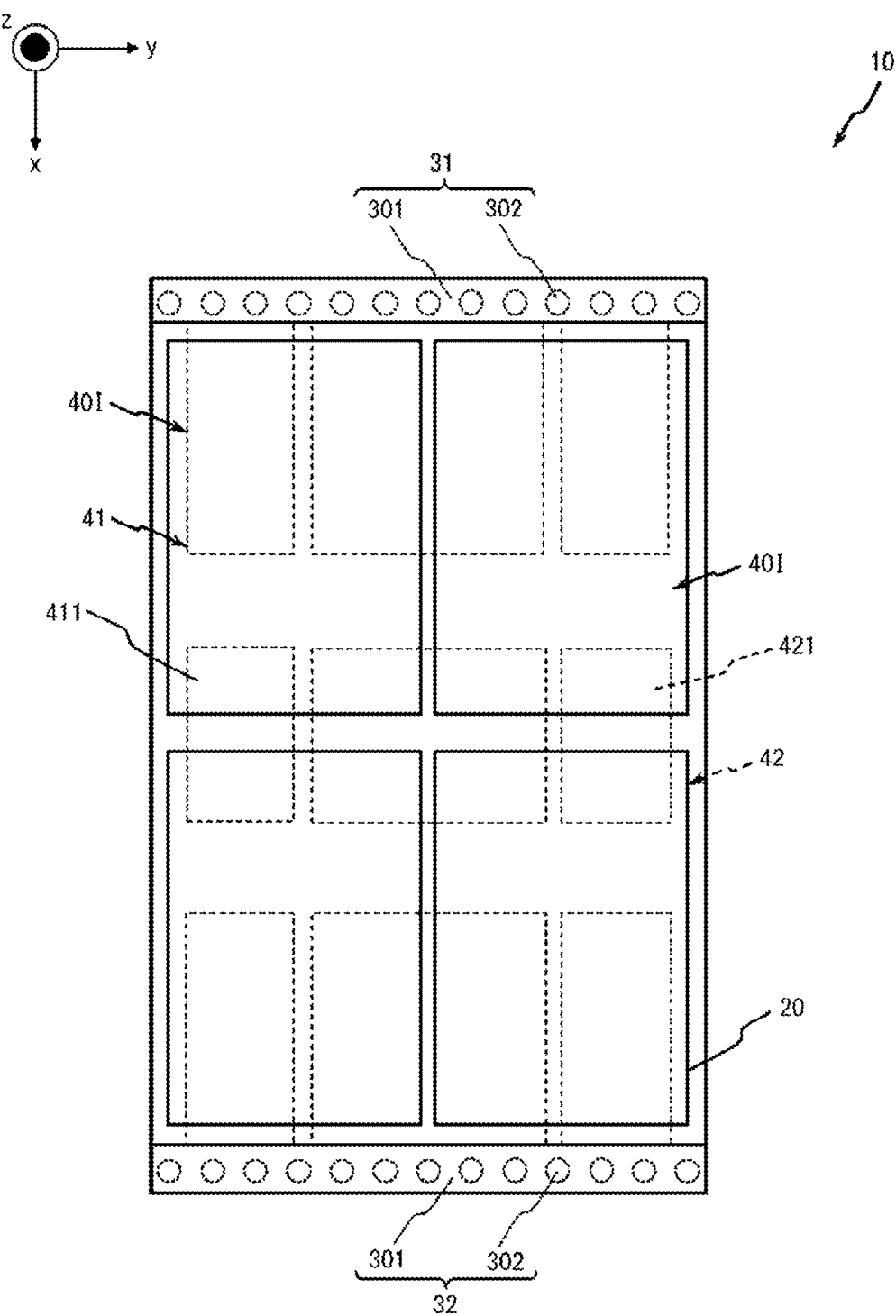
FIG. 59 is a plan view of an embodiment of a resonator.

FIG. 59 is a view illustrating another example of the resonator 10 illustrated in FIG. 57. The resonator 10 of FIG. 59 is different from the resonator 10 illustrated in FIG. 57 in regard to an interval between the first unit conductors 411 in the y direction. In the resonator 10 of FIG. 59, the interval between the first unit conductors 411 in the y direction is smaller than an interval between the first unit conductors 411 in the x direction. In the resonator 10, since the pair conductors 30 can function as electric conductors, a current flows in the x direction. In the resonator 10, a current flowing through the third conductor 40 in the y direction can be ignored. The interval between the first unit conductors 411 in the y direction may be smaller than the interval between the first unit conductors 411 in the x direction. By decreasing the interval between the first unit conductors 411 in the y direction, the surface integral of the first unit conductor 411 can be increased.

Figure 60:
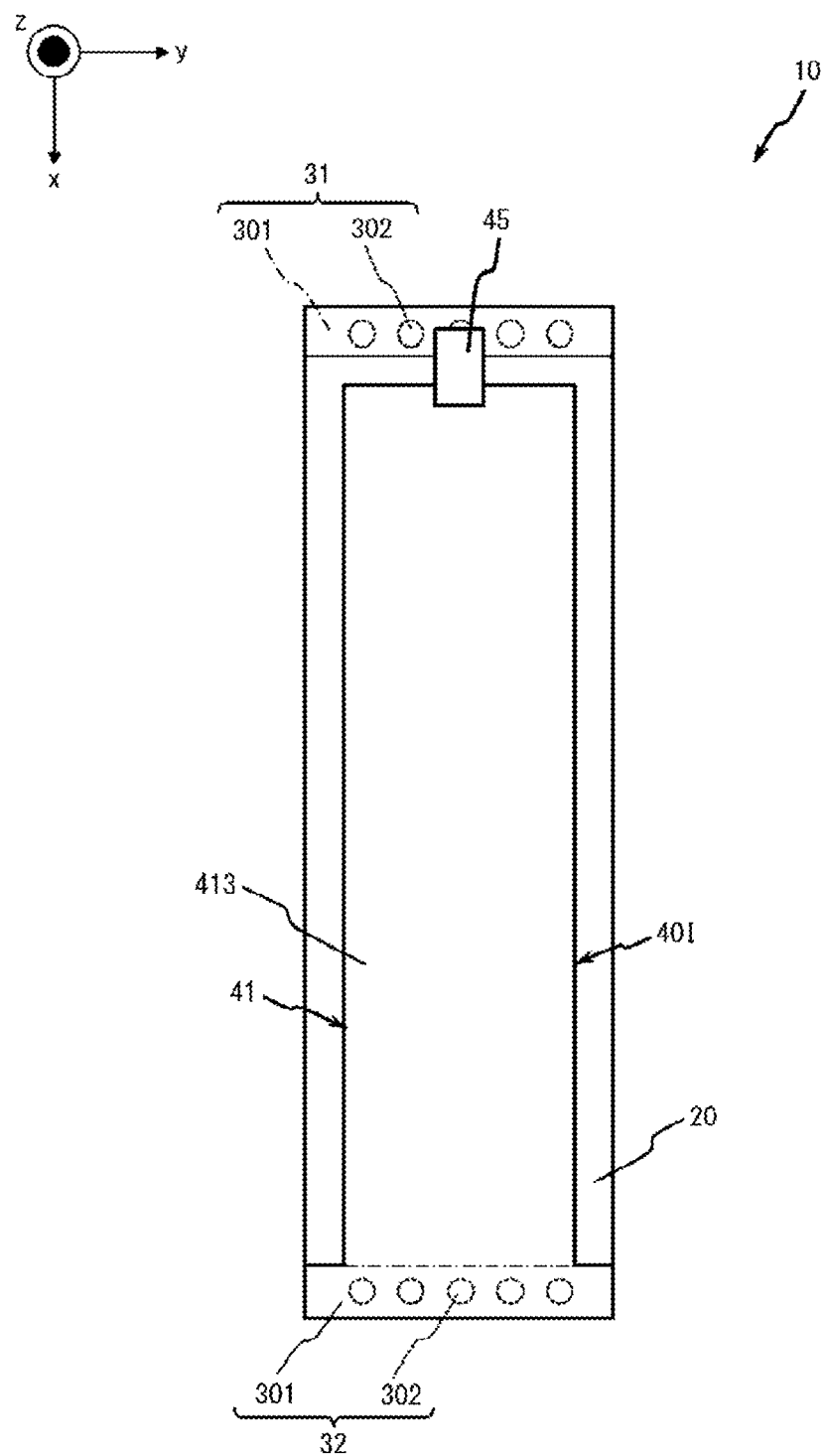
FIG. 60 is a plan view of an embodiment of a resonator.
Figure 61:
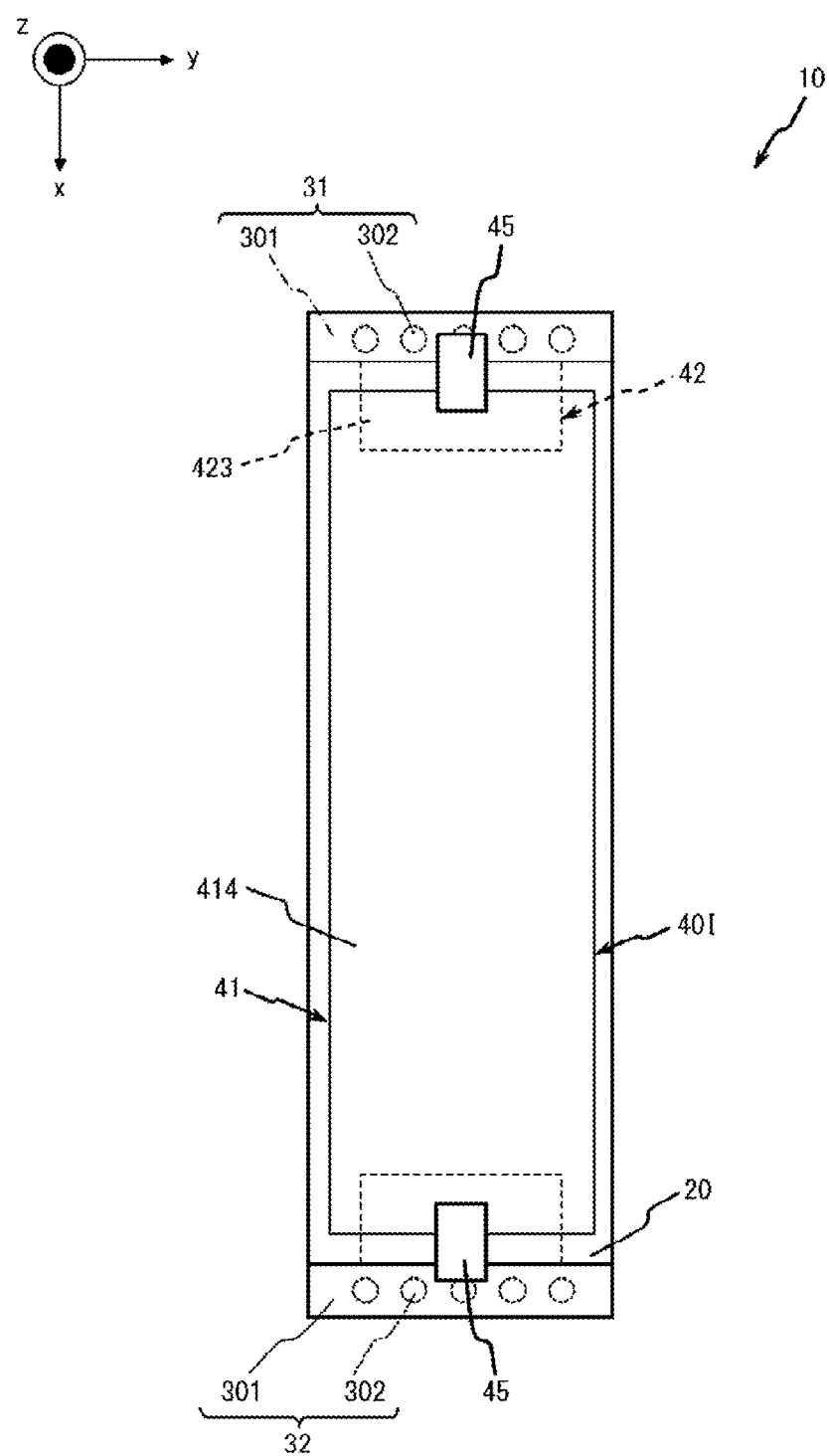
FIG. 61 is a plan view of an embodiment of a resonator.
Figure 62:
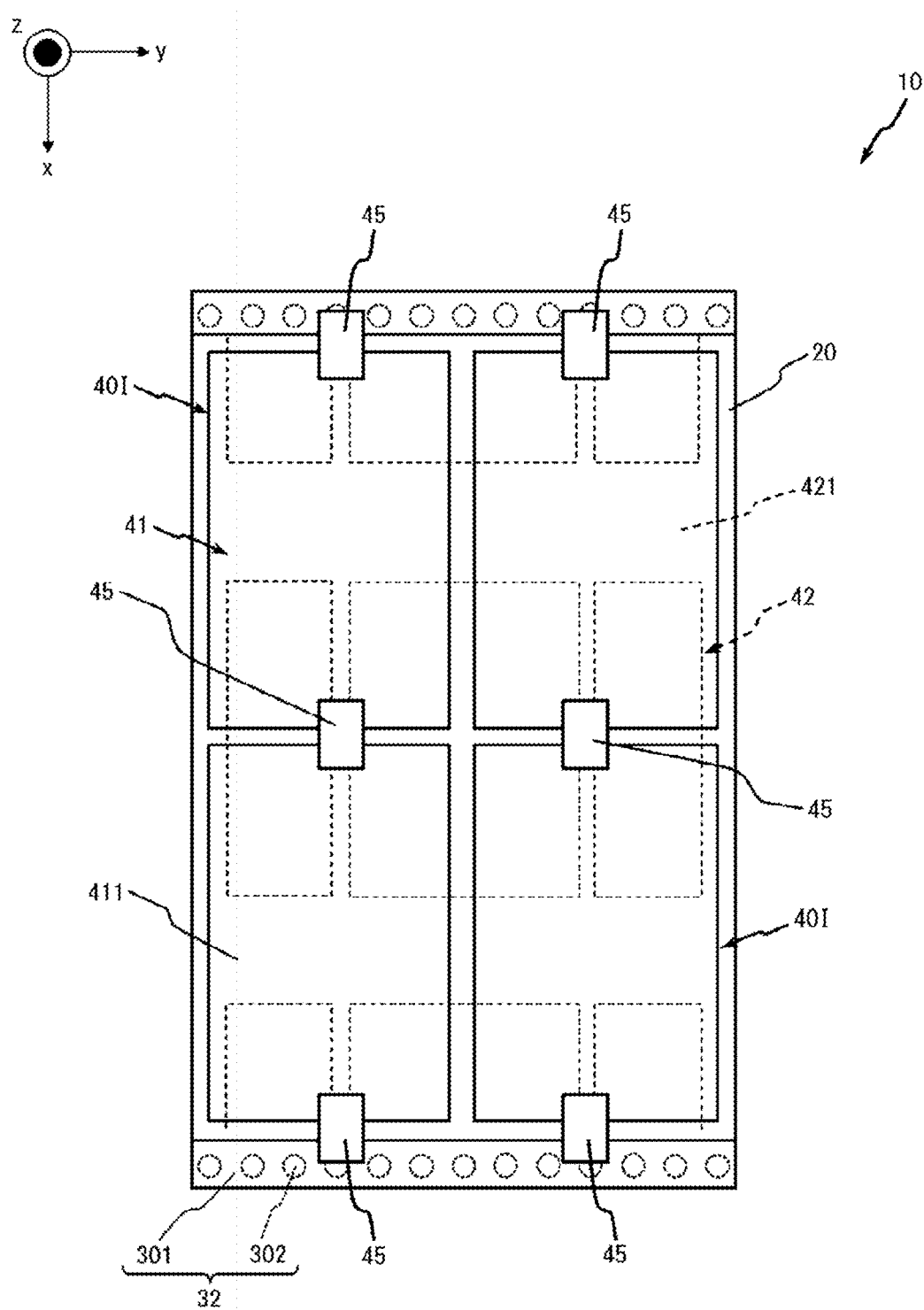
FIG. 62 is a plan view of an embodiment of a resonator.

FIGS. 60 to 62 are views each illustrating another example of the resonator 10. These resonators 10 each include the impedance element 45. A unit conductor to which the impedance element 45 is connected is not limited to the examples illustrated in FIGS. 60 to 62. The impedance element 45 illustrated in FIGS. 60 to 62 can be partially omitted. The impedance element 45 can have a capacitance characteristic. The impedance element 45 can have an inductance characteristic. The impedance element 45 can be a mechanical or electrical variable element. The impedance element 45 can connect two different conductors in one layer to each other.

An antenna has at least one of a function of radiating electromagnetic waves or a function of receiving electromagnetic waves. Antennas of the present disclosure include, but are not limited to, a first antenna 60 and a second antenna 70.

The first antenna 60 includes the base 20, the pair conductors 30, the third conductor 40, the fourth conductor 50, and a first feeding line 61. In one example, the first antenna 60 includes a third base 24 positioned on the base 20. The third base 24 can have a different composition than the base 20. The third base 24 can be positioned over the third conductor 40. FIGS. 63 to 76 are views each illustrating the first antenna 60 as an example of embodiments.

The first feeding line 61 feeds power to at least one of the resonators arranged periodically as artificial magnetic conductors. When feeding power to a plurality of resonators, the first antenna 60 can include a plurality of first feeding lines. The first feeding line 61 can be electromagnetically connected to any one of the resonators arranged periodically as artificial magnetic conductors. The first feeding line 61 can be electromagnetically connected to any one of a pair of conductors that is seen as electric conductors for the resonators that are periodically arranged as artificial magnetic conductors.

The first feeding line 61 feeds power to at least one of the first conductor 31, the second conductor 32, or the third conductor 40. When feeding power to a plurality of portions of the first conductor 31, the second conductor 32, and the third conductor 40, the first antenna 60 can include a plurality of first feeding lines. The first feeding line 61 can be electromagnetically connected to any one of the first conductor 31, the second conductor 32, or the third conductor 40. In a case where the first antenna 60 includes the reference potential layer 51 in addition to the fourth conductor 50, the first feeding line 61 can be electromagnetically connected to any one of the first conductor 31, the second conductor 32, the third conductor 40, or the fourth conductor 50. The first feeding line 61 is electrically connected to any one of the fifth conductive layer 301 or the fifth conductor 302 of the pair conductors 30. A portion of the first feeding line 61 can be integrated with the fifth conductive layer 301.

The first feeding line 61 can be electromagnetically connected to the third conductor 40. For example, the first feeding line 61 is electromagnetically connected to one of the first unit resonators 41X. For example, the first feeding line 61 is electromagnetically connected to one of the second unit resonators 42X. The first feeding line 61 is electromagnetically connected to a unit conductor of the third conductor 40 at a point different from the center in the x direction. The first feeding line 61 supplies power to at least one resonator included in the third conductor 40 in embodiments. In embodiments, the first feeding line 61 feeds power from at least one resonator included in the third conductor 40 to the outside. At least a portion of the first feeding line 61 can be positioned inside the base 20. The first feeding line 61 can be exposed to the outside from any of two zx planes, two yz planes, or two xy planes of the base 20.

The first feeding line 61 can be in contact with the third conductor 40 from forward and rearward in the z direction. The fourth conductor 50 can be omitted in the vicinity of the first feeding line 61. The first feeding line 61 can be electromagnetically connected to the third conductor 40 through an opening of the fourth conductor 50. The first conductive layer 41 can be omitted in the vicinity of the first feeding line 61. The first feeding line 61 can be connected to the second conductive layer 42 through an opening of the first conductive layer 41. The first feeding line 61 can be in contact with the third conductor 40 along the xy plane. The pair conductors 30 can be omitted in the vicinity of the first feeding line 61. The first feeding line 61 can be connected to the third conductor 40 through an opening of the pair conductors 30. The first feeding line 61 is connected to a unit conductor of the third conductor 40 at a point away from a central portion of the unit conductor.

Figure 63:
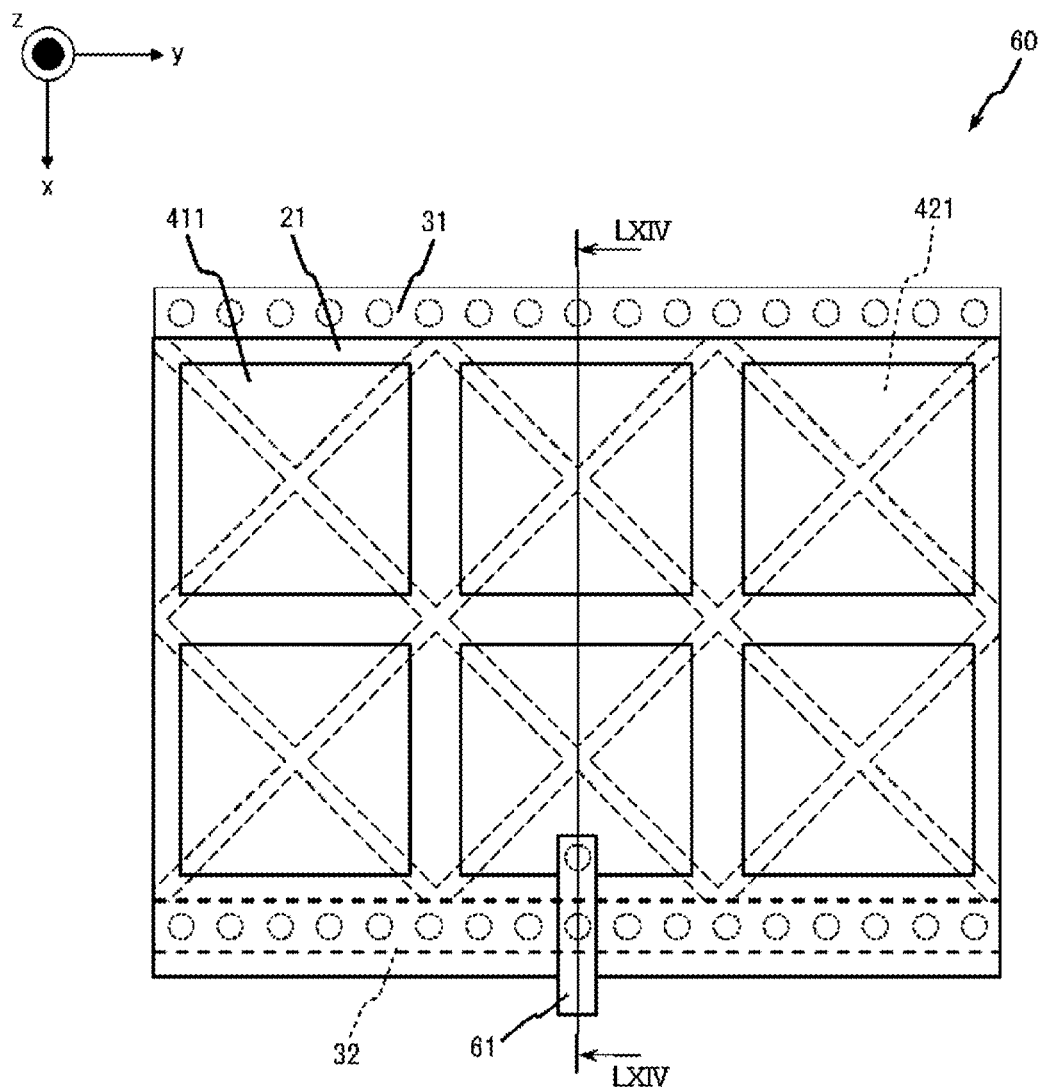
FIG. 63 is a plan view of an embodiment of an antenna.
Figure 64:
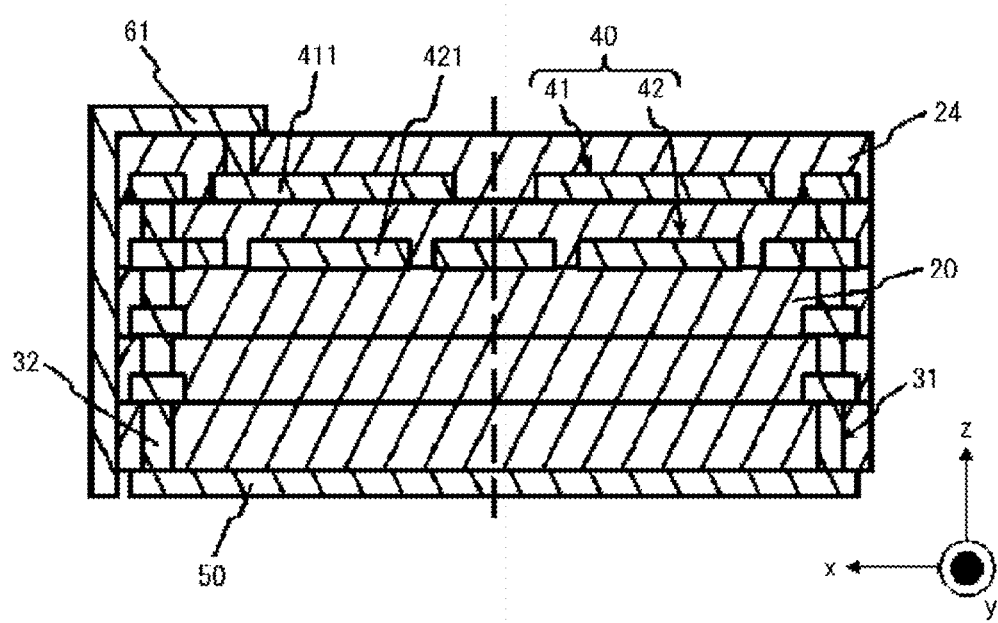
FIG. 64 is a cross-sectional view illustrating an embodiment of an antenna.

FIG. 63 is a plan view illustrating the xy plane of the first antenna 60 viewed from the z direction. FIG. 64 is a cross-sectional view taken along line LXIV-LXIV illustrated in FIG. 63. The first antenna 60 illustrated in FIGS. 63 and 64 includes the third base 24 positioned over the third conductor 40. The third base 24 has an opening on the first conductive layer 41. The first feeding line 61 is electrically connected to the first conductive layer 41 through the opening of the third base 24.

Figure 65:
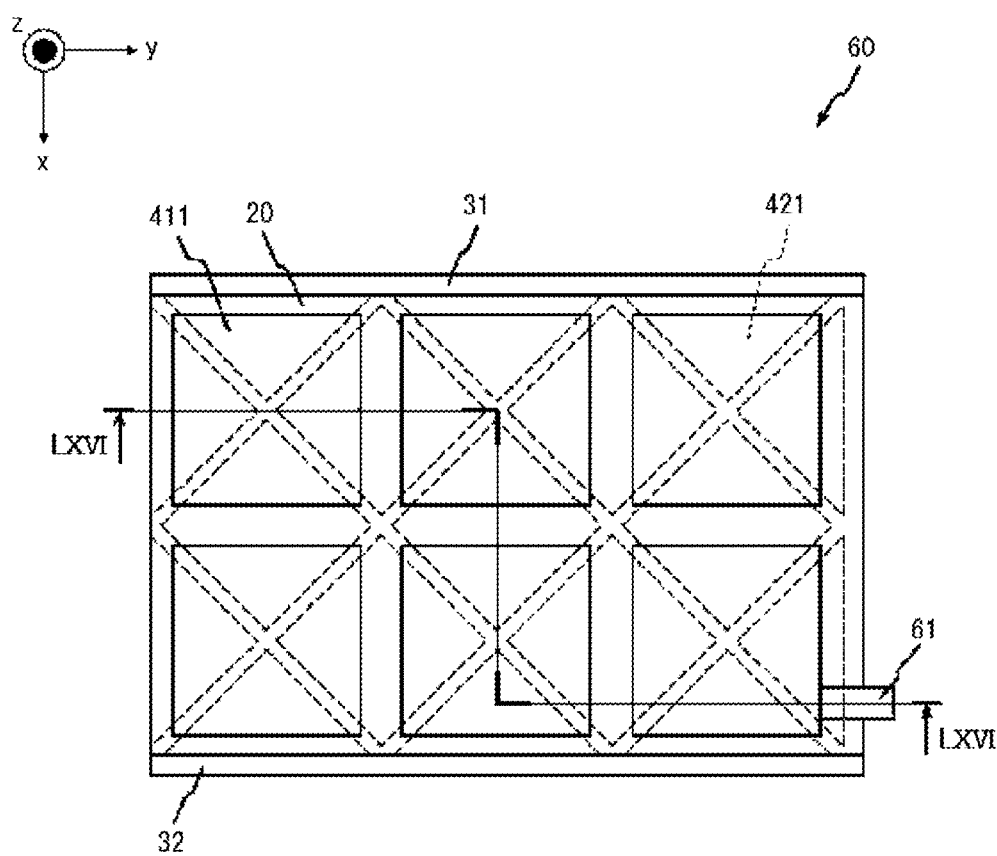
FIG. 65 is a plan view of an embodiment of an antenna.
Figure 66:
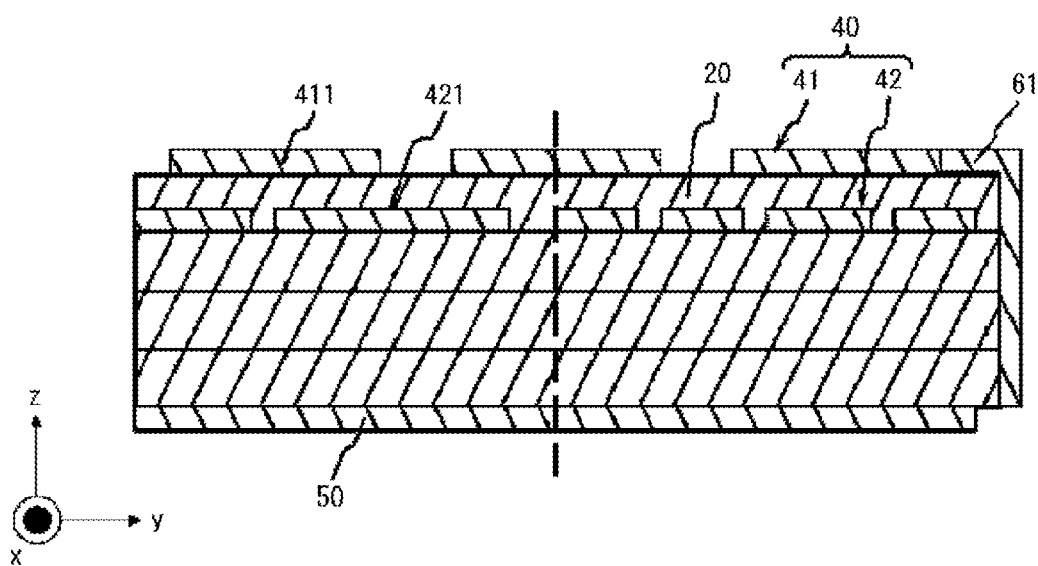
FIG. 66 is a cross-sectional view illustrating an embodiment of an antenna.

FIG. 65 is a plan view illustrating the xy plane of the first antenna 60 viewed from the z direction. FIG. 66 is a cross-sectional view taken along line LXVI-LXVI illustrated in FIG. 65. In the first antenna 60 illustrated in FIGS. 65 and 66, a portion of the first feeding line 61 is positioned on the base 20. The first feeding line 61 can be connected to the third conductor 40 in the xy plane. The first feeding line 61 can be connected to the first conductive layer 41 in the xy plane. In embodiments, the first feeding line 61 can be connected to the second conductive layer 42 in the xy plane.

Figure 67:
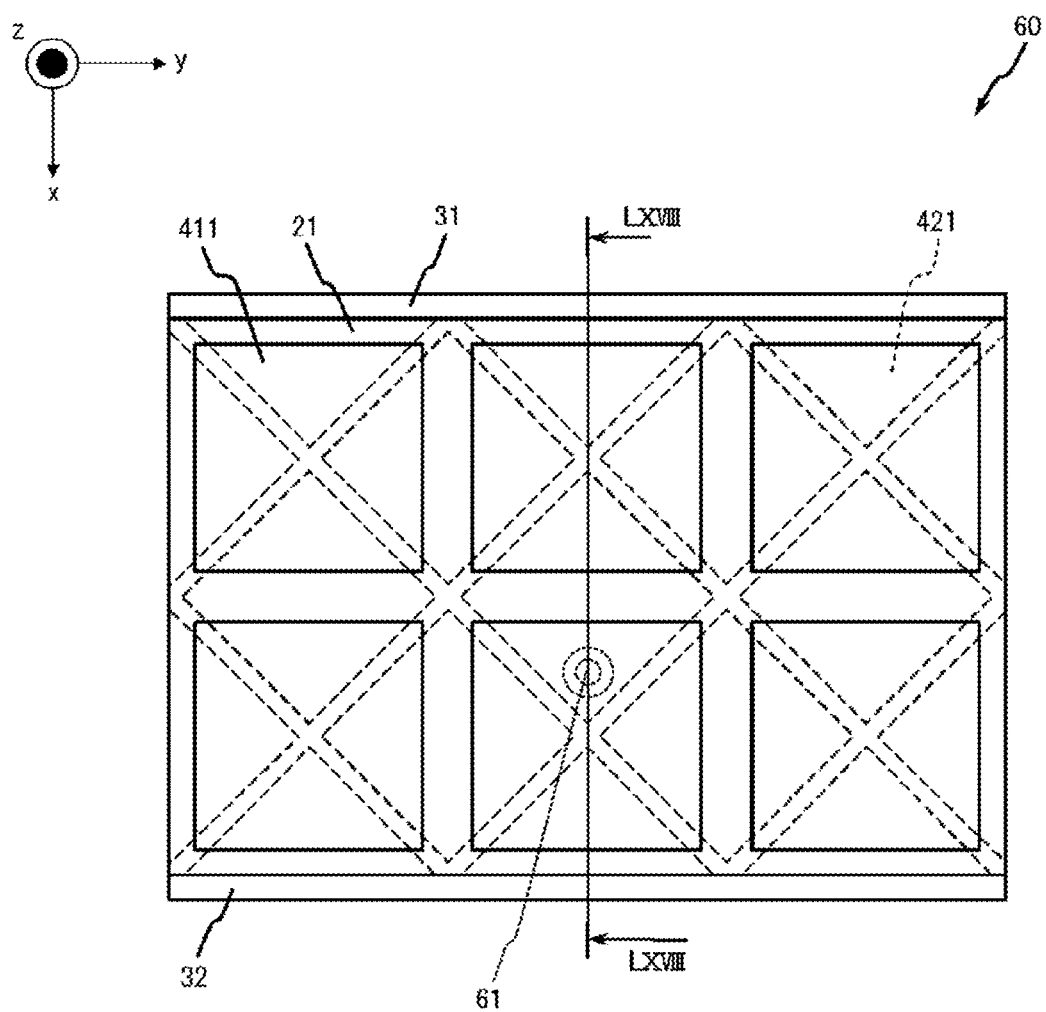
FIG. 67 is a plan view of an embodiment of an antenna.
Figure 68:
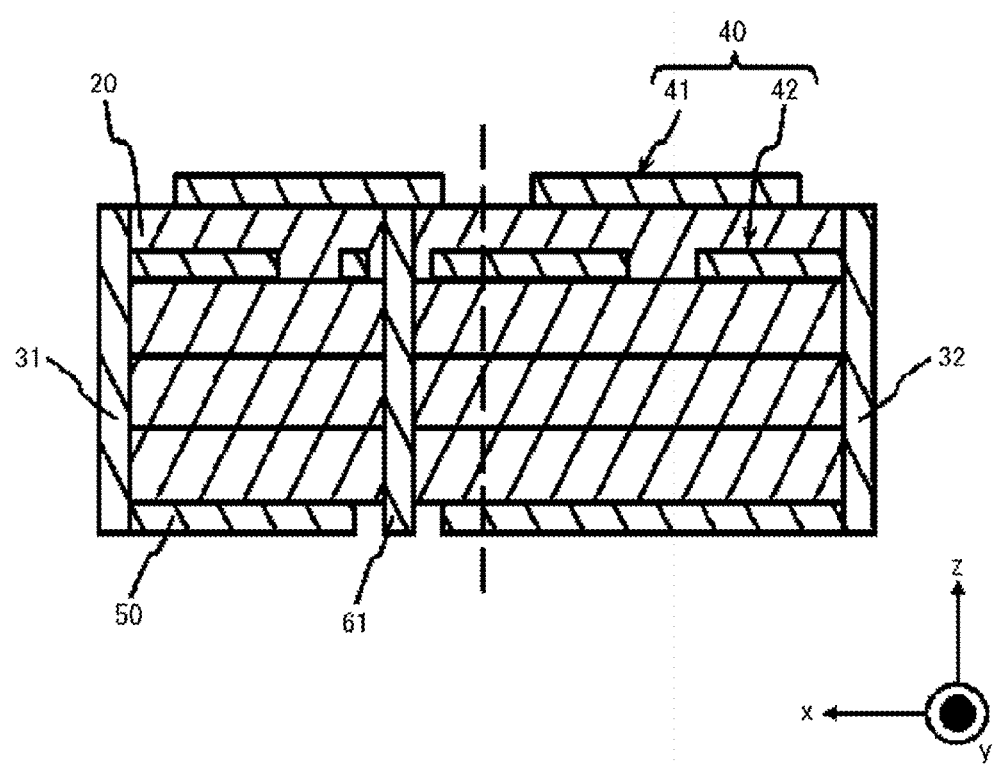
FIG. 68 is a cross-sectional view illustrating an embodiment of an antenna.

FIG. 67 is a plan view illustrating the xy plane of the first antenna 60 viewed from the z direction. FIG. 68 is a cross-sectional view taken along line LXVIII-LXVIII illustrated in FIG. 67. In the first antenna 60 illustrated in FIGS. 67 and 68, the first feeding line 61 is positioned inside the base 20. The first feeding line 61 can be connected to the third conductor 40 from rearward in the z direction. The fourth conductor 50 can have an opening. The fourth conductor 50 can have the opening at a position where the fourth conductor 50 overlaps the third conductor 40 in the z direction. The first feeding line 61 can be exposed to the outside of the base 20 through the opening.

Figure 69:
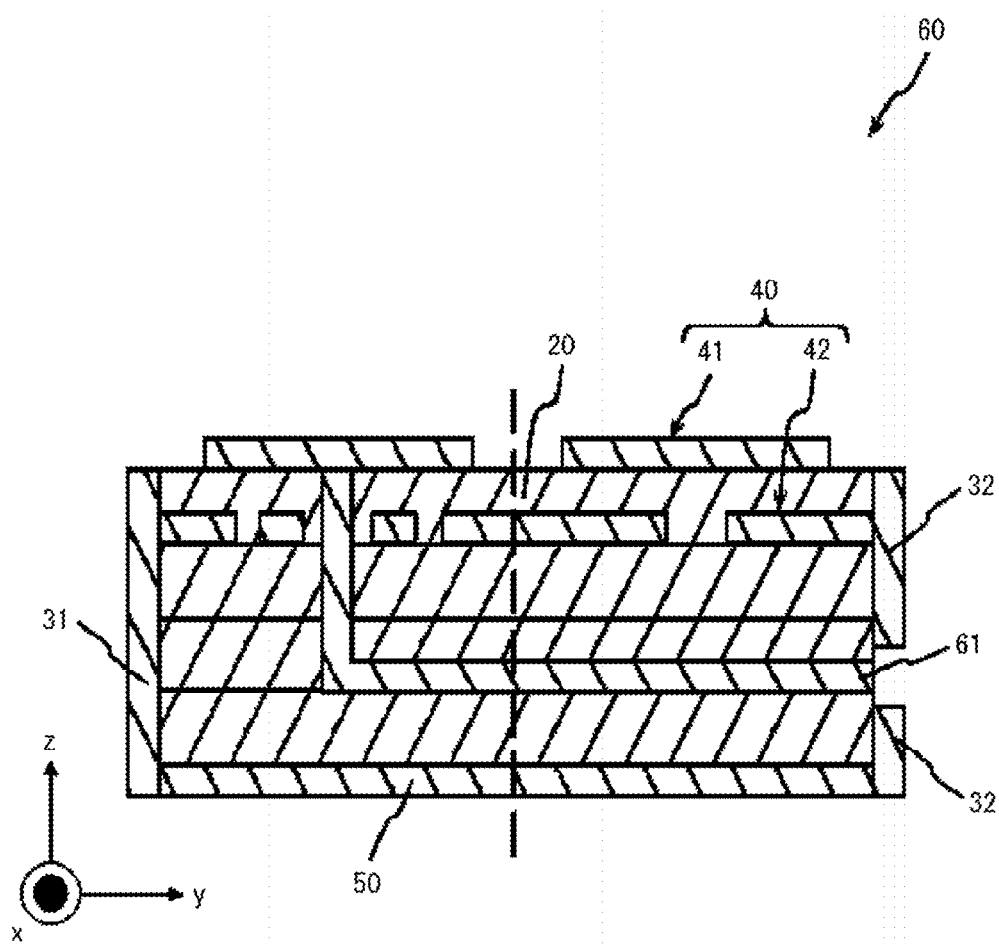
FIG. 69 is a cross-sectional view illustrating an embodiment of an antenna.

FIG. 69 is a cross-sectional view of the first antenna 60 taken along the yz plane viewed from the x direction. The pair conductors 30 can have an opening. The first feeding line 61 can be exposed to the outside of the base 20 through the opening.

Electromagnetic waves radiated by the first antenna 60 includes polarization components in the x direction more than that in the y direction in the first plane. The polarization components in the x direction are less attenuated than horizontal polarization components when a metal plate approaches the fourth conductor 50 in the z direction. The first antenna 60 can maintain radiation efficiency when the metal plate approaches from the outside.

Figure 70:
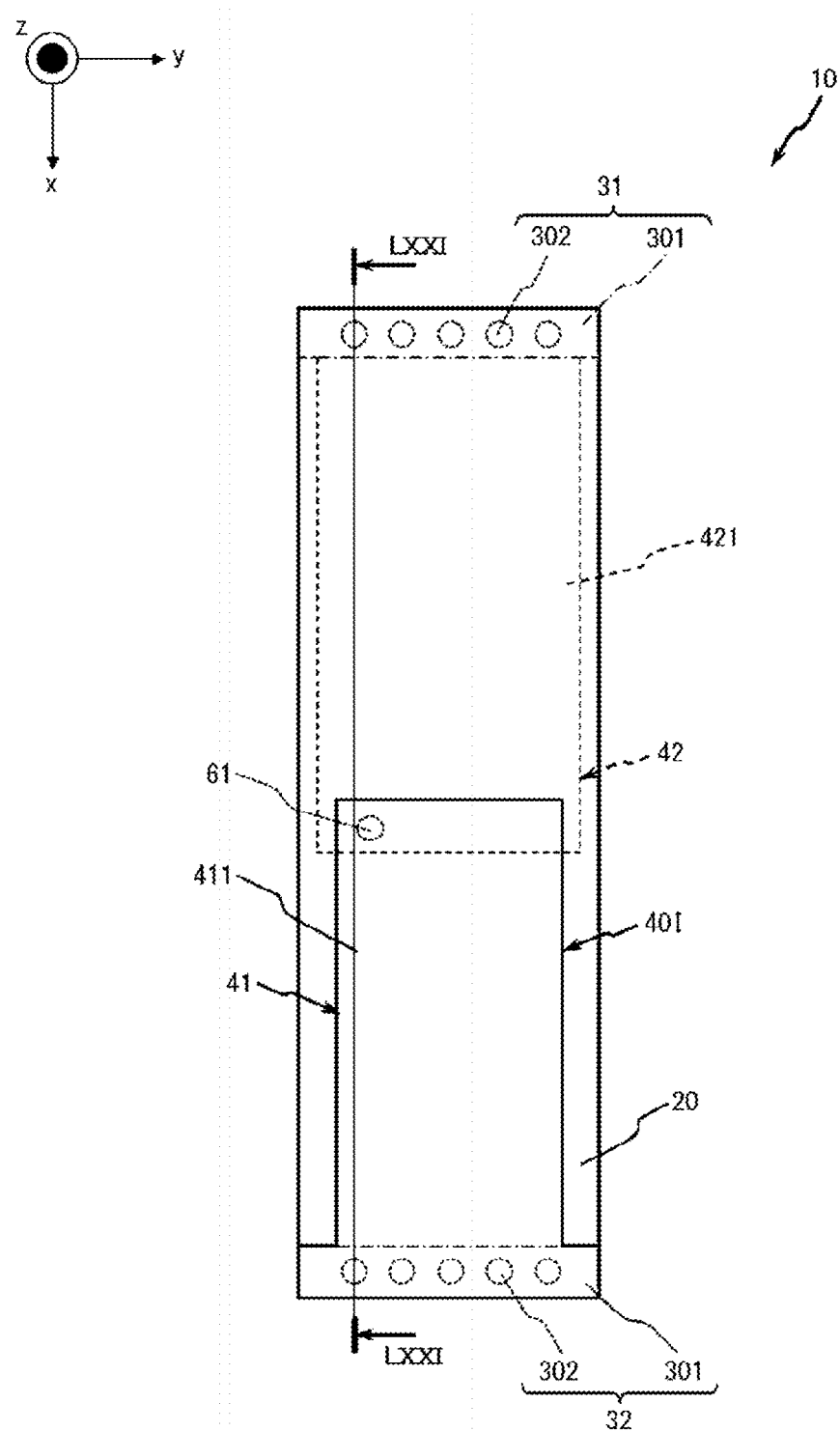
FIG. 70 is a plan view of an embodiment of an antenna.
Figure 71:
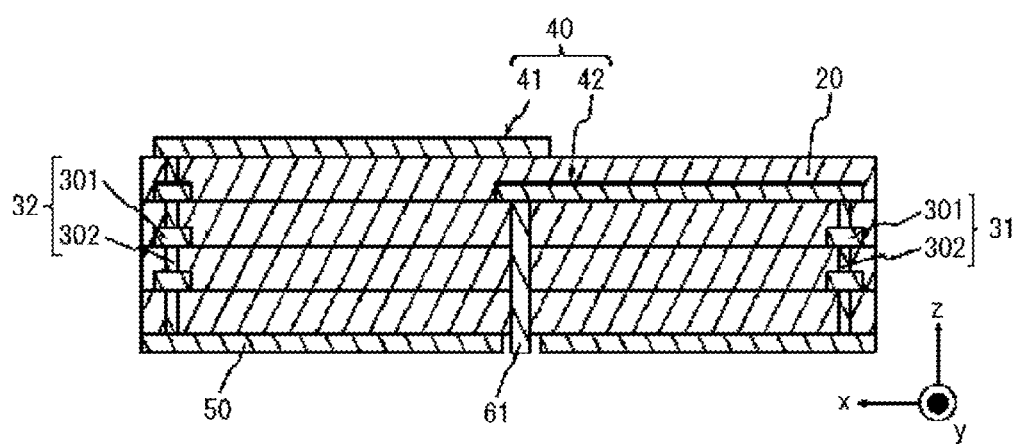
FIG. 71 is a cross-sectional view illustrating an embodiment of an antenna.
Figure 72:
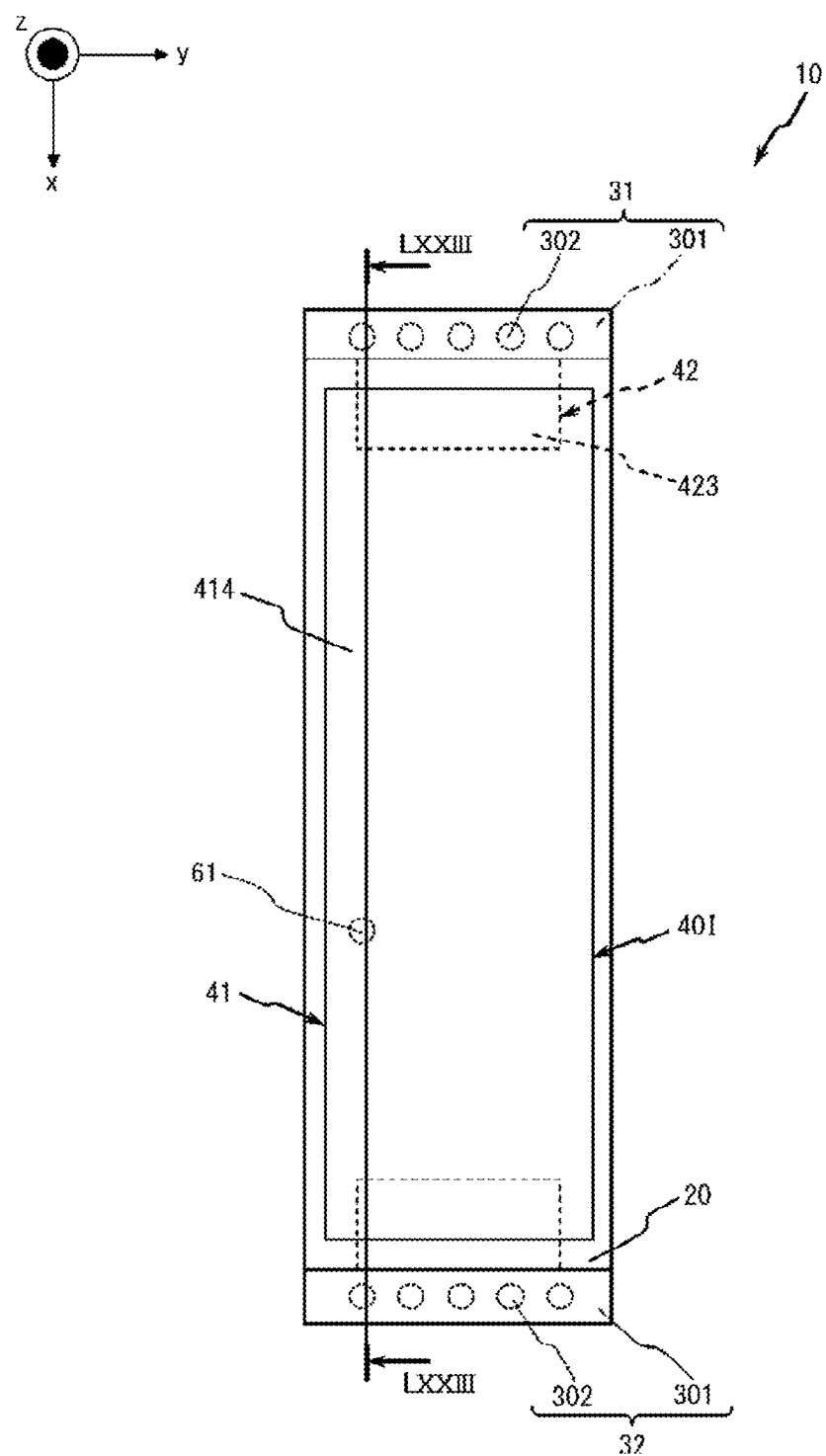
FIG. 72 is a plan view of an embodiment of an antenna.
Figure 73:
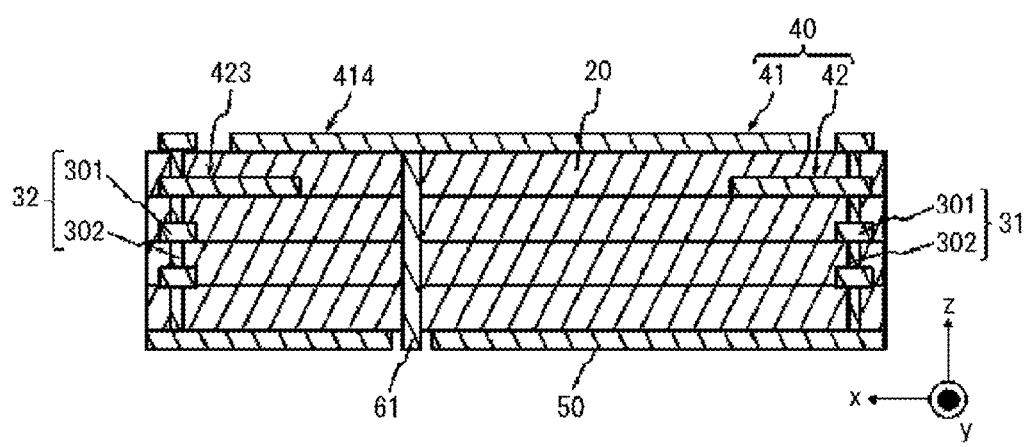
FIG. 73 is a cross-sectional view illustrating an embodiment of an antenna.
Figure 74:
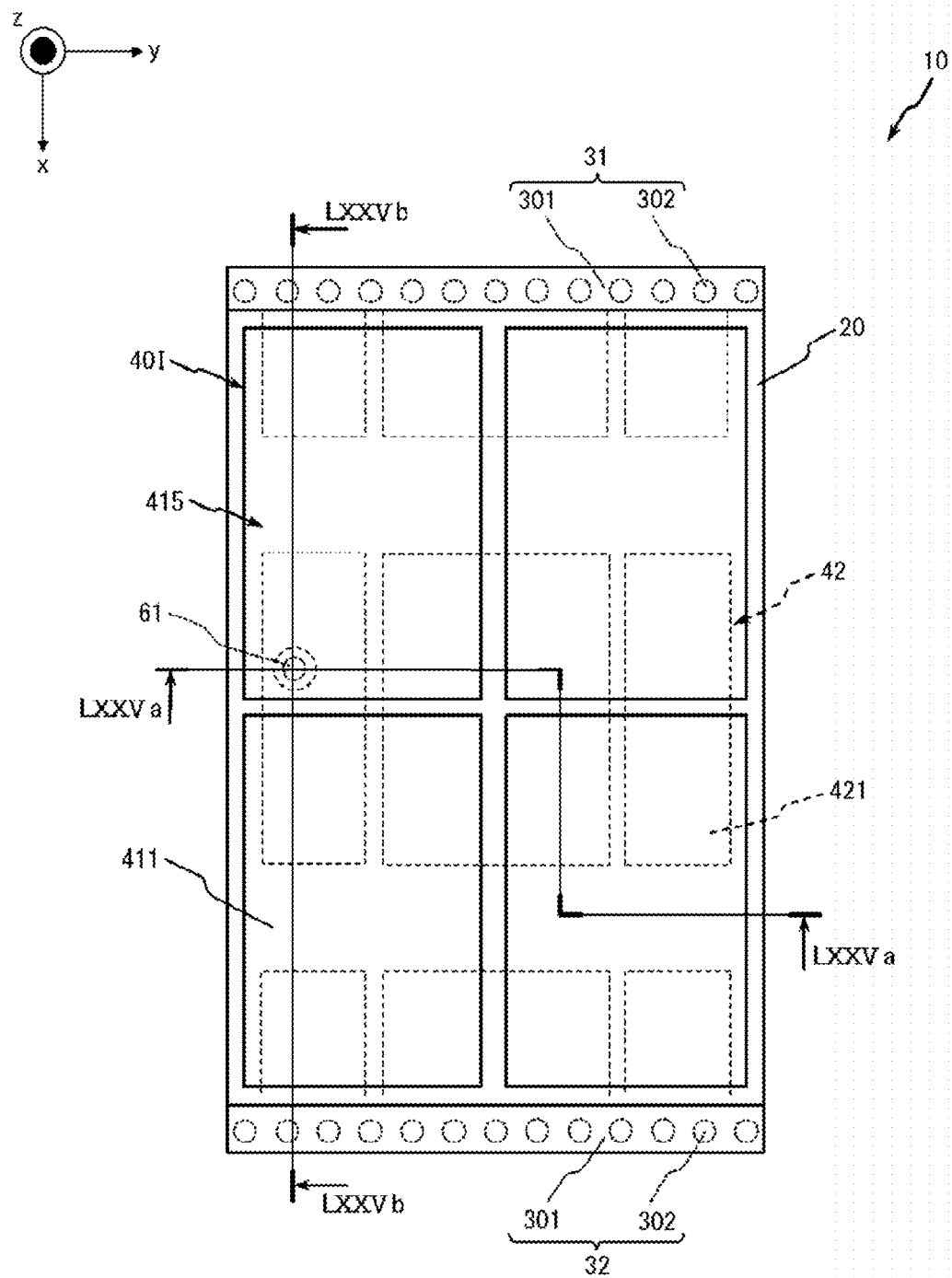
FIG. 74 is a plan view of an embodiment of an antenna.
Figure 75A:
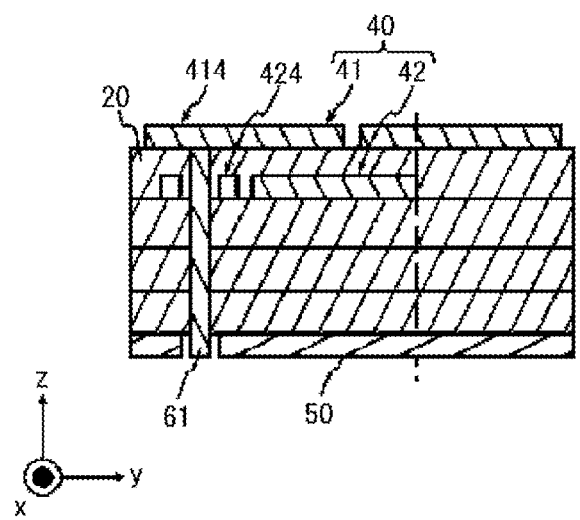
FIG. 75A is a cross-sectional view illustrating an embodiment of an antenna.
Figure 75B:
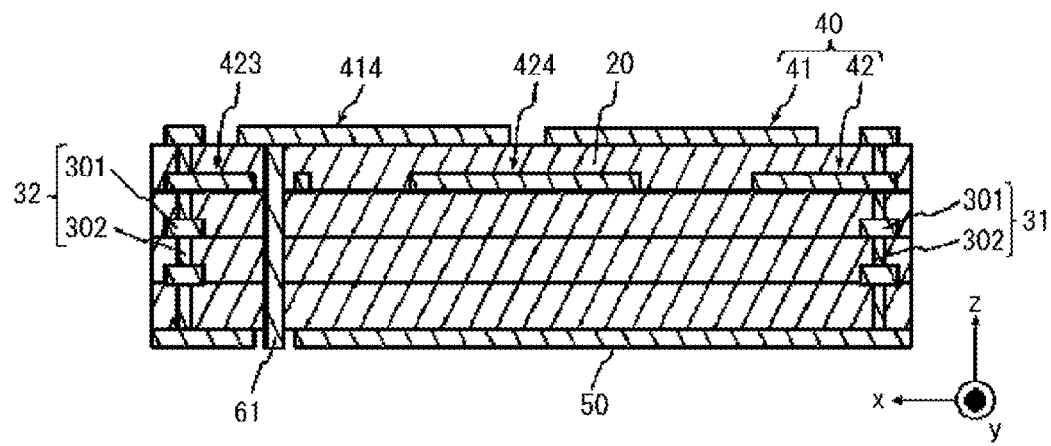
FIG. 75B is a cross-sectional view illustrating an embodiment of an antenna.
Figure 76:
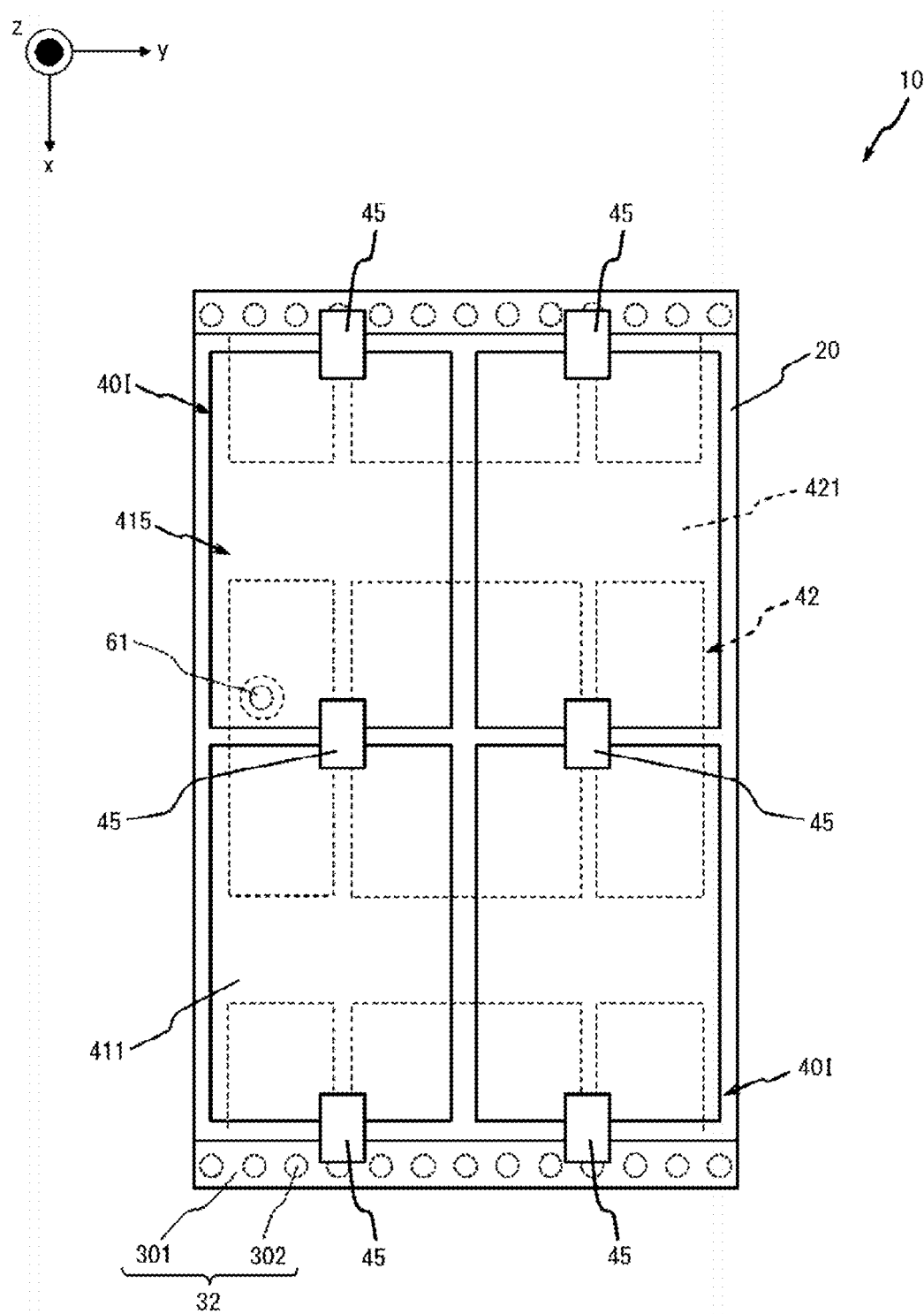
FIG. 76 is a plan view of an embodiment of an antenna.

FIG. 70 illustrates another example of the first antenna 60. FIG. 71 is a cross-sectional view taken along line LXXI-LXXI illustrated in FIG. 70. FIG. 72 illustrates another example of the first antenna 60. FIG. 73 is a cross-sectional view taken along the line LXXIII-LXXIII illustrated in FIG. 72. FIG. 74 illustrates another example of the first antenna 60. FIG. 75A is a cross-sectional view taken along line LXXVa-LXXVa illustrated in FIG. 74. FIG. 75B is a cross-sectional view taken along line LXXVb-LXXVb illustrated in FIG. 74. FIG. 76 illustrates another example of the first antenna 60. The first antenna 60 illustrated in FIG. 76 includes the impedance element 45.

The operating frequency of the first antenna 60 can be changed by the impedance element 45. The first antenna 60 includes a first feeding conductor 415 connected to the first feeding line 61 and a first unit conductor 411 that is not connected to the first feeding line 61. Impedance matching is changed when the impedance element 45 is connected to the first feeding conductor 415 and another conductor. The impedance matching of the first antenna 60 can be adjusted by connecting the first feeding conductor 415 and another conductor with the impedance element 45. In the first antenna 60, the impedance element 45 can be inserted between the first feeding conductor 415 and another conductor in order to adjust the impedance matching. In the first antenna 60, the impedance element 45 can be inserted between two first unit conductors 411 that are not connected to the first feeding line 61 in order to adjust the operating frequency. In the first antenna 60, the impedance element 45 can be inserted between one of the pair conductors 30 and the first unit conductor 411 that is not connected to the first feeding line 61 in order to adjust the operating frequency.

The second antenna 70 includes the base 20, the pair conductors 30, the third conductor 40, the fourth conductor 50, a second feeding layer 71, and a second feeding line 72. In one example, the third conductor 40 is positioned inside the base 20. In one example, the second antenna 70 includes the third base 24 positioned on the base 20. The third base 24 can have a different composition than the base 20. The third base 24 can be positioned over the third conductor 40. The third base 24 can be positioned on the second feeding layer 71.

The second feeding layer 71 is positioned above the third conductor 40 with a space therebetween. The base 20 or the third base 24 can be positioned between the second feeding layer 71 and the third conductor 40. The second feeding layer 71 includes a line-type resonator, a patch-type resonator, or a slot-type resonator. The second feeding layer 71 can be referred to as an antenna element. In one example, the second feeding layer 71 can be electromagnetically coupled to the third conductor 40. The resonant frequency of the second feeding layer 71 is changed from a single resonant frequency by electromagnetic coupling with the third conductor 40. In one example, the second feeding layer 71 receives power transmitted from the second feeding line 72 and resonates with the third conductor 40. In one example, the second feeding layer 71 receives power transmitted from the second feeding line 72 and resonates with the third conductor 40 and the third conductor.

The second feeding line 72 is electrically connected to the second feeding layer 71. In embodiments, the second feeding line 72 transmits power to the second feeding layer 71. In embodiments, the second feeding line 72 transmits power from the second feeding layer 71 to the outside.

Figure 77:
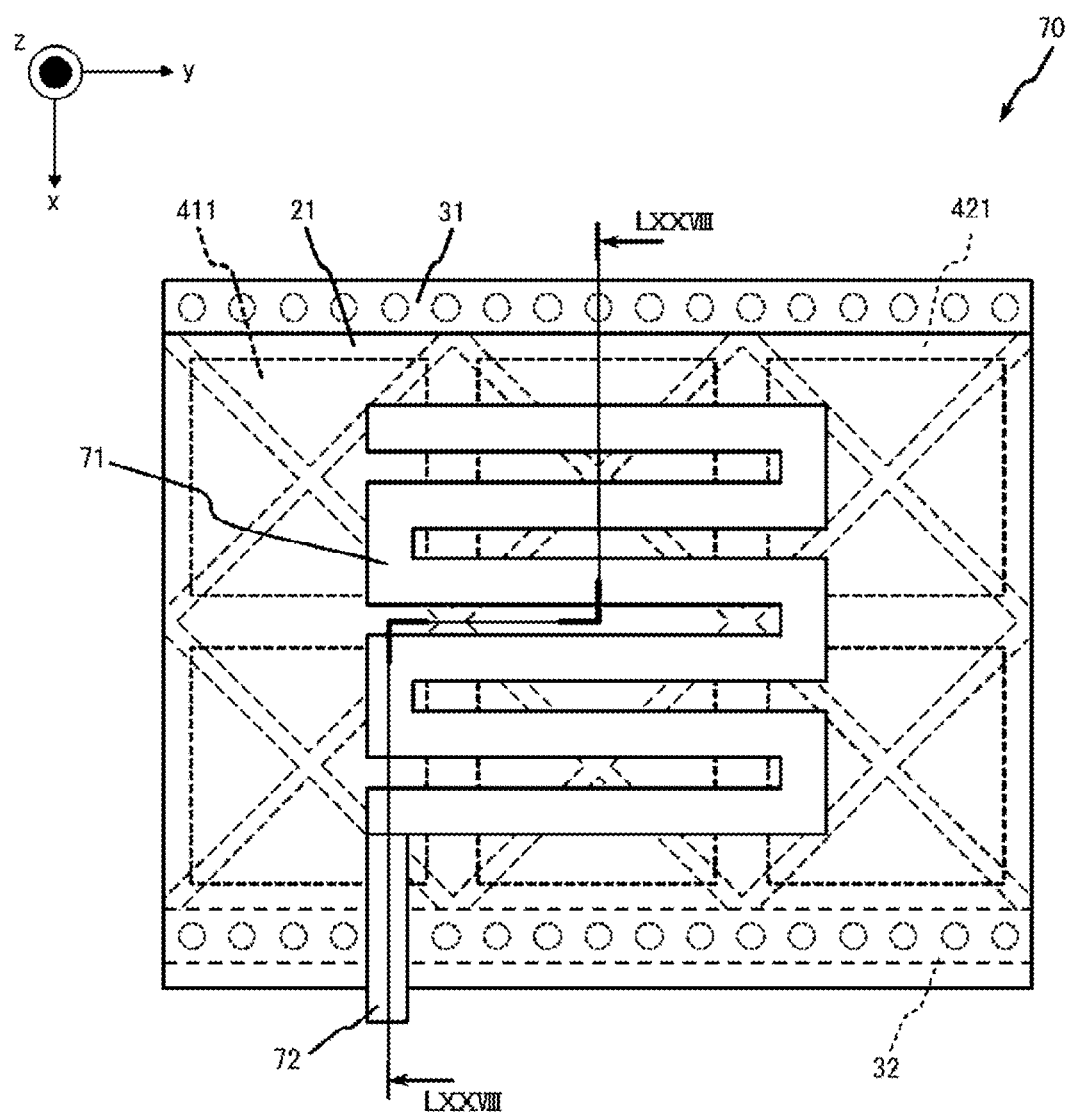
FIG. 77 is a plan view of an embodiment of an antenna.
Figure 78:
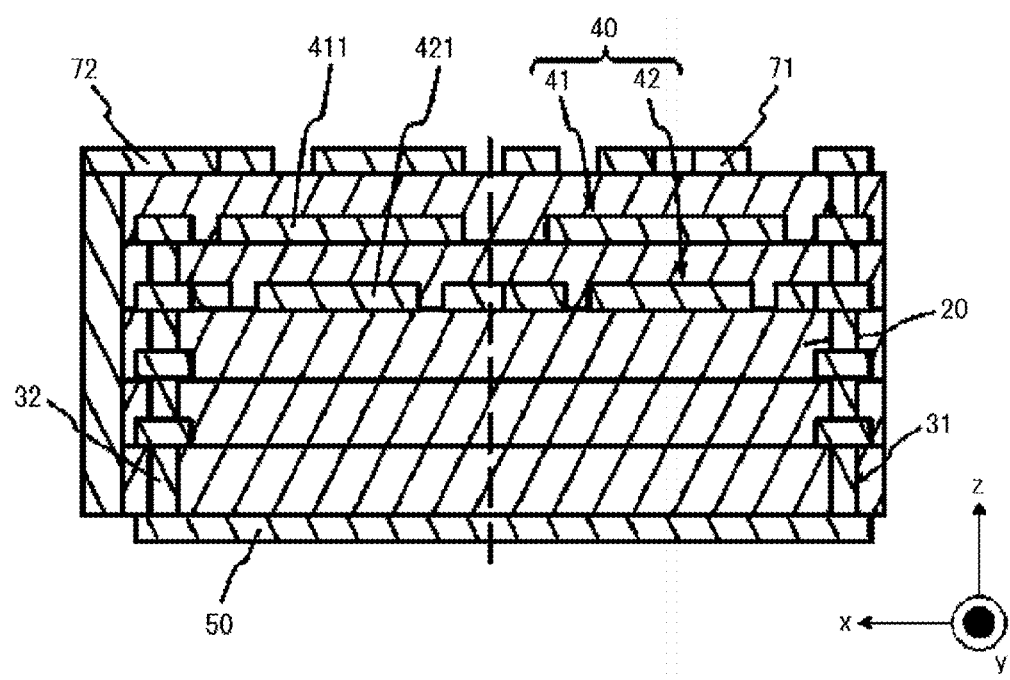
FIG. 78 is a cross-sectional view of the antenna illustrated in FIG. 43.

FIG. 77 is a plan view illustrating the xy plane of the second antenna 70 viewed from the z direction. FIG. 78 is a cross-sectional view taken along line LXXVIII-LXXVIII illustrated in FIG. 77. In the second antenna 70 illustrated in FIGS. 77 and 78, the third conductor 40 is positioned inside the base 20. The second feeding layer 71 is positioned on the base 20. The second feeding layer 71 is positioned in such a manner as to overlap the unit structure 10X in the z direction. The second feeding line 72 is positioned on the base 20. The second feeding line 72 is electromagnetically connected to the second feeding layer 71 in the xy plane.

Figure 79:
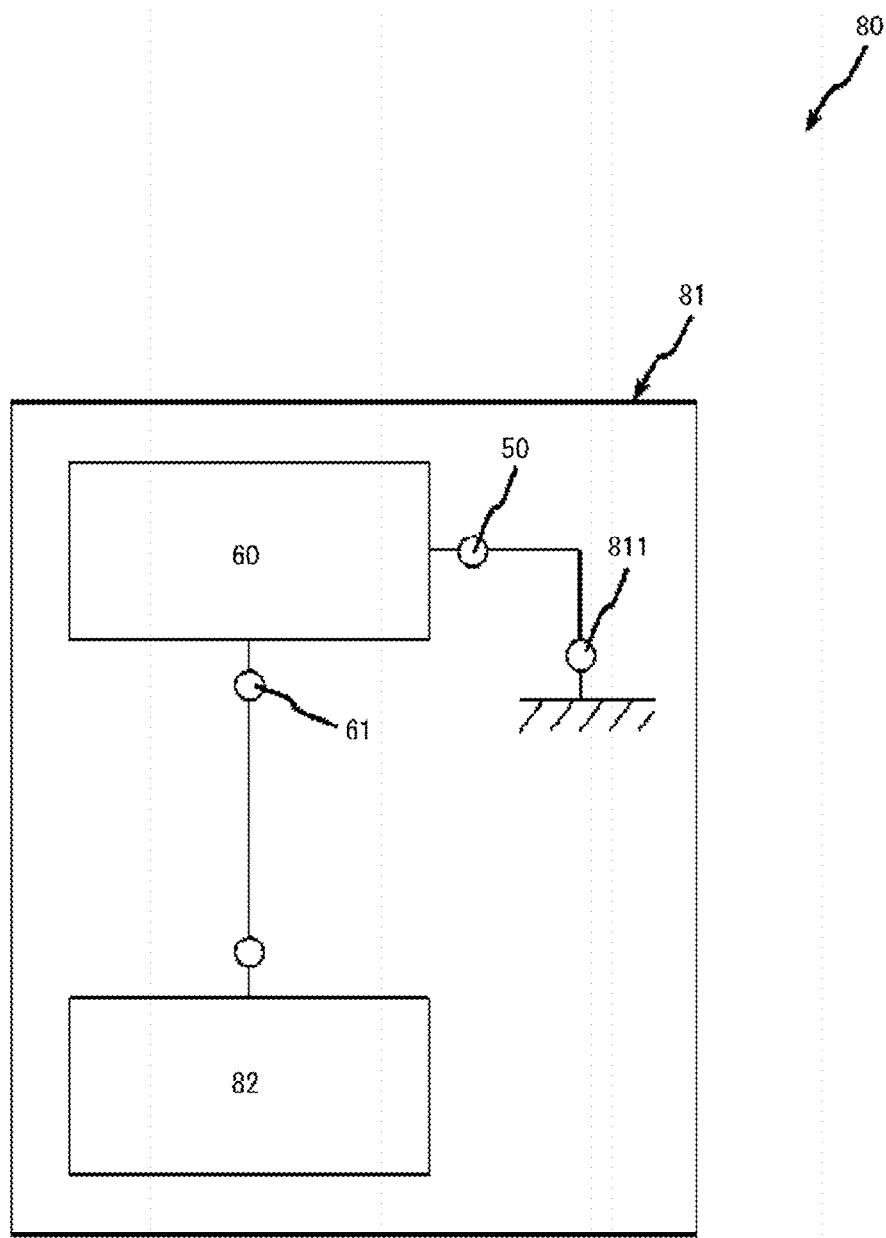
FIG. 79 is a block diagram illustrating an embodiment of a wireless communication module.
Figure 80:
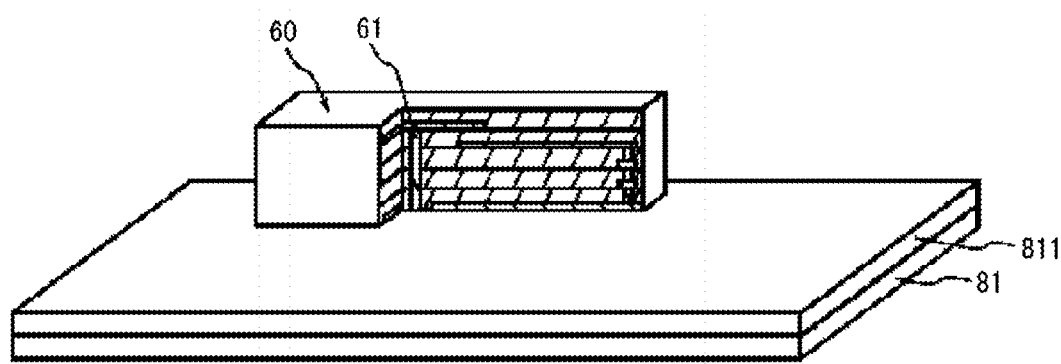
FIG. 80 is a partial cross-sectional perspective view illustrating an embodiment of a wireless communication module.

A wireless communication module of the present disclosure includes a wireless communication module 80 as an example of embodiments. FIG. 79 is a block structural diagram of the wireless communication module 80. FIG. 80 is a schematic configuration diagram of the wireless communication module 80. The wireless communication module 80 includes the first antenna 60, a circuit board 81, and an RF module 82. The wireless communication module 80 can include the second antenna 70 instead of the first antenna 60.

The first antenna 60 is positioned on the circuit board 81. The first feeding line 61 of the first antenna 60 is electromagnetically connected to the RF module 82 via the circuit board 81. The fourth conductor 50 of the first antenna 60 is electromagnetically connected to a ground conductor 811 of the circuit board 81.

The ground conductor 811 can extend in the xy plane. The ground conductor 811 has a surface integral larger than that of the fourth conductor 50 in the xy plane. The ground conductor 811 is longer than the fourth conductor 50 in the y direction. The ground conductor 811 is longer than the fourth conductor 50 in the x direction. The first antenna 60 can be positioned closer to an end side than to the center of the ground conductor 811 in the y direction. The center of the first antenna 60 can be different from the center of the ground conductor 811 in the xy plane. The center of the first antenna 60 can be different from the centers of the first conductive layer 41 and the second conductive layer 42. A point where the first feeding line 61 is connected to the third conductor 40 can be different from the center of the ground conductor 811 in the xy plane.

In the first antenna 60, the first current and the second current loop through the pair conductors 30. Since the first antenna 60 is positioned closer to the end side in the y direction than to the center of the ground conductor 811, the second current flowing through the ground conductor 811 becomes asymmetric. When the second current flowing through the ground conductor 811 becomes asymmetric, in an antenna structure including the first antenna 60 and the ground conductor 811, a polarization component of radiation waves in the x direction is increased. By increasing the polarization component of the radiation waves in the x direction, a total radiation efficiency of the radiation wave can be improved.

The RF module 82 can be operated in such a manner as to control power supplied to the first antenna 60. The RF module 82 modulates a baseband signal and supplies the modulated baseband signal to the first antenna 60. The RF module 82 can be operated in such a manner as to modulate an electric signal received by the first antenna 60 into a baseband signal.

A change in resonant frequency of the first antenna 60 due to a conductor on the circuit board 81 side is small. The wireless communication module 80 can reduce an influence of an external environment by including the first antenna 60.

The first antenna 60 can be integrated with the circuit board 81. When the first antenna 60 and the circuit board 81 are integrated with each other, the fourth conductor 50 and the ground conductor 811 are integrated with each other.

Figure 81:
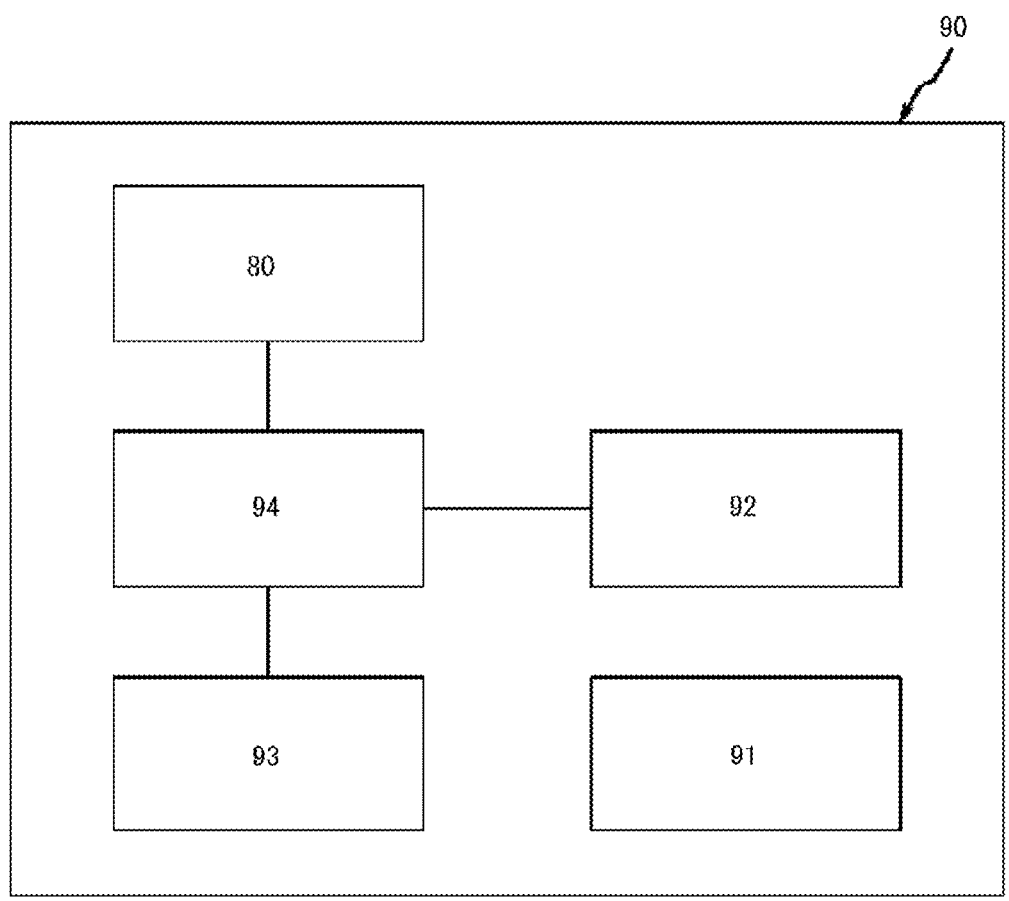
FIG. 81 is a block diagram illustrating an embodiment of a wireless communication device.
Figure 82:
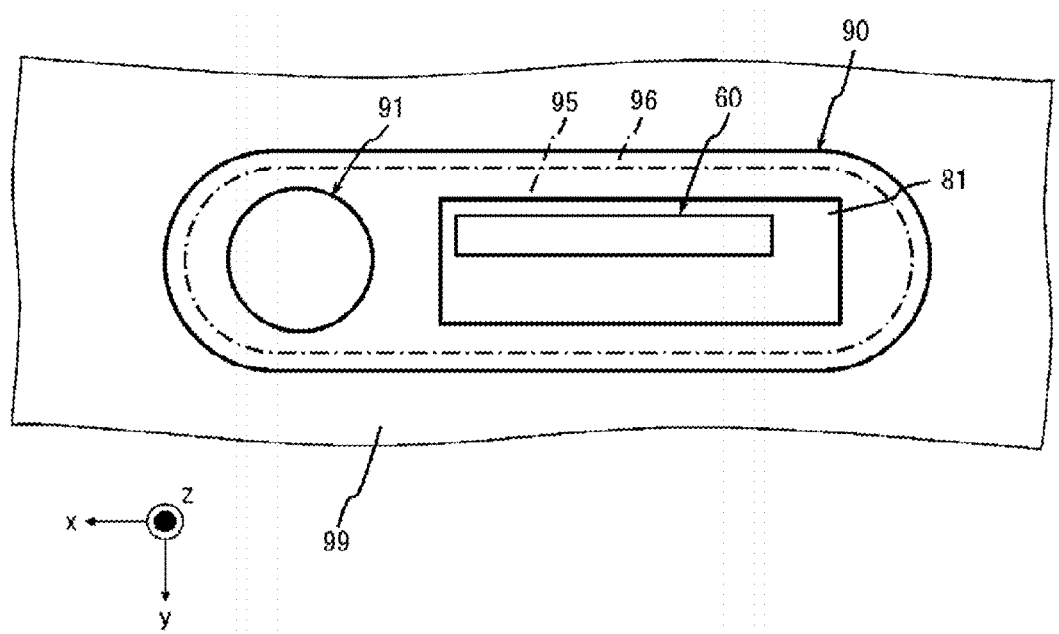
FIG. 82 is a plan view illustrating an embodiment of a wireless communication device.
Figure 83:
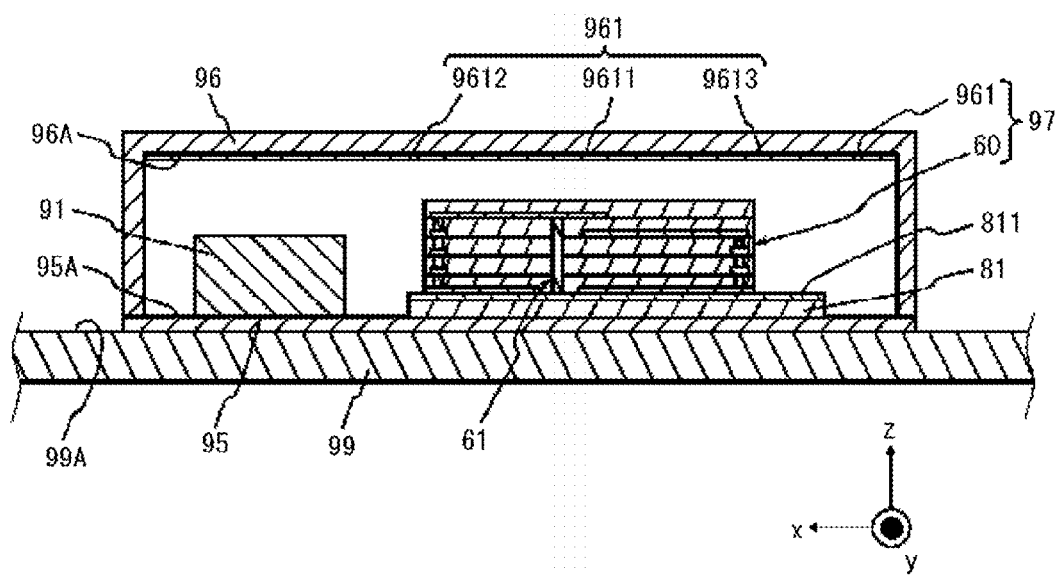
FIG. 83 is a cross-sectional view illustrating an embodiment of a wireless communication device.
Figure 84:
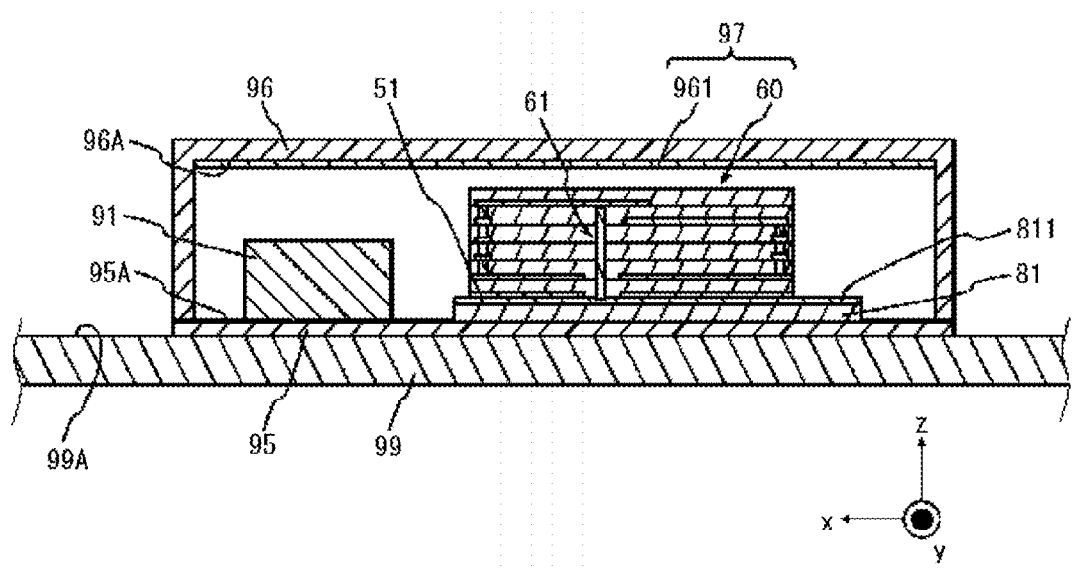
FIG. 84 is a plan view illustrating an embodiment of a wireless communication device.

A wireless communication device of the present disclosure includes a wireless communication device 90 as an example of embodiments. FIG. 81 is a block structural diagram of the wireless communication device 90. FIG. 82 is a plan view of the wireless communication device 90. The configuration of the wireless communication device 90 illustrated in FIG. 82 is partially omitted. FIG. 83 is a cross-sectional view of the wireless communication device 90. The configuration of the wireless communication device 90 illustrated in FIG. 83 is partially omitted. The wireless communication device 90 includes the wireless communication module 80, a battery 91, a sensor 92, a memory 93, a controller 94, a first case 95, and a second case 96. The wireless communication module 80 of the wireless communication device 90 includes the first antenna 60, and can include the second antenna 70. FIG. 84 is one of other embodiments of the wireless communication device 90. The first antenna 60 included in the wireless communication device 90 can include the reference potential layer 51.

The battery 91 supplies power to the wireless communication module 80. The battery 91 can supply power to at least one of the sensor 92, the memory 93, or the controller 94. The battery 91 can include at least one of a primary battery or a secondary battery. A negative electrode of the battery 91 is electrically connected to a ground terminal of the circuit board 81. The negative electrode of the battery 91 is electrically connected to the fourth conductor 50 of the first antenna 60.

Examples of the sensor 92 may include a speed sensor, a vibration sensor, an acceleration sensor, a gyro sensor, a rotation angle sensor, an angular velocity sensor, a geomagnetic sensor, a magnet sensor, a temperature sensor, a humidity sensor, an atmospheric pressure sensor, an optical sensor, an illuminance sensor, a UV sensor, a gas sensor, a gas concentration sensor, an atmosphere sensor, a level sensor, an odor sensor, a pressure sensor, an air pressure sensor, a contact sensor, a wind sensor, an infrared sensor, a motion sensor, a displacement sensor, an image sensor, a weight sensor, a smoke sensor, a leakage sensor, a vital sensor, a state-of-charge (SOC) sensor, an ultrasonic sensor, and a global positioning system (GPS) signal receiving device.

Examples of the memory 93 can include a semiconductor memory. The memory 93 can function as a work memory of the controller 94. The memory 93 can be included in the controller 94. The memory 93 stores a program describing processing for realizing each function of the wireless communication device 90, information used for processing in the wireless communication device 90, and the like.

Examples of the controller 94 can include a processor. The controller 94 may include one or more processors. The processor may be a general-purpose processor that loads a specific program and executes a specific function, or a dedicated processor that is specialized for specific processing. The dedicated processor may include an application specific integrated circuit (IC). The application specific IC is also referred to as ASIC. The processor may include a programmable logic device. The programmable logic device is also called PLD. The PLD may include a field-programmable gate array (FPGA). The controller 94 may be any one of a system on a chip (SoC) in which one or more processors cooperate, or a system in a package (SiP). The controller 94 may store, in the memory 93, various information, a program for operating each component of the wireless communication device 90, or the like.

The controller 94 can be operated in such a manner as to generate a transmission signal to be transmitted from the wireless communication device 90. The controller 94 may obtain measurement data from the sensor 92, for example. The controller 94 may generate a transmission signal according to the measurement data. The controller 94 can be operated in such a manner as to transmit a baseband signal to the RF module 82 of the wireless communication module 80.

The first case 95 and the second case 96 protect other devices of the wireless communication device 90. The first case 95 can extend in the xy plane. The first case 95 supports other devices. The first case 95 can support the wireless communication module 80. The wireless communication module 80 is positioned on an upper surface 95A of the first case 95. The first case 95 can support the battery 91. The battery 91 is positioned on the upper surface 95A of the first case 95. In one example of embodiments, the wireless communication module 80 and the battery 91 are arranged in the x direction on the upper surface 95A of the first case 95. The first conductor 31 is positioned between the battery 91 and the third conductor 40. The battery 91 is positioned on the opposite side of the pair conductors 30 from the third conductor 40.

The second case 96 can cover other devices. The second case 96 has an under surface 96A positioned to face the first antenna 60 in the z direction. The under surface 96A extends along the xy plane. The under surface 96A is not limited to being a flat surface and can be a rugged surface. The second case 96 can include an eighth conductor 961. The eighth conductor 961 is positioned on at least one of an inner portion, the outside, or the inside of the second case 96. The eighth conductor 961 is positioned on at least one of an upper surface or a side surface of the second case 96.

The eighth conductor 961 faces the first antenna 60. A first body 9611 of the eighth conductor 961 faces the first antenna 60 in the z direction. The eighth conductor 961 can include, in addition to the first body 9611, at least one of a second body facing the first antenna 60 in the x direction or a third body facing the first antenna in the y direction. A portion of the eighth conductor 961 faces the battery 91.

The eighth conductor 961 can include a first extra-body 9612 that extends outward from the first conductor 31 in the x direction. The eighth conductor 961 can include a second extra-body 9613 that extends outward from the second conductor 32 in the x direction. The first extra-body 9612 can be electrically connected to the first body 9611. The second extra-body 9613 can be electrically connected to the first body 9611. The first extra-body 9612 of the eighth conductor 961 faces the battery 91 in the z direction. The eighth conductor 961 can be capacitively coupled to the battery 91. A capacitance can be formed between the eighth conductor 961 and the battery 91.

The eighth conductor 961 is separated from the third conductor 40 of the first antenna 60. The eighth conductor 961 is not electrically connected to each conductor of the first antenna 60. The eighth conductor 961 can be separated from the first antenna 60. The eighth conductor 961 can be electromagnetically coupled to any conductor of the first antenna 60. The first body 9611 of the eighth conductor 961 can be electromagnetically coupled to the first antenna 60. The first body 9611 can overlap the third conductor 40 when viewed in plan from the z direction. Since the first body 9611 overlaps the third conductor 40, propagation due to electromagnetic coupling can be increased. Electromagnetic coupling between the eighth conductor 961 and the third conductor 40 can cause a mutual inductance.

The eighth conductor 961 extends in the x direction. The eighth conductor 961 extends along the xy plane. The length of the eighth conductor 961 is larger than the length of the first antenna 60 in the x direction. The length of the eighth conductor 961 in the x direction is larger than the length of the first antenna 60 in the x direction. The length of the eighth conductor 961 can be larger than ½ of the operating wavelength λ of the wireless communication device 90. The eighth conductor 961 can include a portion extending in the y direction. The eighth conductor 961 can be bent in the xy plane. The eighth conductor 961 can include a portion extending in the z direction. The eighth conductor 961 can be bent from the xy plane to the yz plane or the zx plane.

Figure 85:
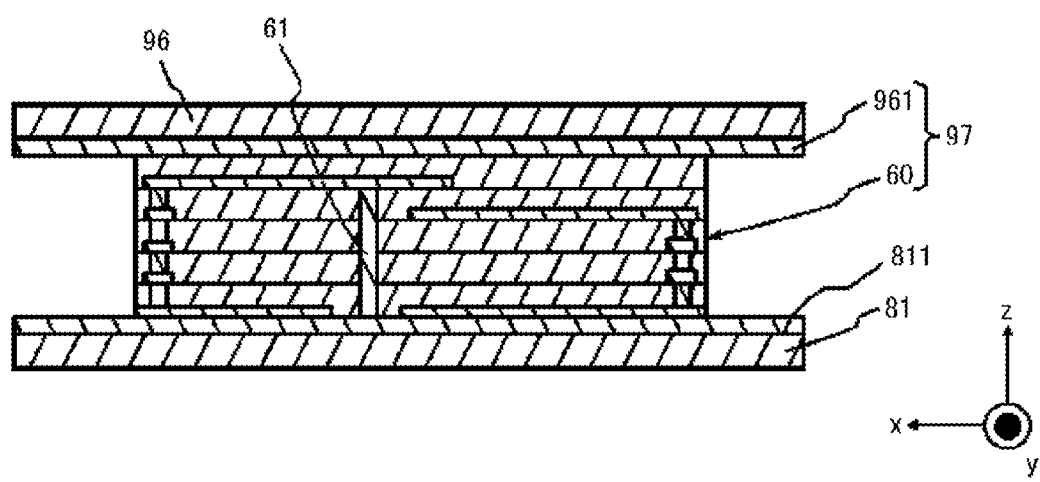
FIG. 85 is a cross-sectional view illustrating an embodiment of a wireless communication device.

The wireless communication device 90 including the eighth conductor 961 can function as a third antenna 97 by electromagnetically coupling the first antenna 60 and the eighth conductor 961 to each other. The operating frequency $f_c$ of the third antenna 97 may be different from the resonant frequency of the first antenna 60 alone. The operating frequency $f_c$ of the third antenna 97 may be closer to the resonant frequency of the first antenna 60 than to the resonant frequency of the eighth conductor 961 alone. The operating frequency $f_c$ of the third antenna 97 can be within a resonant frequency band of the first antenna 60. The operating frequency $f_c$ of the third antenna 97 can be out of a resonant frequency band of the eighth conductor 961 alone. FIG. 85 is another embodiment of the third antenna 97. The eighth conductor 961 can be integrated with the first antenna 60. In FIG. 85, the configuration of the wireless communication device 90 is partially omitted. In the example of FIG. 85, the second case 96 does not have to include the eighth conductor 961.

In the wireless communication device 90, the eighth conductor 961 is capacitively coupled to the third conductor 40. The eighth conductor 961 is electromagnetically coupled to the fourth conductor 50. Since the third antenna 97 includes the first extra-body 9612 and the second extra-body 9613 of the eighth conductor in the air, a gain is improved as compared with the first antenna 60.

Figure 86:
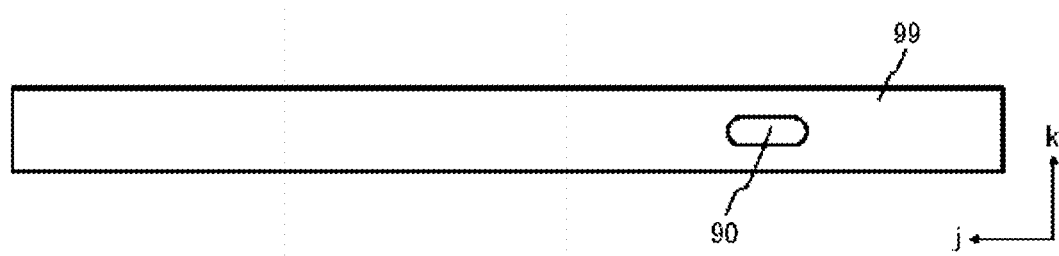
FIG. 86 is a cross-sectional view illustrating an embodiment of an antenna.

The wireless communication device 90 can be positioned on various objects. The wireless communication device 90 can be positioned on an electrical conductive body 99. FIG. 86 is a plan view illustrating an embodiment of the wireless communication device 90. The electrical conductive body 99 is a conductor that conducts electricity. The material of the electrical conductive body 99 is a metal, a highly doped semiconductor, a conductive plastic, or a liquid containing ions. The electrical conductive body 99 can include a non-conductive layer that does not conduct electricity and is positioned on a surface of the electrical conductive body 99. A portion that conducts electricity and the non-conductive layer can contain a common chemical element. For example, the electrical conductive body 99 containing aluminum can include a non-conductive layer containing aluminum oxide and positioned on the surface thereof. The portion that conducts electricity and the non-conductive layer can each include a different chemical element.

The shape of the electrical conductive body 99 is not limited to a flat plate shape, and can be a three-dimensional shape such as a box shape. The three-dimensional shape of the electrical conductive body 99 is a rectangular parallelepiped or a cylinder. The three-dimensional shape can be a partially depressed shape, a partially penetrated shape, or a partially protruding shape. For example, the electrical conductive body 99 can have a torus shape.

The electrical conductive body 99 has an upper surface 99A on which the wireless communication device 90 can be placed. The upper surface 99A can extend over the entire surface of the electrical conductive body 99. The upper surface 99A can be a portion of the electrical conductive body 99. The upper surface 99A can have a surface integral larger than that of the wireless communication device 90. The wireless communication device 90 can be placed on the upper surface 99A of the electrical conductive body 99. The upper surface 99A can have a surface integral smaller than the wireless communication device 90. The wireless communication device 90 can be partially placed on the upper surface 99A of the electrical conductive body 99. The wireless communication device 90 can be placed on the upper surface 99A of the electrical conductive body 99 in various orientations. The orientation of the wireless communication device 90 can be arbitrary. The wireless communication device 90 can be appropriately fixed on the upper surface 99A of the electrical conductive body 99 by using a fixture. The fixture includes one used for surface-fixation, such as a double-sided tape or an adhesive. The fixture includes one used for point-fixation, such as a screw or a nail.

The upper surface 99A of the electrical conductive body 99 can have a portion extending in a j direction. The length of the portion in the j direction is larger than the length of the portion in a k direction, the portion extending in the j direction. The j direction and the k direction are orthogonal to each other. The j direction is a direction in which the electrical conductive body 99 extends longitudinally. The k direction is a direction in which the electrical conductive body 99 has a length smaller than that in the j direction. The wireless communication device 90 can be placed on the upper surface 99A in such a manner that the x direction is along the j direction. The wireless communication device 90 can be placed on the upper surface 99A of the electrical conductive body 99 in such a manner as to be aligned with the x direction in which the first conductor 31 and the second conductor 32 are arranged. When the wireless communication device 90 is positioned on the electrical conductive body 99, the first antenna 60 can be electromagnetically coupled to the electrical conductive body 99. In the fourth conductor 50 of the first antenna 60, the second current flows in the x direction. A current is induced in the electrical conductive body 99 electromagnetically coupled to the first antenna 60 by the second current. When the x direction of the first antenna 60 and the j direction of the electrical conductive body 99 are aligned, in the electrical conductive body 99, a current flowing in the j direction is increased.

When the x direction of the first antenna 60 and the j direction of the electrical conductive body 99 are aligned, in the electrical conductive body 99, the radiation by the induced current is increased. An angle of the x direction with respect to the j direction can be 45 degrees or less.

The ground conductor 811 of the wireless communication device 90 is separated from the electrical conductive body 99. The ground conductor 811 is separated from the electrical conductive body 99. The wireless communication device 90 can be placed on the upper surface 99A in such a manner that a direction along a longer side of the upper surface 99A is aligned with the x direction in which the first conductor 31 and the second conductor 32 are arranged. The upper surface 99A can be a rectangular surface, a rhombus-shaped surface, or a circular surface. The electrical conductive body 99 can have a rhombus-shaped surface. This rhombus-shaped surface can be the upper surface 99A on which the wireless communication device 90 is placed. The wireless communication device 90 can be placed on the upper surface 99A in such a manner that a direction along a longer diagonal line of the upper surface 99A is aligned with the x direction in which the first conductor 31 and the second conductor 32 are arranged. The upper surface 99A is not limited to be a flat surface. The upper surface 99A can be a rugged surface. The upper surface 99A can include a curved surface. The curved surface includes a ruled surface. The curved surface includes a cylindrical surface.

The electrical conductive body 99 extends in the xy plane. The length of the electrical conductive body 99 in the x direction can be larger than the length of the electrical conductive body 99 in the y direction. The length of the electrical conductive body 99 in the y direction can be smaller than a half of a wavelength $\lambda_c$ at the operating frequency $f_c$ of the third antenna 97. The wireless communication device 90 can be positioned on an electrical conductive body 99. The electrical conductive body 99 is positioned away from the fourth conductor 50 in the z direction. The length of the electrical conductive body 99 in the x direction is larger than that of the fourth conductor 50. The surface integral of the electrical conductive body 99 in the xy plane is larger than that of the fourth conductor 50. The electrical conductive body 99 is positioned away from the ground conductor 811 in the z direction. The length of the electrical conductive body 99 in the x direction is larger than that of the ground conductor 811. The surface integral of the electrical conductive body 99 in the xy plane is larger than that of the ground conductor 811.

The wireless communication device 90 can be placed on the electrical conductive body 99 in an orientation in which the x direction in which the first conductor 31 and the second conductor 32 are arranged is aligned with the direction in which the electrical conductive body 99 extends longitudinally. In other words, the wireless communication device 90 can be placed on the electrical conductive body 99 in an orientation in which a direction in which the current of the first antenna 60 flows in the xy plane is aligned with the direction in which the electrical conductive body 99 extends longitudinally.

A change in resonant frequency of the first antenna 60 due to a conductor on the circuit board 81 side is small. Since the wireless communication device 90 includes the first antenna 60, an influence of an external environment can be reduced.

In the wireless communication device 90, the ground conductor 811 is capacitively coupled to the electrical conductive body 99. Since the wireless communication device 90 includes a portion of the electrical conductive body 99 that extends outward from the third antenna 97, a gain is increased as compared with the first antenna 60.

Figure 87:
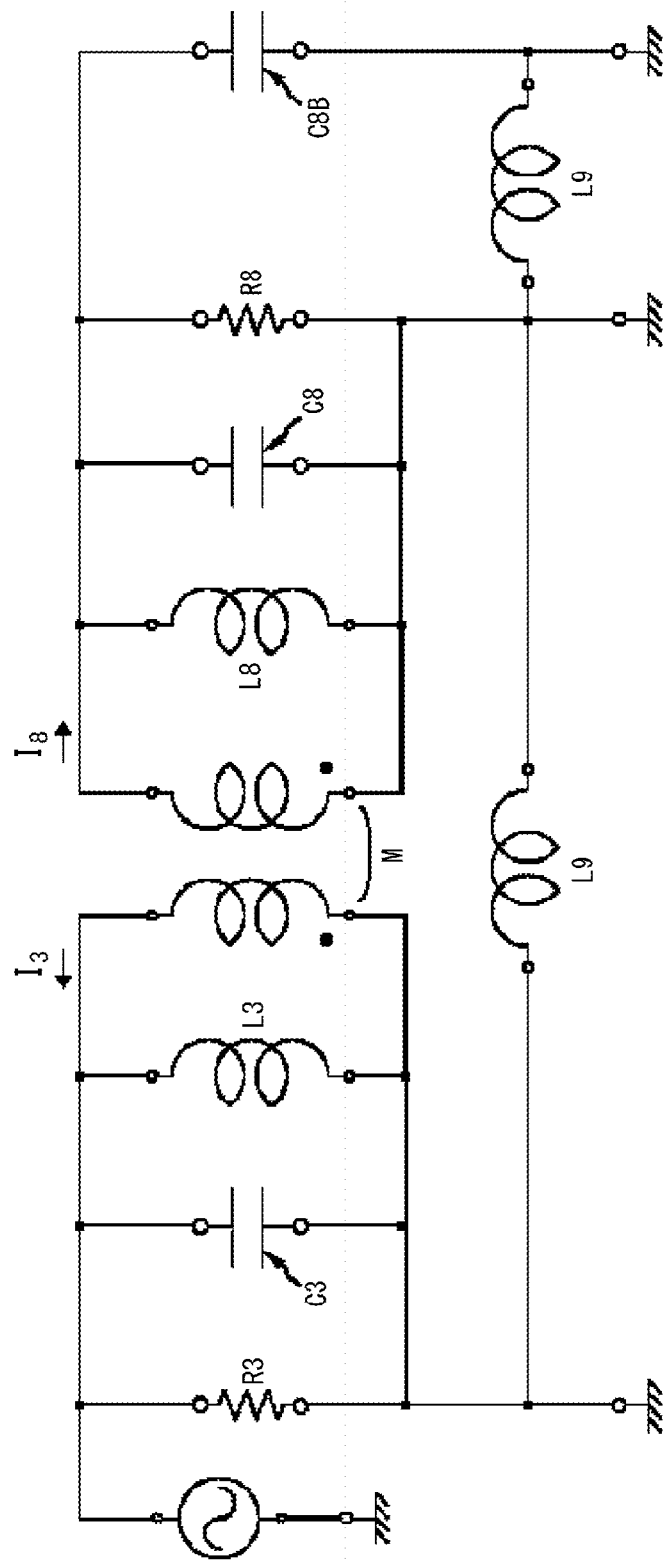
FIG. 87 is a diagram illustrating a schematic circuit of a wireless communication device.
Figure 88:
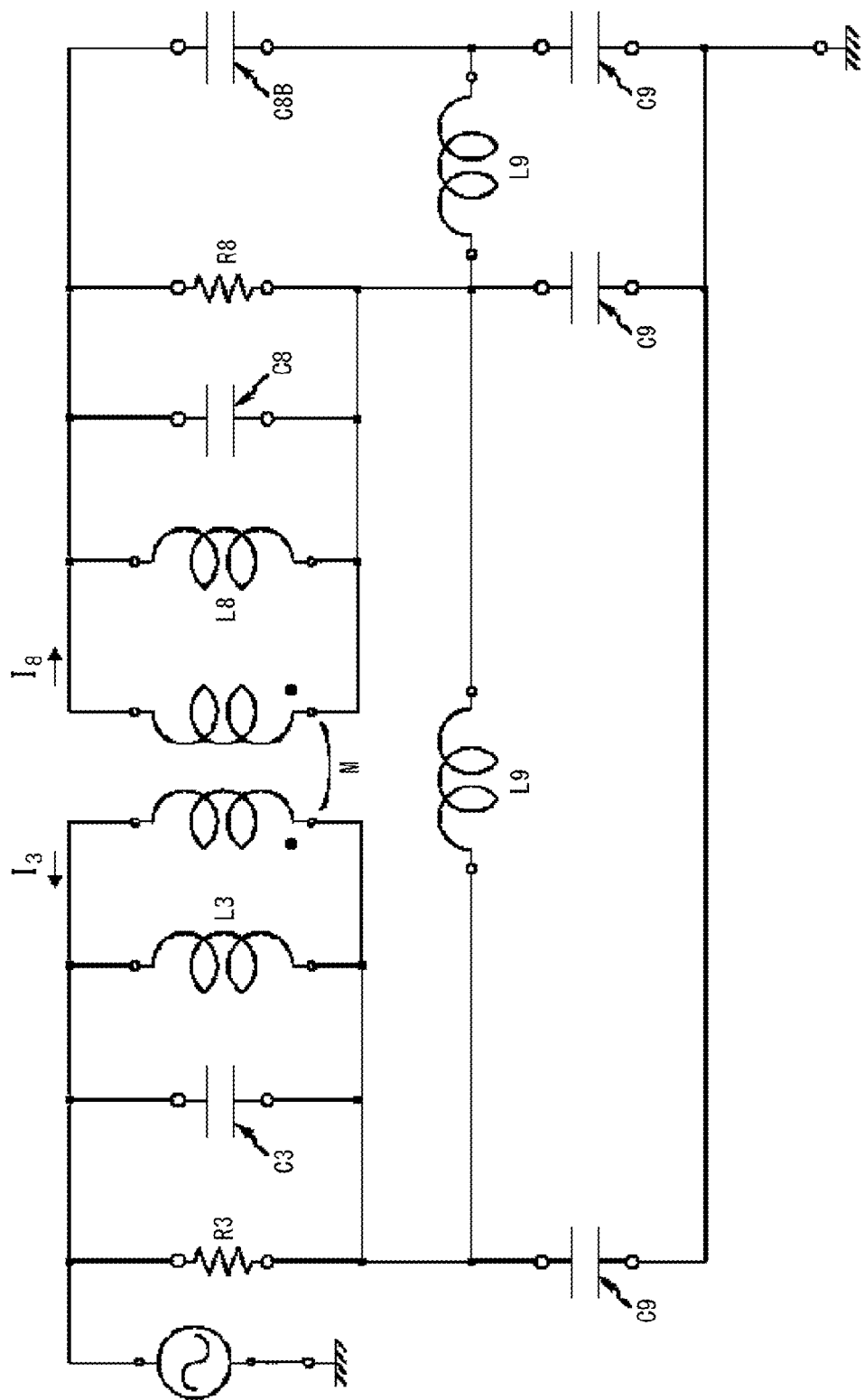
FIG. 88 is a diagram illustrating a schematic circuit of a wireless communication device.

In the wireless communication device 90, a resonant circuit in the air and a resonant circuit on the electrical conductive body 99 can be different from each other. FIG. 87 is a schematic circuit of a resonance structure formed in the air. FIG. 88 is a schematic circuit of a resonance structure formed on the electrical conductive body 99. L3 represents the inductance of the resonator 10, L8 represents the inductance of the eighth conductor 961, L9 represents the inductance of the electrical conductive body 99, and M represents the mutual inductance of L3 and L8. C3 represents the capacitance of the third conductor 40, C4 represents the capacitance of the fourth conductor 50, C8 represents the capacitance of the eighth conductor 961, C8B represents the capacitance of the eighth conductor 961 and the battery 91, and C9 represents the capacitance of the electrical conductive body 99 and the ground conductor 811. R3 represents the radiation resistance of the resonator 10, and R8 represents the radiation resistance of the eighth conductor 961. The operating frequency of the resonator 10 is lower than the resonant frequency of the eighth conductor. In the wireless communication device 90, the ground conductor 811 functions as a chassis ground in the air. In the wireless communication device 90, the fourth conductor 50 is capacitively coupled to the electrical conductive body 99. In the wireless communication device 90 on the electrical conductive body 99, the electrical conductive body 99 functions as a substantial chassis ground.

In embodiments, the wireless communication device 90 includes the eighth conductor 961. The eighth conductor 961 is electromagnetically coupled to the first antenna 60 and capacitively coupled to the fourth conductor 50. The wireless communication device 90 can increase the operating frequency when placed on the electrical conductive body 99 from the air by increasing the capacitance C8B caused by the capacitive coupling. The wireless communication device 90 can reduce the operating frequency when placed on the electrical conductive body 99 from the air by increasing the mutual inductance M caused by the electromagnetic coupling. The wireless communication device 90 can adjust the change in operating frequency when placed on the electrical conductive body 99 from the air by changing a balance between the capacitance C8B and the mutual inductance M. The wireless communication device 90 can reduce the change in operating frequency when placed on the electrical conductive body 99 from the air by changing the balance between the capacitance C8B and the mutual inductance M.

The wireless communication device 90 includes the eighth conductor 961 that is electromagnetically coupled to the third conductor 40 and capacitively coupled to the fourth conductor 50. By including the eighth conductor 961, the wireless communication device 90 can adjust the change in operating frequency when placed on the electrical conductive body 99 from the air. By including the eighth conductor 961, the wireless communication device 90 can reduce the change in operating frequency when placed on the electrical conductive body 99 from the air.

Similarly, in the wireless communication device 90 that does not include the eighth conductor 961, the ground conductor 811 functions as a chassis ground in the air. Similarly, in the wireless communication device 90 that does not include the eighth conductor 961, the electrical conductive body 99 functions as a substantial chassis ground on the electrical conductive body 99. The resonance structure including the resonator 10 can oscillate even when the chassis ground is changed. This corresponds to the fact that the resonator 10 including the reference potential layer 51 and the resonator 10 that does not include the reference potential layer 51 can oscillate.

Figure 89:
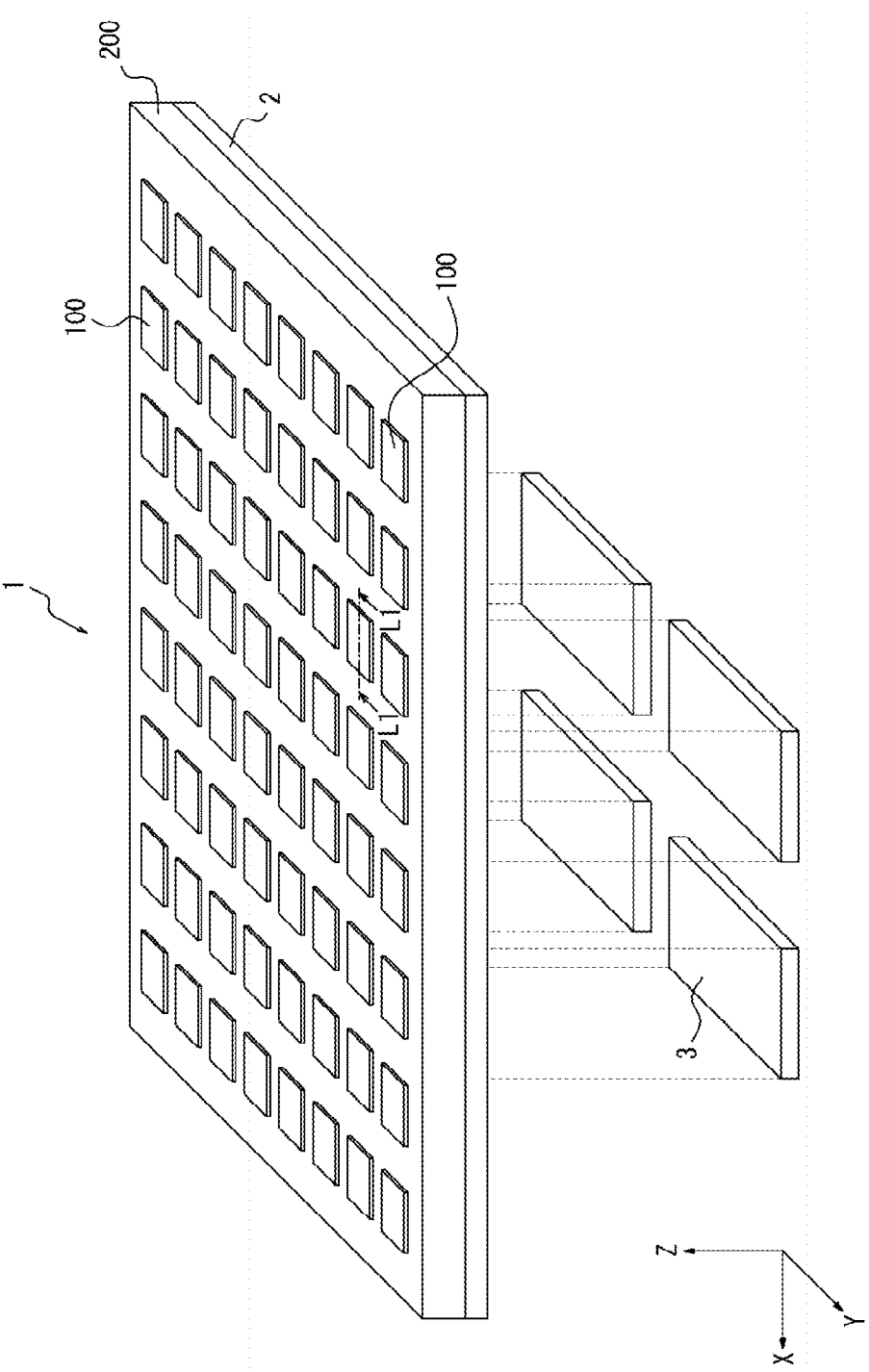
FIG. 89 is a perspective view illustrating an embodiment of an array antenna.
Figure 90:
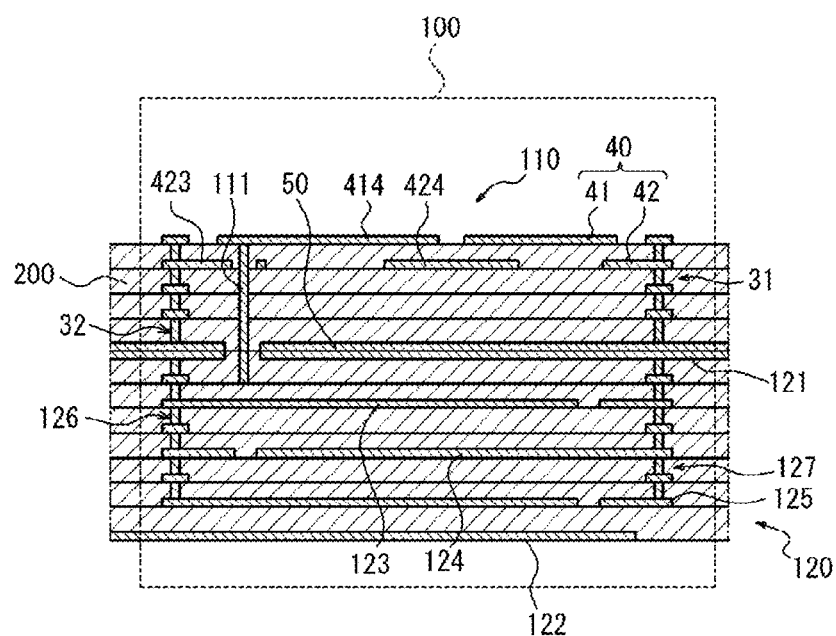
FIG. 90 is a cross-sectional view of an antenna element and an antenna board illustrated in FIG. 89.

FIG. 89 is a perspective view illustrating an embodiment of an array antenna 1. FIG. 90 is a cross-sectional view of an antenna element 100 and an antenna board 200 taken along line L1-L1 illustrated in FIG. 89.

In the present disclosure, a fourth axis is referred to as an X direction. In the present disclosure, a fifth axis is referred to as a Y direction. In the present disclosure, an eighth axis is referred to as a Z direction. An XYZ coordinate system illustrated in FIG. 89 or the like may be independent of an xyz axis coordinate system illustrated in FIG. 1 or the like. Alternatively, the XYZ coordinate system illustrated in FIG. 89 or the like may correspond to the xyz axis coordinate system illustrated in FIG. 1 or the like. In this case, the fourth axis, that is, the X direction, may be a direction along the x direction, which is the first axis, or the y direction, which is the third axis.

The array antenna 1 illustrated in FIG. 89 may be positioned on a circuit board 2. The array antenna 1 can be connected to an integrated circuit 3 via the circuit board 2. The integrated circuit 3 may be a radio frequency integrated circuit (RFIC). The array antenna 1 may be directly connected to the integrated circuit 3 without interposing the circuit board 2 therebetween. In other words, the array antenna 1 does not have to be positioned on the circuit board 2. The array antenna 1 includes a plurality of antenna elements 100 and the antenna board 200.

The plurality of antenna elements 100 are arranged in a grid pattern in the array antenna 1. The plurality of antenna elements 100 can be arranged in a square grid, an oblique grid, a rectangular grid, a triangular grid, or a hexagonal grid. In a case of the square grid, the plurality of antenna elements 100 can be arranged in a grid pattern along the X direction and Y direction, as illustrated in FIG. 89. The plurality of antenna elements 100 may be arranged linearly. In this case, the plurality of antenna elements 100 can be arranged along the X direction (or Y direction).

As illustrated in FIG. 90, the plurality of antenna elements 100 may be integrated with the antenna board 200. As illustrated in FIG. 90, the antenna element 100 includes a fourth antenna 110 and a filter 120. Electromagnetic waves received by the fourth antenna 110 are supplied as an electric signal to the integrated circuit 3 illustrated in FIG. 89 via the filter 120. The electric signal output by the integrated circuit 3 illustrated in FIG. 89 is radiated as electromagnetic waves by the fourth antenna 110 via the filter 120 illustrated in FIG. 90.

As illustrated in FIG. 90, the fourth antenna 110 includes the first conductor 31, the second conductor 32, the third conductor 40, the fourth conductor 50, and a third feeding line 111 electrically connected to the third conductor 40.

As illustrated in FIG. 90, the filter 120 is electrically connected to the third feeding line 111 of the fourth antenna 110. As illustrated in FIG. 90, the filter 120 is positioned in such a manner as to overlap the fourth conductor 50 in the Z direction. The filter 120 may be formed in the antenna board 200. An arbitrary structure may be adopted for the filter 120 according to a frequency band of electromagnetic waves transmitted and received by the array antenna 1, or the like. For example, the filter 120 may be a laminated waveguide type filter. As illustrated in FIG. 90, the filter 120 can include a conductor 121, a wire 122, conductors 123, 124, and 125, and conductors 126 and 127. The filter 120 may include any number of laminated waveguide type filters.

The conductor 121 may be formed of the same material as the fourth conductor 50. The conductor 121 and the fourth conductor 50 may be shared. That is, the conductor 121 and the fourth conductor 50 may be integrated with each other. The conductor 121 may be a separate member independent of the fourth conductor 50. In a case where the conductor 121 is a separate member independent of the fourth conductor 50, the conductor 121 overlaps the fourth conductor 50.

The wire 122 may be formed of any metal material. The wire 122 may be formed as a microstrip line. The wire 122 may be electrically connected to the circuit board 2 illustrated in FIG. 89. The wire 122 can be electrically connected to the integrated circuit 3 via the circuit board 2 illustrated in FIG. 89. In a case where the array antenna 1 illustrated in FIG. 89 is directly connected to the integrated circuit 3, the wire 122 can be electrically directly connected to the integrated circuit 3.

The conductors 123 to 125 function as a part of a laminated waveguide. The conductors 123 to 125 may be formed of any metal material. The conductors 123 to 125 each include an opening portion. The conductors 123 to 125 are arranged in such a manner that the opening portions face each other in the Z direction. The electric signal is sent and received by electromagnetic coupling through the opening portions.

The conductor 126 extends along the Z direction near one end portion of the filter 120. A plurality of conductors 126 arranged in the y direction are electrically connected via the conductor 125 extending in the y direction. The conductor 127 extends along the Z direction near the other end portion of the filter 120. A plurality of conductors 126 arranged in the y direction are electrically connected via the conductor 125 extending in the y direction.

The antenna board 200 illustrated in FIG. 90 can be a dielectric board. Similar to the base 20 illustrated in FIG. 1, the antenna board 200 can include any one of a ceramic material or a resin material as a composition. The antenna element 100 is positioned on the antenna board 200.

Figure 91:
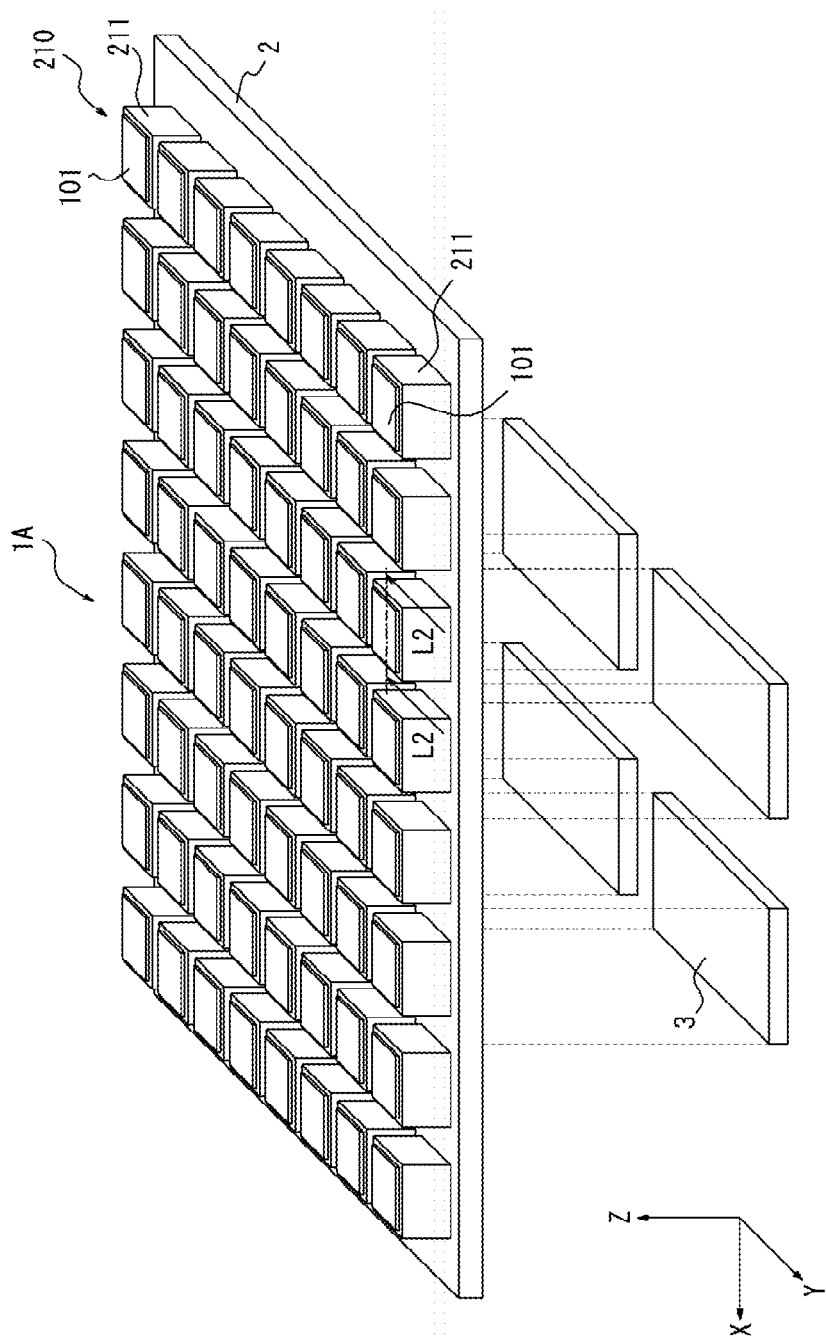
FIG. 91 is a perspective view illustrating an embodiment of an array antenna.
Figure 92:
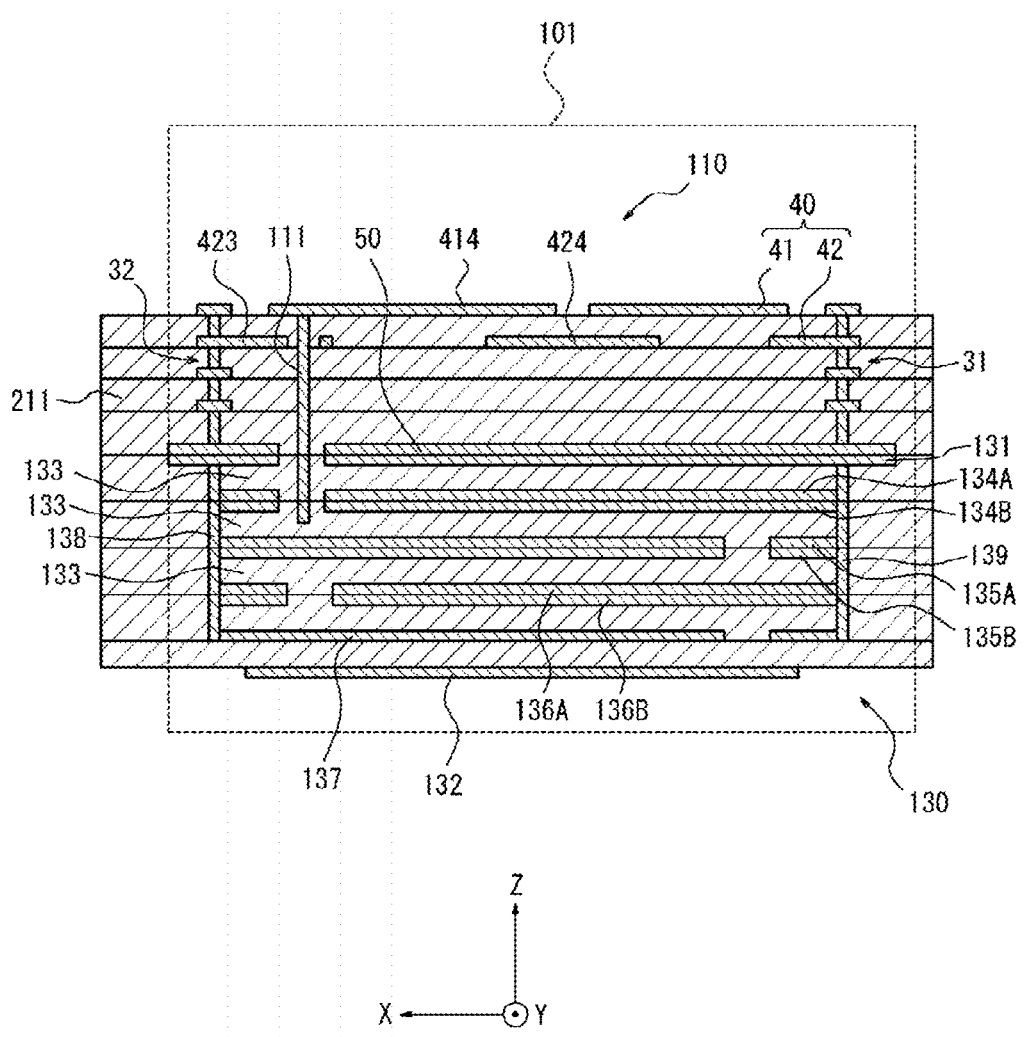
FIG. 92 is a cross-sectional view of an antenna element and an antenna board illustrated in FIG. 91.

FIG. 91 is a perspective view illustrating an embodiment of an array antenna 1A. FIG. 92 is a cross-sectional view of an antenna element 101 and an antenna board 210 taken along line L2-L2 illustrated in FIG. 91.

The array antenna 1A illustrated in FIG. 91 can be electrically connected to the integrated circuit 3 via the circuit board 2. The array antenna 1A includes a plurality of antenna elements 101 and the antenna board 210.

As illustrated in FIG. 92, the antenna element 101 includes the fourth antenna 110 and the filter 130.

As illustrated in FIG. 92, the filter 130 is electrically connected to the third feeding line 111 of the fourth antenna 110. As illustrated in FIG. 92, the filter 130 is positioned in such a manner as to overlap the fourth conductor 50 in the Z direction. The filter 130 may be formed in a board part 211 of the antenna board 210. An arbitrary structure may be adopted for the filter 130 according to a frequency band of electromagnetic waves transmitted and received by the array antenna 1A, or the like. For example, the filter 130 may be a dielectric filter. As illustrated in FIG. 92, the filter 130 can include a conductor 131, a wire 132, a wire 132, a dielectric block 133, conductors 134A and 134B, conductors 135A and 135B, conductors 136A and 136B, a conductor 137, and conductors 138 and 139. The filter 130 may include an arbitrary number of dielectric filters and the like.

The conductor 131 may be formed of the same material as the fourth conductor 50. The conductor 131 and the fourth conductor 50 may be commonized. That is, the conductor 131 and the fourth conductor 50 may be integrated with each other. The conductor 131 may be a separate member independent of the fourth conductor 50. In a case where the conductor 131 is a separate member independent of the fourth conductor 50, the conductor 131 overlaps the fourth conductor 50.

The wire 132 may be formed of any metal material. The wire 132 may be formed as a microstrip line. The wire 132 may be electrically connected to the circuit board 2 illustrated in FIG. 91. The wire 132 can be electrically connected to the integrated circuit 3 via the circuit board 2 illustrated in FIG. 91. In a case where the array antenna 1A illustrated in FIG. 91 is directly connected to the integrated circuit 3, the wire 132 can be electrically directly connected to the integrated circuit 3.

Similar to the base 20 illustrated in FIG. 1 or the like, the dielectric block 133 can include any one of a ceramic material or a resin material as a composition. The dielectric constant of the dielectric block 133 may be appropriately selected according to a frequency band of electromagnetic waves transmitted and received by the array antenna 1A, or the like.

The conductors 134A and 134B, the conductors 135A and 135B, the conductors 136A and 136B, and the conductor 137 may be formed of any metal material. The conductors 134A and 134B, the conductors 135A and 135B, the conductors 136A and 136B, and the conductor 137 each include an opening portion. The conductors 134A and 134B, the conductors 135A and 135B, the conductors 136A and 136B, and the conductor 137 are arranged in such a manner that the opening portions face each other in the Z direction. The electric signal is sent and received by electromagnetic coupling through the opening portions.

The conductors 134A and 134B may be formed integrally or formed as separate members. The conductors 135A and 135B may be formed integrally or formed as separate members. The conductors 136A and 136B may be formed integrally or formed as separate members.

The conductor 138 is positioned on one of two surfaces substantially parallel to a ZY plane included in the dielectric block 133. The conductor 139 is positioned on the other one of the two surfaces substantially parallel to the ZY plane included in the dielectric block 133. The conductors 138 and 139 each extend along a YZ plane.

The antenna board 210 illustrated in FIG. 91 can be a dielectric board, similar to the antenna board 200 illustrated in FIG. 90. Similar to the base 20 illustrated in FIG. 1, the antenna board 210 can include any one of a ceramic material or a resin material as a composition.

As illustrated in FIG. 91, the antenna board 210 includes a plurality of board parts 211. As illustrated in FIGS. 91 and 92, at least one antenna element 101 is arranged on the board part 211.

The board part 211 may be appropriately arranged according to arrangement of the antenna elements 101 in the array antenna 1A. For example, in a case where the antenna elements 101 are arranged in a square grid along the X direction and the Y direction, the plurality of board parts 211 can be arranged in a grid pattern along the X direction and the Y direction. For example, in a case where the antenna elements 101 are arranged linearly along the X direction (or Y direction), the plurality of board parts 211 can be arranged along the X direction (or Y direction).

Figure 93:
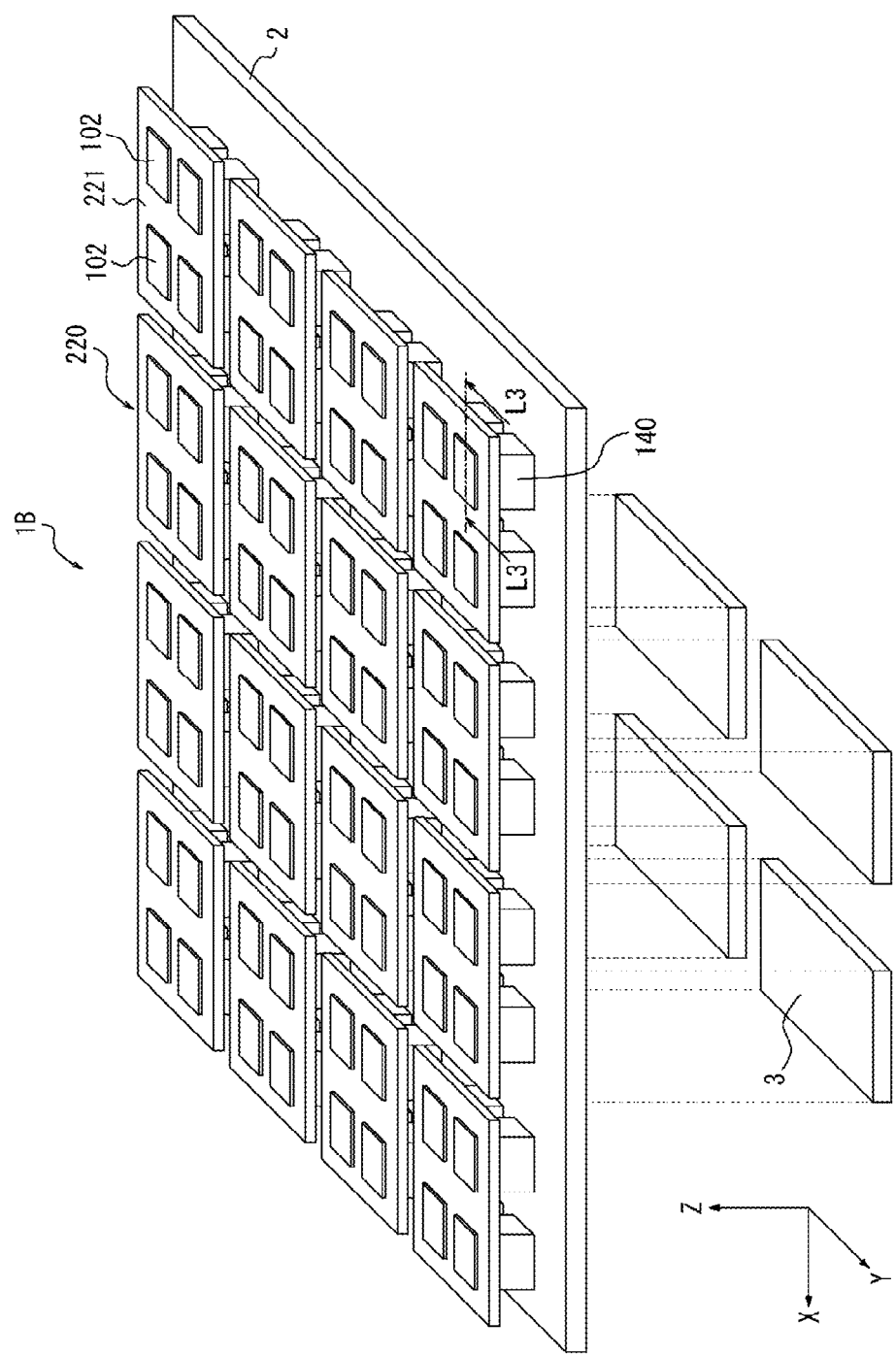
FIG. 93 is a perspective view illustrating an embodiment of an array antenna.
Figure 94:
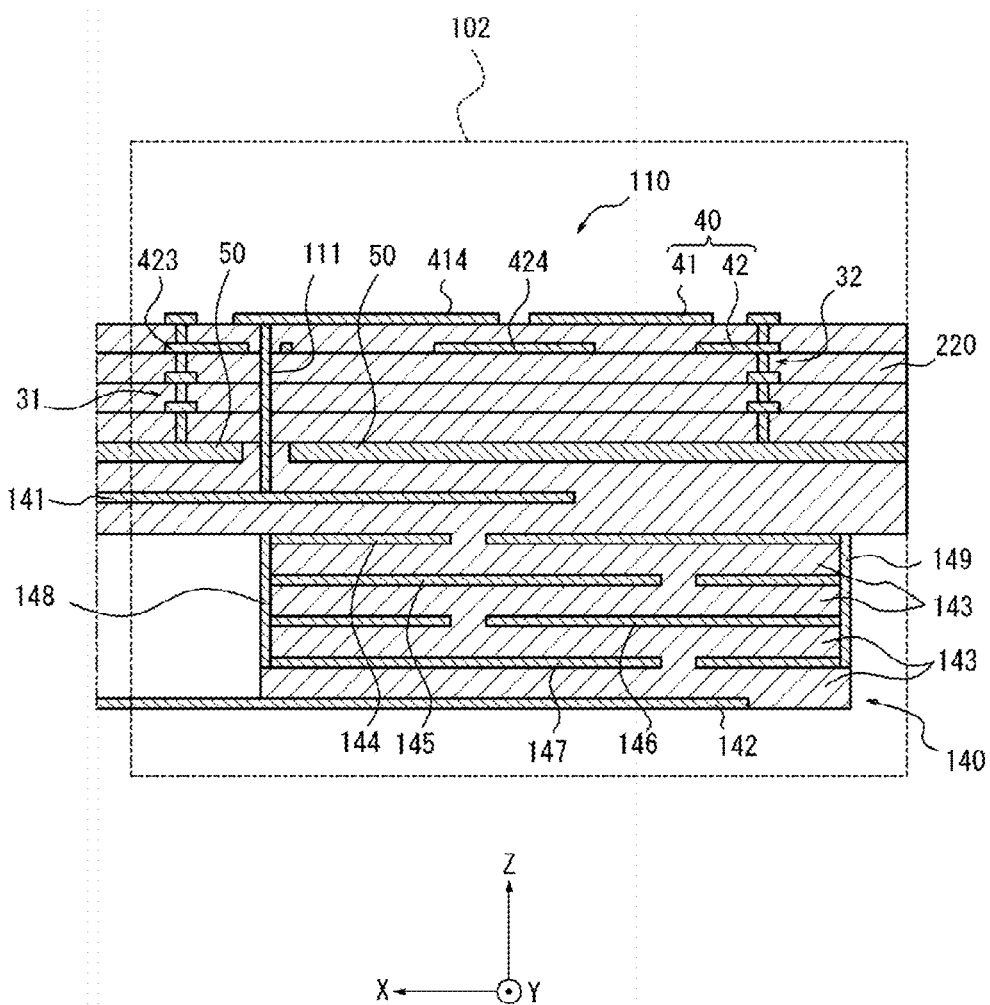
FIG. 94 is a cross-sectional view of an antenna element and an antenna board illustrated in FIG. 93.

FIG. 93 is a perspective view illustrating an embodiment of an array antenna 1B. FIG. 94 is a cross-sectional view of an antenna element 102 and an antenna board 220 taken along line L3-L3 illustrated in FIG. 93.

The array antenna 1B illustrated in FIG. 93 can be electrically connected to the integrated circuit 3 via the circuit board 2. As illustrated in FIG. 93, the array antenna 1B includes a plurality of antenna elements 102 and the antenna board 220.

The plurality of antenna elements 102 are arranged in a grid pattern in the array antenna 1B, similar to the plurality of antenna elements 100 illustrated in FIG. 89. As illustrated in FIG. 94, the antenna element 102 includes the fourth antenna 110 and a filter 140.

As illustrated in FIG. 94, the filter 140 is electrically connected to the third feeding line 111 of the fourth antenna 110. As illustrated in FIG. 94, the filter 140 is positioned in such a manner as to overlap the fourth conductor 50 in the Z direction. The filter 140 may be positioned under the antenna board 220. An arbitrary structure may be adopted for the filter 140 according to a frequency band of electromagnetic waves transmitted and received by the array antenna 1B, or the like. The filter 140 may be a dielectric filter. As illustrated in FIG. 94, the filter 140 can include a conductor 141, a wire 142, a dielectric block 143, conductors 144, 145, 146, and 147, and conductors 148 and 149. The filter 140 can be formed integrally with an arbitrary number of dielectric filters.

The conductor 141 can be electrically connected to the third feeding line 111 of the fourth antenna 110. The conductor 141 may be formed of any metal material. The conductor 141 may be formed as a microstrip line. The conductor 141 may be electrically connected to the third feeding line 111 of two or more different fourth antennas 110 by branching.

The wire 142 may be formed of any metal material. The wire 142 may be formed as a microstrip line. The wire 142 illustrated in FIG. 94 may be electrically connected to the circuit board 2 illustrated in FIG. 93. The wire 142 illustrated in FIG. 94 can be electrically connected to the integrated circuit 3 via the circuit board 2 illustrated in FIG. 93. In a case where the array antenna 1B illustrated in FIG. 93 is directly connected to the integrated circuit 3, the wire 142 illustrated in FIG. 94 can be electrically directly connected to the integrated circuit 3.

Similar to the base 20 illustrated in FIG. 1 or the like, the dielectric block 143 can include any one of a ceramic material or a resin material as a composition. The dielectric constant of the dielectric block 143 may be appropriately selected according to a frequency band of electromagnetic waves transmitted and received by the array antenna 1B, or the like.

The conductors 144 to 147 may be formed of any metal material. The conductors 144 to 147 may be formed as microstrip lines. The conductors 144 to 147 each include an opening portion. The conductors 144 to 147 are positioned in such a manner that the opening portions face each other in the Z direction. The electric signal is sent and received by electromagnetic coupling through the opening portions.

The conductor 148 is positioned on one of two surfaces substantially parallel to a ZY plane included in the dielectric block 143. The conductor 149 is positioned on the other one of the two surfaces substantially parallel to the ZY plane included in the dielectric block 143. The conductors 148 and 149 each extend along the YZ plane.

The antenna board 220 illustrated in FIG. 93 can be a dielectric board, similar to the antenna board 200 illustrated in FIG. 90. Similar to the base 20 illustrated in FIG. 1, the antenna board 220 can include any one of a ceramic material or a resin material as a composition.

As illustrated in FIG. 93, the antenna board 220 includes a plurality of board parts 221. As illustrated in FIG. 93, four antenna elements 101 are positioned on the board part 221. On the board part 221, the four antenna elements 101 are arranged in a grid pattern along the X direction and the Y direction. However, the number of antenna elements 101 positioned on the board part 221 is not limited to four. At least one antenna element 101 may be positioned on the board part 221.

The board part 221 may be appropriately arranged according to arrangement of the antenna elements 101 in the array antenna 1B. For example, in a case where the antenna elements 101 are arranged in a square grid along the X direction and the Y direction, the plurality of board parts 221 can be arranged in a grid pattern along the X direction and the Y direction.

Figure 95:
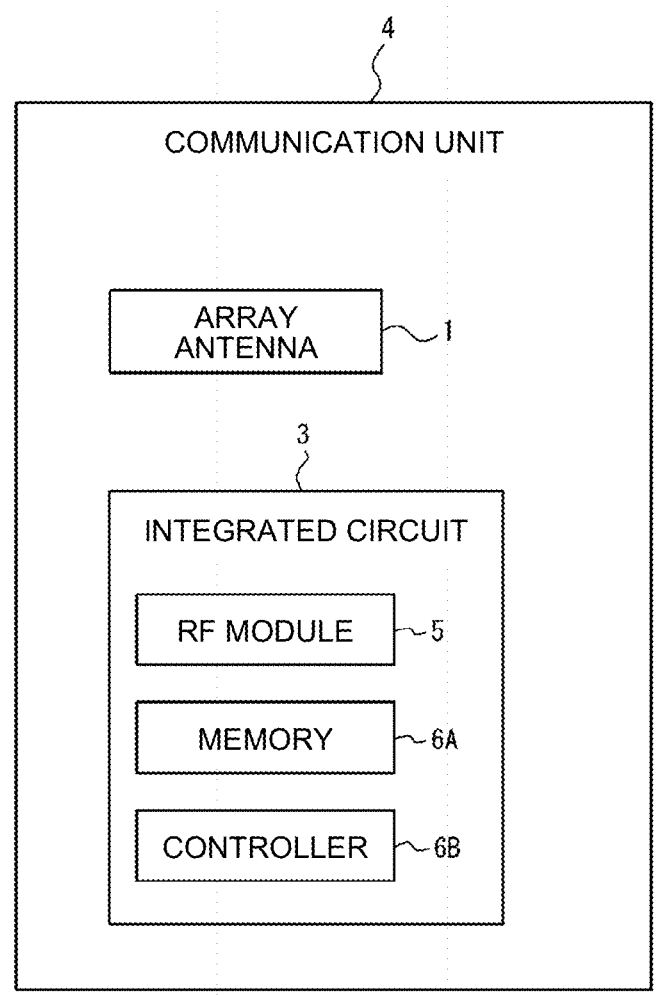
FIG. 95 is a block diagram illustrating an embodiment of a communication unit.
Figure 96:
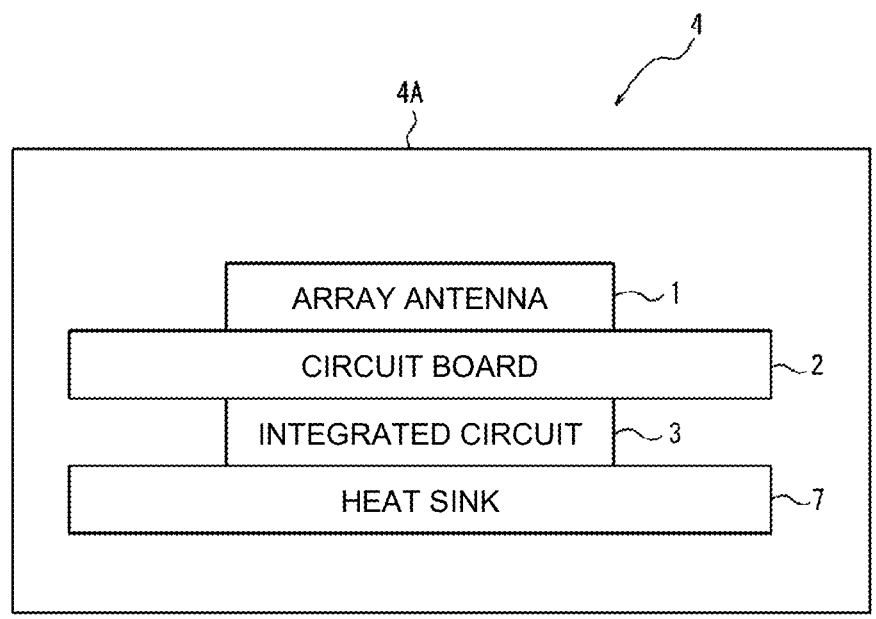
FIG. 96 is a cross-sectional view illustrating an embodiment of a communication unit.

FIG. 95 is a block diagram illustrating an embodiment of a communication unit 4. FIG. 96 is a cross-sectional view illustrating an embodiment of the communication unit 4.

As illustrated in FIG. 95, the communication unit 4 includes, as functional blocks, the array antenna 1 and the integrated circuit 3 that includes an RF module 5, a memory 6A, and a controller 6B. As illustrated in FIG. 96, the communication unit 4 includes the circuit board 2 on which the array antenna 1 and the integrated circuit 3 are mounted, and a heat sink 7 in a case 4A.

The communication unit 4 illustrated in FIGS. 95 and 96 includes the array antenna 1 illustrated in FIG. 89. However, the communication unit 4 may include the array antenna 1A illustrated in FIG. 91 or the array antenna 1B illustrated in FIG. 93. The communication unit 4 illustrated in FIG. 95 includes the memory 6A and the controller 6B in the integrated circuit 3. However, the communication unit 4 may include the memory 6A and the controller 6B outside the integrated circuit 3. Components included in the communication unit 4 are not limited to the components illustrated in FIGS. 95 and 96. For example, the communication unit 4 may include the battery 91 and the sensor 92 illustrated in FIG. 81.

The RF module may include a modulation circuit and a demodulation circuit. The RF module 5 can be operated in such a manner as to control power supplied to the array antenna 1 under the control of the controller 6B. The RF module 5 modulates a baseband signal and supplies the modulated baseband signal to the array antenna 1 under the control of the controller 6B. The RF module 5 can be operated in such a manner as to modulate an electric signal received by the array antenna 1 into a baseband signal under the control of the controller 6B.

The memory 6A illustrated in FIG. 95 may include, for example, a semiconductor memory. The memory 6A can function as a work memory of the controller 6B. The memory 6A can be included in the controller 6B. The memory 6A stores a program that describes a processing content that realizes each function of the communication unit 4, information used for the processing in the communication unit 4, and the like.

The controller 6B illustrated in FIG. 95 can include, for example, a processor. The controller 6B may include one or more processors. The processor may be a general-purpose processor that loads a specific program and executes a specific function, or a dedicated processor that is specialized for specific processing. The dedicated processor may include an application specific integrated circuit (IC). The application specific IC is also referred to as ASIC. The processor may include a programmable logic device. The programmable logic device is also referred to as PLD. The PLD may include an FPGA. The controller 6B may be any one of an SoC in which one or more processors cooperate, or an SiP. The controller 6B may store, in the memory 6A, various information, a program for operating each component of the communication unit 4, or the like.

The controller 6B illustrated in FIG. 95 is connected to the filter 120 of the antenna element 100 via the RF module 5. The controller 6B controls the RF module 5 to radiate a transmission signal, which is an electric signal, as electromagnetic waves by the array antenna 1. The controller 6B controls the RF module 5 to acquire a reception signal, which is electromagnetic waves, as an electric signal by the array antenna 1.

For example, the controller 6B generates a transmission signal to be transmitted from the communication unit 4. For example, in a case where the communication unit 4 includes the sensor 92 illustrated in FIG. 81, the controller 6B may acquire measurement data from the sensor 92. The controller 6B may generate a transmission signal according to the measurement data.

The heat sink 7 illustrated in FIG. 96 may be an arbitrary heat conductive member. The heat sink 7 may be arranged in such a manner as to be in contact with the integrated circuit 3. The heat sink 7 releases the heat generated from the integrated circuit 3 and the like to the outside of the communication unit 4.

Figure 97:
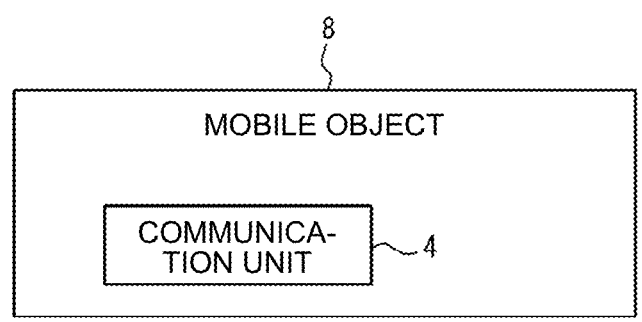
FIG. 97 is a block diagram illustrating an embodiment of a mobile object.

FIG. 97 is a block diagram illustrating an embodiment of a mobile object 8.

Examples of the "mobile object" in the present disclosure may include, but are not limited to, a vehicle, a vessel, and an aircraft. Examples of the vehicle may include, but are not limited to, an automobile, an industrial vehicle, a railroad vehicle, a domestic vehicle, and a fixed-wing aircraft traveling on a runway. Examples of the automobile may include, but are not limited to, a passenger car, a truck, a bus, a motorcycle, and a trolley bus. Examples of the industrial vehicle may include, but are not limited to, an industrial vehicle for agriculture and construction. Examples of the industrial vehicle may include, but are not limited to, a forklift and a golf cart. Examples of the industrial vehicles for agriculture may include, but are not limited to, a tractor, a cultivator, a transplanter, a binder, a combine harvester, and a lawnmower. Examples of the industrial vehicle for construction may include, but are not limited to, a bulldozer, a scraper, an excavator, a crane truck, a dump truck, and a road roller. The vehicle may be a human-powered vehicle. The classification of the vehicle is not limited to the above examples. For example, the automobile may be an industrial vehicle that can travel on the road. The same vehicle may be included in multiple categories. Examples of the vessel may include, but are not limited to, a marine jet, a boat, and a tanker. Examples of the aircraft may include, but are not limited to, a fixed-wing aircraft and a rotorcraft.

As illustrated in FIG. 97, the mobile object 8 includes the communication unit 4. In addition to the communication unit 4, the mobile object 8 may include an arbitrary component in order to exhibit, for example, a desired function of the mobile object 8. For example, in a case where the mobile object 8 is an automobile, the mobile object 8 may include an engine, a brake, a steering wheel, and the like.

Figure 98:
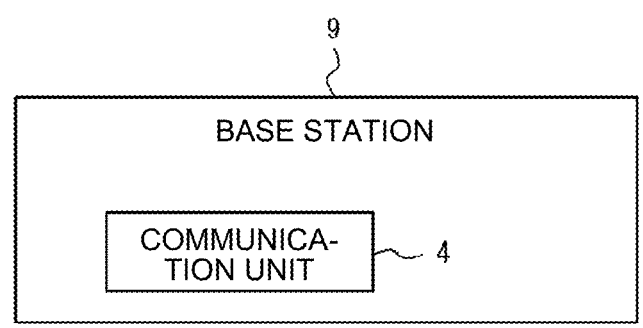
FIG. 98 is a block diagram illustrating an embodiment of a base station.

FIG. 98 is a block diagram illustrating an embodiment of a base station 9.

The "base station" in the present disclosure refers to a fixed base or the like capable of performing wireless communication with the mobile object 8. The "base station" in the present disclosure may be radio equipment managed by a telecommunications carrier, a radio operator, or the like.

As illustrated in FIG. 98, the base station 9 includes the communication unit 4. In addition to the communication unit 4, the base station 9 may include an arbitrary component in order to exhibit, for example, a desired function of the base station 9.

As described above, in embodiments, the antenna element includes, for example, the fourth antenna 110 and the filter 120 positioned in such a manner as to overlap the fourth conductor 50 of the fourth antenna 110, as illustrated in FIG. 90. As the filter 120 overlaps the fourth conductor 50 of the fourth antenna 110, the antenna element 100 can be miniaturized. Therefore, the antenna element 100 that is improved can be provided.

The configurations according to the present disclosure are not limited to the above-described embodiments and can be changed or modified in a variety of manners. For example, functions and the like of each constituent element and the like can be rearranged without a logical inconsistency, and a plurality of constituent elements can be combined or a constituent element can be subdivided.

Figure 99:
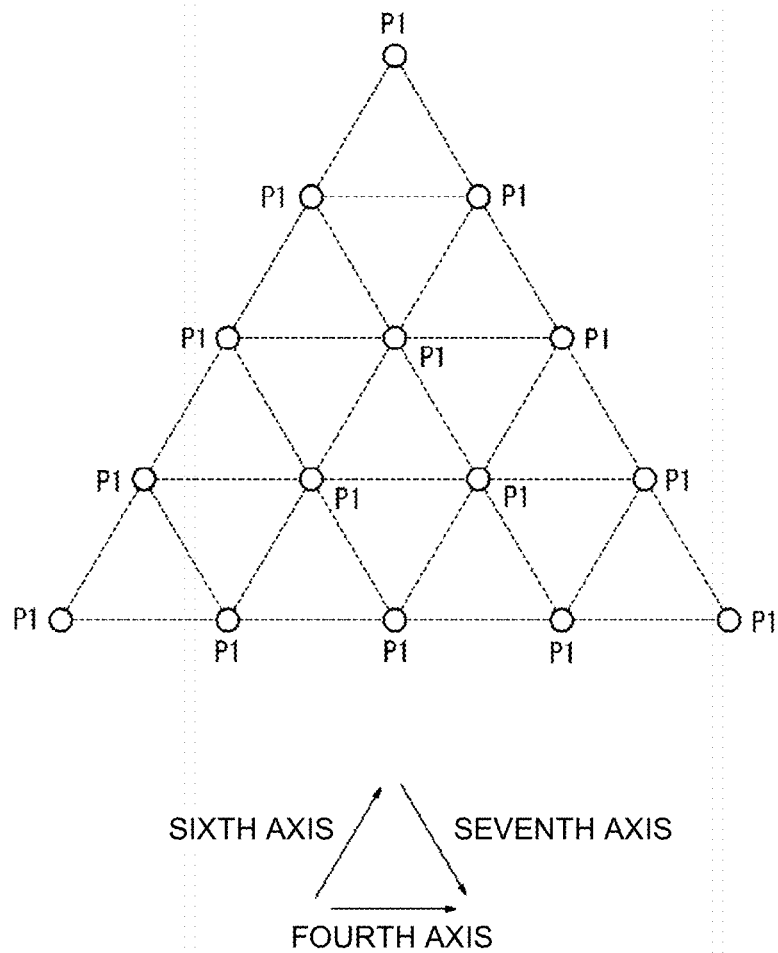
FIG. 99 is a diagram illustrating an embodiment of arrangement of antenna elements in an array antenna.

For example, the antenna elements 100 illustrated in FIG. 89 may be arranged in a triangular grid in the array antenna 1. FIG. 99 illustrates an example in which the antenna elements 100 are arranged in a triangular grid. A position P1 illustrated in FIG. 99 indicates the position of the antenna element 100. A sixth axis illustrated in FIG. 99 is an axis that forms an angle of less than 90 degrees with the fourth axis. A seventh axis is an axis that intersects the fourth axis and the sixth axis. Similarly, the antenna elements 100 illustrated in FIG. 91 may be arranged in a triangular grid in the array antenna 1A.

The drawings illustrating the configurations of the present disclosure are schematic. The drawings are not necessarily to scale.

In the present disclosure, descriptions such as "first", "second", and "third" are examples of an identifier for distinguishing a corresponding component. The components distinguished by the descriptions such as "first" and "second" in the present disclosure can exchange the numbers thereof with each other. For example, the first frequency and the second frequency can exchange the identifiers "first" and "second" with each other. The exchange of the identifier is made simultaneously. Even after exchanging the identifiers, the components are distinguished from each other. The identifier may be removed. The component from which the identifier is removed is distinguished by a reference sign. For example, the first conductor 31 can be the conductor 31. The identifiers such as "first" and "second" should not be used alone as a basis for interpretation of the order of a corresponding component, and a basis for the existence of an identifier with a small number, and the existence of an identifier with a large number. The present disclosure includes a configuration in which the second conductive layer 42 includes the second unit slot 422, but the first conductive layer 41 does not include the first unit slot.

REFERENCE SIGNS LIST 1, 1A, 1B ARRAY ANTENNA
2 CIRCUIT BOARD
3 INTEGRATED CIRCUIT
4 COMMUNICATION UNIT
4A CASE
5 RF MODULE
6A MEMORY
6B CONTROLLER
7 HEAT SINK
8 MOBILE OBJECT
9 BASE STATION
10 RESONATOR
10X UNIT STRUCTURE
20 BASE
20a CAVITY
21 FIRST BASE
22 SECOND BASE
23 CONNECTOR
24 THIRD BASE
30 PAIR CONDUCTORS
301 FIFTH CONDUCTIVE LAYER
302 FIFTH CONDUCTOR
303 SIXTH CONDUCTOR
31 FIRST CONDUCTOR
32 SECOND CONDUCTOR
40 THIRD CONDUCTOR GROUP
401 FIRST RESONATOR
402 SLOT
403 SEVENTH CONDUCTOR
40X UNIT RESONATOR
40I CURRENT PATH
41 FIRST CONDUCTIVE LAYER
411 FIRST UNIT CONDUCTOR
412 FIRST UNIT SLOT
413 FIRST CONNECTING CONDUCTOR
414 FIRST FLOATING CONDUCTOR
415 FIRST FEEDING CONDUCTOR
41X FIRST UNIT RESONATOR
41Y FIRST DIVISIONAL RESONATOR
42 SECOND CONDUCTIVE LAYER
421 SECOND UNIT CONDUCTOR
422 SECOND UNIT SLOT
423 SECOND CONNECTING CONDUCTOR
424 SECOND FLOATING CONDUCTOR
42X SECOND UNIT RESONATOR
42Y SECOND DIVISIONAL RESONATOR
45 IMPEDANCE ELEMENT
50 FOURTH CONDUCTOR
51 REFERENCE POTENTIAL LAYER
52 THIRD CONDUCTIVE LAYER
53 FOURTH CONDUCTIVE LAYER
60 FIRST ANTENNA
61 FIRST FEEDING LINE
70 SECOND ANTENNA
71 SECOND FEEDING LAYER
72 SECOND FEEDING LINE
80 WIRELESS COMMUNICATION MODULE
81 CIRCUIT BOARD
811 GROUND CONDUCTOR
82 RF MODULE
90 WIRELESS COMMUNICATION DEVICE
91 BATTERY
92 SENSOR
93 MEMORY
94 CONTROLLER
95 FIRST CASE
95A UPPER SURFACE
96 SECOND CASE
96A UNDER SURFACE
961 EIGHTH CONDUCTOR
9612 FIRST BODY
9613 FIRST EXTRA-BODY
9614 SECOND EXTRA-BODY
97 THIRD ANTENNA
99 ELECTRICAL CONDUCTIVE BODY
99A UPPER SURFACE 100, 101, 102 ANTENNA ELEMENT
110 THIRD ANTENNA
111 THIRD FEEDING LINE
120, 130, 140 FILTER
121 to 127, 134A, 134B, 135A, 135B, 136A, 136B, 137, 144 to 149 CONDUCTOR
122, 132, 142 WIRE
133, 143 DIELECTRIC BLOCK
200, 210, 220 ANTENNA BOARD
211, 221 BOARD PART
$f_c$ OPERATING FREQUENCY OF THIRD ANTENNA
$\lambda_c$ OPERATING WAVELENGTH OF THIRD ANTENNA

The invention claimed is:

1. An antenna element comprising:
a first conductor and a second conductor that extend along a second plane and are positioned away from each other along a first axis that intersects the second plane;
a third conductor that extends along a first plane including the first axis and is positioned between the first conductor and the second conductor;
a fourth conductor that extends along the first plane, is electrically connected to the first conductor and the second conductor, and is positioned away from the third conductor;
a feeding line that is electrically connected to the third conductor; and
a filter that is connected to the feeding line,
wherein the filter is positioned in such a manner as to overlap the fourth conductor.

2. An array antenna comprising:
a plurality of antenna elements; and
an antenna board on which the plurality of antenna elements are positioned,
wherein the antenna element includes:
a first conductor and a second conductor that extend along a second plane and are positioned away from each other along a first axis that intersects the second plane;
a third conductor that extends along a first plane including the first axis and is positioned between the first conductor and the second conductor;
a fourth conductor that extends along the first plane, is electrically connected to the first conductor and the second conductor, and is positioned away from the third conductor;
a feeding line that is electrically connected to the third conductor; and
a filter that is connected to the feeding line, and
the filter is positioned in such a manner as to overlap the fourth conductor.

3. The array antenna according to claim 2,
wherein the plurality of antenna elements are integrated with the antenna board.

4. The array antenna according to claim 2,
wherein the antenna board includes a plurality of board parts, and
at least one of the antenna elements is positioned on the board part.

5. The array antenna according to claim 2,
wherein the plurality of antenna elements are arranged along a fourth axis.

6. The array antenna according to claim 5,
wherein the fourth axis is an axis along the first axis or a third axis that is included in the first plane and is different from the first axis.

7. The array antenna according to claim 2,
wherein the plurality of antenna elements are arranged in a grid pattern along a fourth axis and a fifth axis that is substantially orthogonal to the fourth axis.

8. The array antenna according to claim 2,
wherein the plurality of antenna elements are arranged in a grid pattern along a fourth axis, a sixth axis that forms an angle of less than 90 degrees with the fourth axis, and a seventh axis that intersects the fourth axis and the sixth axis.

9. A communication unit comprising:
an array antenna including a plurality of antenna elements and an antenna board on which the plurality of antenna elements are positioned; and
a controller,
wherein the antenna element includes:
a first conductor and a second conductor that extend along a second plane and are positioned away from each other along a first axis that intersects the second plane;
a third conductor that extends along a first plane including the first axis and is positioned between the first conductor and the second conductor;
a fourth conductor that extends along the first plane, is electrically connected to the first conductor and the second conductor, and is positioned away from the third conductor;
a feeding line that is electrically connected to the third conductor; and
a filter that is connected to the feeding line,
the filter is positioned in such a manner as to overlap the fourth conductor, and
the controller is connected to the filter.

10. A mobile object comprising:
a communication unit,
wherein the communication unit includes:
an array antenna including a plurality of antenna elements and an antenna board on which the plurality of antenna elements are positioned; and
a controller,
the antenna element includes:
a first conductor and a second conductor that extend along a second plane and are positioned away from each other along a first axis that intersects the second plane;
a third conductor that extends along a first plane including the first axis and is positioned between the first conductor and the second conductor;
a fourth conductor that extends along the first plane, is electrically connected to the first conductor and the second conductor, and is positioned away from the third conductor;
a feeding line that is electrically connected to the third conductor; and
a filter that is connected to the feeding line,
the filter is positioned in such a manner as to overlap the fourth conductor, and
the controller is connected to the filter.

11. A base station comprising:
a communication unit,
wherein the communication unit includes:
an array antenna including a plurality of antenna elements and an antenna board on which the plurality of antenna elements are positioned; and
a controller,
the antenna element includes:
a first conductor and a second conductor that extend along a second plane and are positioned away from each other along a first axis that intersects the second plane;

a third conductor that extends along a first plane including the first axis and is positioned between the first conductor and the second conductor;
a fourth conductor that extends along the first plane, is electrically connected to the first conductor and the second conductor, and is positioned away from the third conductor;
a feeding line that is electrically connected to the third conductor; and
a filter that is connected to the feeding line,
the filter is positioned in such a manner as to overlap the fourth conductor, and
the controller is connected to the filter.

* * * * *